US011770579B2

(12) United States Patent
Ganschow et al.

(10) Patent No.: US 11,770,579 B2
(45) Date of Patent: Sep. 26, 2023

(54) METHOD AND SYSTEM FOR PROVIDING INTERACTIVE CONTENT DELIVERY AND AUDIENCE ENGAGEMENT

(71) Applicant: StreamLayer Inc., Chicago, IL (US)

(72) Inventors: Tim Ganschow, Chicago, IL (US); John Ganschow, Chicago, IL (US)

(73) Assignee: STREAMLAYER, INC., Chicago, IL (US)

( * ) Notice: Subject to any disclaimer, the term of this patent is extended or adjusted under 35 U.S.C. 154(b) by 0 days.

(21) Appl. No.: 16/725,095

(22) Filed: Dec. 23, 2019

(65) Prior Publication Data

US 2020/0245017 A1    Jul. 30, 2020

Related U.S. Application Data

(60) Provisional application No. 62/784,261, filed on Dec. 21, 2018.

(51) Int. Cl.
*H04N 21/478* (2011.01)
*H04N 21/431* (2011.01)

(52) U.S. Cl.
CPC ....... *H04N 21/4312* (2013.01); *H04N 21/478* (2013.01)

(58) Field of Classification Search
None
See application file for complete search history.

(56) References Cited

U.S. PATENT DOCUMENTS 6,654,032 B1    11/2003  Zhu et al.
8,301,618 B2    10/2012  Allard
(Continued)

FOREIGN PATENT DOCUMENTS

CN    303612434 S    3/2016
CN    303906801      11/2016
(Continued)

OTHER PUBLICATIONS

International Search Report and Written Opinion dated Apr. 1, 2020 for PCT/US2019/068369.
(Continued)

*Primary Examiner* — Jefferey F Harold
*Assistant Examiner* — Charles N Hicks
(74) *Attorney, Agent, or Firm* — Suiter Swantz pc llo

(57) ABSTRACT

A system for interactive video content includes one or more interactive engagement platform servers communicatively couplable to a plurality of user devices configured to display one or more video programs received from video provider servers. In another embodiment, the one or more interactive engagement platform servers are configured to: receive at least one of an event ID or metadata associated with the at least one video program stream of the one or more video program streams; retrieve one or more data payloads including supplemental content related to the event ID or metadata associated with the at least one video program stream from at least one of a third-party content provider or a third-party service provider; and generate one or more control signals configured to cause the plurality of user devices to display an interactive content overlay configured to display information associated with the one or more retrieved data payloads.

27 Claims, 56 Drawing Sheets

(56) References Cited

U.S. PATENT DOCUMENTS

| | | | |
|---|---|---|---|
| D673,172 S | 12/2012 | Peters et al. | |
| 8,434,103 B2 | 4/2013 | Tsuchida et al. | |
| D701,516 S | 3/2014 | Jaini | |
| 8,695,038 B2 | 4/2014 | Walker et al. | |
| D707,250 S | 6/2014 | Fernandes | |
| 8,856,817 B2 | 10/2014 | Sinha et al. | |
| D724,616 S | 3/2015 | Jou | |
| D735,221 S | 7/2015 | Mishra et al. | |
| 9,122,365 B2 | 9/2015 | Lee et al. | |
| D741,353 S | 10/2015 | Anzures et al. | |
| D749,112 S | 2/2016 | Coburn et al. | |
| D759,705 S | 6/2016 | Arroyo et al. | |
| D762,714 S | 8/2016 | Choi et al. | |
| 9,414,130 B2 | 8/2016 | Coan et al. | |
| D766,298 S | 9/2016 | Bae et al. | |
| 9,467,750 B2 | 10/2016 | Banica et al. | |
| D774,078 S | 12/2016 | Kisselev et al. | |
| D774,530 S | 12/2016 | Clement et al. | |
| D776,147 S | 1/2017 | Simmons et al. | |
| 9,557,878 B2 | 1/2017 | Chen et al. | |
| 9,591,372 B2 | 3/2017 | Walker et al. | |
| D788,137 S | 5/2017 | Zhu et al. | |
| D789,976 S | 6/2017 | Gibson et al. | |
| D790,563 S | 6/2017 | Lam | |
| 9,743,153 B2 | 8/2017 | Holyoak | |
| 9,762,967 B2 | 9/2017 | Clarke et al. | |
| D804,505 S | 12/2017 | Hoffman et al. | |
| D807,914 S | 1/2018 | Clement et al. | |
| 9,875,489 B2 | 1/2018 | Spitz et al. | |
| D815,128 S | 4/2018 | Phillips et al. | |
| D816,708 S | 5/2018 | Riedel et al. | |
| D818,477 S | 5/2018 | Hoffman et al. | |
| D823,338 S | 7/2018 | Ruiz et al. | |
| 10,025,453 B2 | 7/2018 | Masuda et al. | |
| D828,375 S | 9/2018 | Mok et al. | |
| D831,059 S | 10/2018 | Bao | |
| D847,824 S | 5/2019 | Toth | |
| D852,214 S | 6/2019 | Westerhold et al. | |
| D852,215 S | 6/2019 | Westerhold et al. | |
| D858,552 S | 9/2019 | Westerhold et al. | |
| D859,450 S | 9/2019 | Krishna | |
| D861,025 S | 9/2019 | Stukalov et al. | |
| D870,141 S | 12/2019 | Bowden et al. | |
| D879,806 S | 3/2020 | Fatnani et al. | |
| D881,219 S | 4/2020 | Ngo et al. | |
| D894,951 S | 9/2020 | Krishna | |
| D896,831 S | 9/2020 | Honnette et al. | |
| D914,034 S | 3/2021 | Lee et al. | |
| D924,251 S | 7/2021 | Kim et al. | |
| 11,102,178 B2 | 8/2021 | Ding et al. | |
| D933,696 S | 10/2021 | Underwood et al. | |
| D934,285 S | 10/2021 | Underwood et al. | |
| D935,483 S | 11/2021 | Harris et al. | |
| D938,985 S | 12/2021 | Kwak | |
| D939,564 S | 12/2021 | Kwak et al. | |
| 11,209,961 B2 | 12/2021 | Pope et al. | |
| D944,282 S | 2/2022 | Underwood et al. | |
| 11,245,785 B2 | 2/2022 | Shuttleworth et al. | |
| D944,848 S | 3/2022 | Underwood et al. | |
| D947,233 S | 3/2022 | Ganschow et al. | |
| D949,909 S | 4/2022 | Paul | |
| D951,267 S | 5/2022 | Ganschow et al. | |
| D955,414 S | 6/2022 | Tompkins et al. | |
| D956,771 S | 7/2022 | Haggerty et al. | |
| D963,689 S | 9/2022 | Fang et al. | |
| D974,376 S | 1/2023 | Zhu | |
| D978,165 S | 2/2023 | Wang | |
| D978,183 S | 2/2023 | Lee | |
| 2002/0054088 A1 | 5/2002 | Tanskanen et al. | |
| 2003/0115595 A1 | 6/2003 | Stevens et al. | |
| 2003/0157976 A1 | 8/2003 | Simon et al. | |
| 2004/0229568 A1 | 11/2004 | Lowe et al. | |
| 2008/0195969 A1 | 8/2008 | Brown et al. | |
| 2009/0031431 A1* | 1/2009 | Boccon-Gibod | G11B 20/00739 726/30 |
| 2009/0125332 A1* | 5/2009 | Martin | G16H 10/60 705/2 |
| 2009/0217320 A1* | 8/2009 | Aldrey | H04N 21/8173 725/37 |
| 2010/0319043 A1 | 12/2010 | Jain et al. | |
| 2011/0078023 A1 | 3/2011 | Aldrey et al. | |
| 2011/0169959 A1 | 7/2011 | DeAngelis et al. | |
| 2011/0289317 A1* | 11/2011 | Darapu | H04N 21/25816 713/168 |
| 2011/0289421 A1 | 11/2011 | Jordan et al. | |
| 2012/0185886 A1* | 7/2012 | Charania | H04N 21/8173 725/2 |
| 2013/0007807 A1* | 1/2013 | Grenville | H04N 21/4828 725/44 |
| 2013/0290861 A1 | 10/2013 | Chen et al. | |
| 2013/0332850 A1 | 12/2013 | Bovet et al. | |
| 2014/0075361 A1 | 3/2014 | Reynolds et al. | |
| 2014/0229992 A1 | 8/2014 | Ellis et al. | |
| 2014/0282670 A1 | 9/2014 | Sinha et al. | |
| 2015/0015500 A1 | 1/2015 | Lee et al. | |
| 2015/0026718 A1 | 1/2015 | Seyller | |
| 2015/0106748 A1 | 4/2015 | Monte et al. | |
| 2015/0121278 A1 | 4/2015 | Kim et al. | |
| 2015/0248389 A1 | 9/2015 | Kahn et al. | |
| 2015/0319493 A1 | 11/2015 | Lynch | |
| 2015/0319506 A1 | 11/2015 | Kansara et al. | |
| 2016/0062639 A1 | 3/2016 | Hwang et al. | |
| 2016/0358406 A1 | 12/2016 | Daly | |
| 2016/0366464 A1 | 12/2016 | Rouady et al. | |
| 2016/0372086 A1 | 12/2016 | Khinchuk | |
| 2017/0034237 A1 | 2/2017 | Silver | |
| 2017/0041648 A1* | 2/2017 | Dalrymple | H04N 21/4316 |
| 2017/0195745 A1 | 7/2017 | Kumar Bvn et al. | |
| 2017/0287443 A1 | 10/2017 | Boyce | |
| 2017/0339462 A1 | 11/2017 | Clarke et al. | |
| 2017/0366856 A1* | 12/2017 | Riegel | H04N 21/47217 |
| 2018/0249206 A1 | 8/2018 | Drori | |
| 2018/0300018 A1 | 10/2018 | Masuda et al. | |
| 2018/0316948 A1 | 11/2018 | Todd | |
| 2019/0058682 A1 | 2/2019 | MacAskill et al. | |
| 2019/0076741 A1 | 3/2019 | Thompson et al. | |
| 2019/0335209 A1 | 10/2019 | Birrer et al. | |
| 2021/0031105 A1 | 2/2021 | Ganschow et al. | |
| 2021/0255826 A1 | 8/2021 | Devine et al. | |

FOREIGN PATENT DOCUMENTS

| | | |
|---|---|---|
| CN | 304839205 | 10/2018 |
| EP | 3270343 A1 | 1/2018 |
| WO | 2012027594 A2 | 3/2012 |
| WO | 2014183034 A1 | 11/2014 |
| WO | 2017117422 A1 | 7/2017 |

OTHER PUBLICATIONS

Stan, M. "(2013) Sidebar Animation (GIF)." Dribbble, published Sep. 11, 2013 (Retrieved from the Internet Dec. 2, 2021). Internet URL: (Year:2013).

International Search Report and Written Opinion in European Application No. 19898273.8 dated Jul. 27, 2022.

7 Best live stream apps for Android—Fedewa, https://phandroid.com/2016/12/13/best-live-stream-apps-android/ (Year:2016).

Best live streaming apps—CNET, https://www.youtube.com/watch?v=ROdbtdckb18 (Year:2016).

Zuckerberg Really Wants You to StreamLive Video on Facebook—WIRED, https://www.wired.com/2016/04/facebook-really-wants-broadcast-watch-live-video/ (Year:2016).

"CSS: border-radius and -moz-border-radius." The Art of Web, published Feb. 7, 2010 (Retrieved from the Internet Jul. 27, 2020). Internet URL: (Year: 2010).

"React Carousel Image Gallery." React JS Example, published May 30, 2018 (Retrieved from the Internet Mar. 6, 2023). Internet URL: (Year; 2018).

(56) References Cited

OTHER PUBLICATIONS

Shi, Charity. "Concept: Browsing Facebook Videos on TV." Charityshi.com, published Mar. 2, 2018 (Retrieved from the Internet Mar. 6, 2023). Internet URL: (Year: 2018).
Japanese Refusal dated Jan. 13, 2023; Japanese Application No. DM/212757, p. 20.
Skelton, Nick, "Share Your App content smoothly using Firebase Dynamic Links", Apr. 5, 2018, https://medium.com/a-practical-guide-to-firebase-on-android/share-your-app-content-smoothly-using-firebase-dynamic-links-82b9ec999189.
Extended European Search Report dated Apr. 17, 2023; European Application No. 20864795.8.
Extended European Search Report dated Jul. 19, 2023; European Application No. 20875701.3.

* cited by examiner

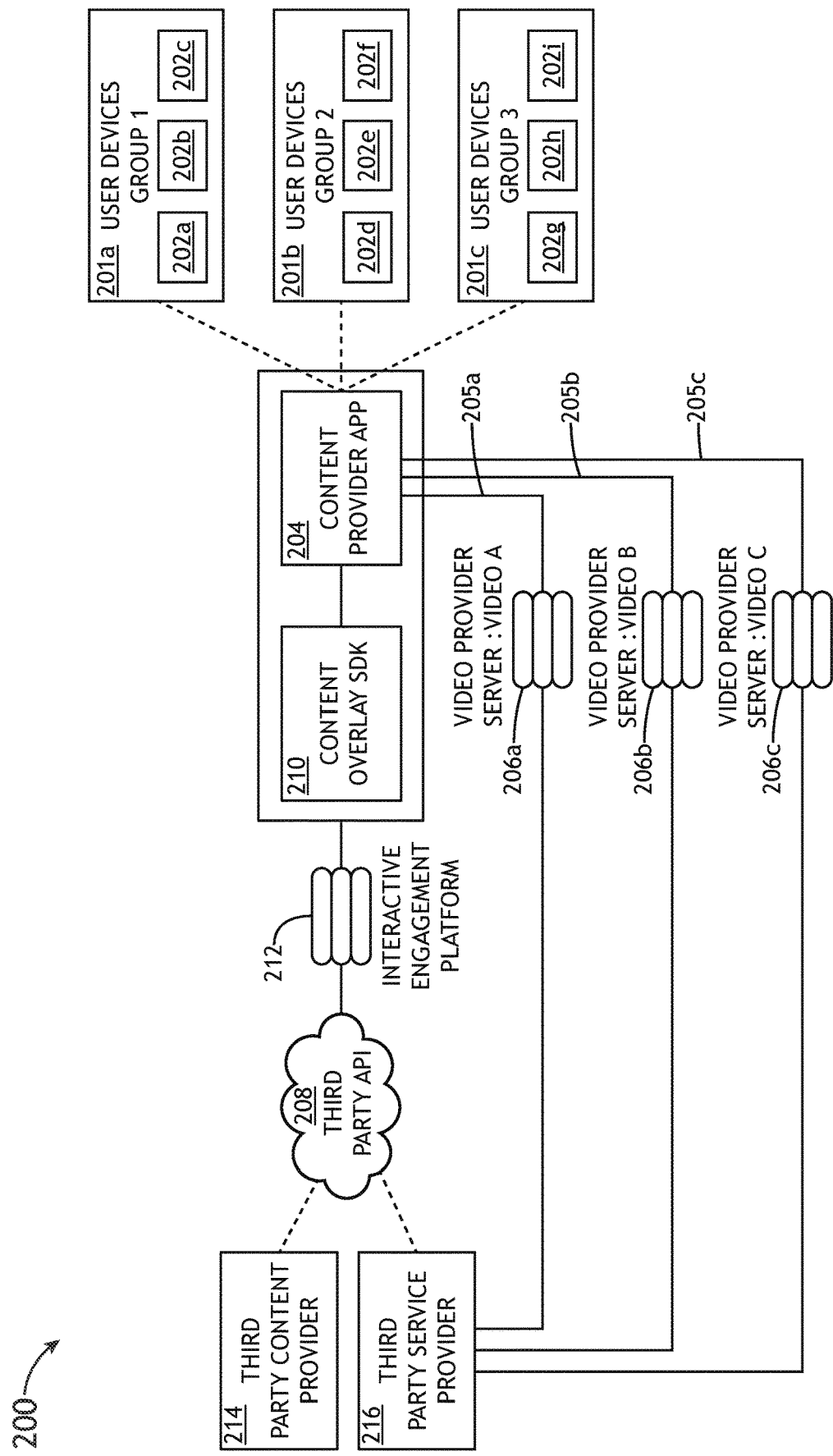

METHOD AND SYSTEM FOR PROVIDING INTERACTIVE CONTENT DELIVERY AND AUDIENCE ENGAGEMENT

CROSS-REFERENCE TO RELATED APPLICATION

The present application claims the benefit under 35 U.S.C. § 119(e) of U.S. Provisional Application Ser. No. 62/784,261, filed Dec. 21, 2018, entitled METHOD AND SYSTEM FOR PROVIDING INTERACTIVE CONTENT DELIVERY AND AUDIENCE ENGAGEMENT, naming Tim Ganschow and John Ganschow as inventors, which is incorporated herein by reference in the entirety.

TECHNICAL FIELD

The present disclosure relates to an interactive content delivery and interactive engagement platform, in particular, a software platform permitting video viewing with simultaneous real-time interaction with ancillary content within a video viewing application on any mobile computing, over-the-top (OTT) video content viewing devices, or other electronic devices capable of displaying internet-delivered video content.

BACKGROUND

Delivery of video content can be accomplished over the Internet by video streaming live and on-demand sporting events, concerts, news, music videos, movies, and traditional cable and network television programming. Experiencing video content while simultaneously communicating with other individuals regarding the video media content often is preferable to experiencing the video media content alone. Frequently, however, an end-user is unable to be accompanied by other end-users while watching video media content and thus is relegated to watching the video programming alone.

Similarly, experiencing video content delivered over the Internet while simultaneously accessing additional information and services related to the video content such as commentary from experts or friends, sports statistics, social media feeds, tickets, merchandise, polls, trivia, sports betting, etc.—both proprietary and from third-party sources—related to the video content often is preferable to experiencing only the video content itself. Frequently however, when an individual is watching video content via a mobile device, there is not a way to access additional related information while simultaneously viewing the video. The user must first exit the video to access the additional related information, thus disrupting the user experience.

Internet-based video platforms that deliver video content to mobile-video content providing applications and over-the-top (OTT) video content viewing devices hope to attract end-users/audiences by delivering an engaging video viewing experience. However, internet-based video platforms often fail to provide the necessary interface and back-end infrastructure permitting end-users to view video content while simultaneously engaging in those activities that make video viewing more enjoyable because of the cost of designing, building and maintaining the necessary additional functionality. As a result, their viewers are not able to simultaneously view video content while engaging in activities such as communicating with friends or other end-users, accessing direct and third-party information and services related to the content, and accessing commerce related to the video content. These platforms thus not only fail to enhance the end-user experience and promote audience interactivity, view times and user growth on their platforms by providing a more immersive, engaging viewing experience, but they lose end-users/audiences over the course of the video event due to end-users exiting the video experience in order to open other applications to communicate with friends, family and other end-users, access information and services related to the video content, or engage in commerce related to the video content. This is especially true for mobile video platforms.

These internet-based video content providing applications also frequently contain disruptive advertising that delivers a negative experience to the viewer in the form of pre-rolls advertising that appears before the video plays, or video advertising that appears over or in place of the live content, forcing viewers to watch the advertising instead of the video content. Or, the advertising removes the viewer from the video content providing application and places them on the advertising product's website, or encourages them to leave the application and visit the web site. This results in the loss of end-users as individuals either exit the experience because of frustration with the advertising, or because the advertising has launched a separate web browser outside the video experience that pushes the end-user from the experience, or both.

Some dedicated internet-based video content providing applications create interactive environments where end-users/audiences can invite, communicate and interact with friends and other fans while simultaneously viewing content. And other dedicated mobile video platforms enable end-user/audiences to access related content, specifically sports statistics, while simultaneously viewing content. These platforms, however, are purpose-built, dedicated applications and not designed to be transferable, software-as-a-service (SaaS) experiences for third parties.

Some external third-party communications applications, such as instant messenger, iMessage, Android Messages, Facebook Messenger, What's App, and SnapChat can be used to communicate via mobile devices. Furthermore, other external communications companies enable messaging functionality to be added to third-party mobile applications. However, none of these communication applications enable separate third-party video content providing application owners to provide the end user/audience with the ability to communicate with other individuals in the video content providing application while simultaneously watching video content, nor do they also enable the end-user/audience to watch video content while simultaneously accessing additional information and services related to the video content, including from third-party sources, in the video content providing application.

Additionally, these third-party communications applications do not allow the owners of video content to insert advertising inventory integrated into the interface permitting end-users to view the video content while simultaneously engaging with ancillary content and services in order to maximize the value of the increased engagement from these content and services with the end-user/audiences. These third-party communications platforms also do not provide advertising directly tied to in-game activities to create unique marketing experiences based on exciting game-related accomplishments. Finally, these third-party communications platforms do not provide detailed engagement statistics to the video content owner detailing how communications were sent or information accessed while the end-user/audiences watched the video content and engaged with other content or services.

Therefore, it would be desirable to provide a system and method which cure one or more of the shortfalls of previous approaches identified above.

SUMMARY

A system for interactive video content is disclosed. In one embodiment, the system includes one or more interactive engagement platform servers communicatively couplable to a plurality of user devices. In one embodiment, the plurality of user devices are configured to display one or more video programs via one or more video program streams received from one or more video provider servers. In another embodiment, the one or more interactive engagement platform servers are configured to: generate one or more control signals configured to cause the plurality of user devices to display an interactive content overlay including a submenu button set comprising one or more selectable buttons on a graphical user interface of a user device; receive event data including event ID and/or metadata of at least one video program stream; retrieve one or more data payloads including supplemental content related to the event data including event ID and/or metadata from at least one of a third-party content provider or a third-party service provider; and generate one or more control signals configured to associate at least one data payload with at least one selectable button of the submenu button set.

A system for interactive video content is disclosed. In one embodiment, the system includes a user device communicatively coupled to one or more video provider servers and at least one of one or more third-party service providers or one or more third-party content providers. In another embodiment, the user device is configured to: receive one or more video program streams from the one or more video provider servers, the one or more video program streams associated with one or more video programs; display at least one video program of the one or more video programs on a graphical user interface of the user device; display an interactive content overlay including a submenu button set comprising one or more selectable buttons on a graphical user interface of a user device; receive one or more data payloads including supplemental content related to the at least one video program from at least one of a third-party content provider or a third-party service provider; associate the at least one data payload with at least one selectable button of the submenu button set; and display an interactive content overlay window within the graphical user interface in response to a user selection of the at least one selectable button, wherein the interactive content overlay window is configured to display the supplemental content of the at least one data payload.

A method is disclosed. In one embodiment, the method includes generating one or more control signals configured to cause a user device displaying a video program to display an interactive content overlay including a submenu button set comprising one or more selectable buttons on the graphical user interface of the user device. In another embodiment, the method includes ingesting event data including event ID and/or extracting metadata associated with the video program. In another embodiment, the method includes receiving one or more data payloads including supplemental content related to the ingested event data or extracted metadata from at least one of a third-party content provider or a third-party service provider. In another embodiment, the method includes generating one or more control signals configured to associate at least one data payload with at least one selectable button of the submenu button set.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 1A illustrates a simplified block diagram of a video content system, in accordance with one or more embodiments of the present disclosure.

DETAILED DESCRIPTION

Figure 1B:
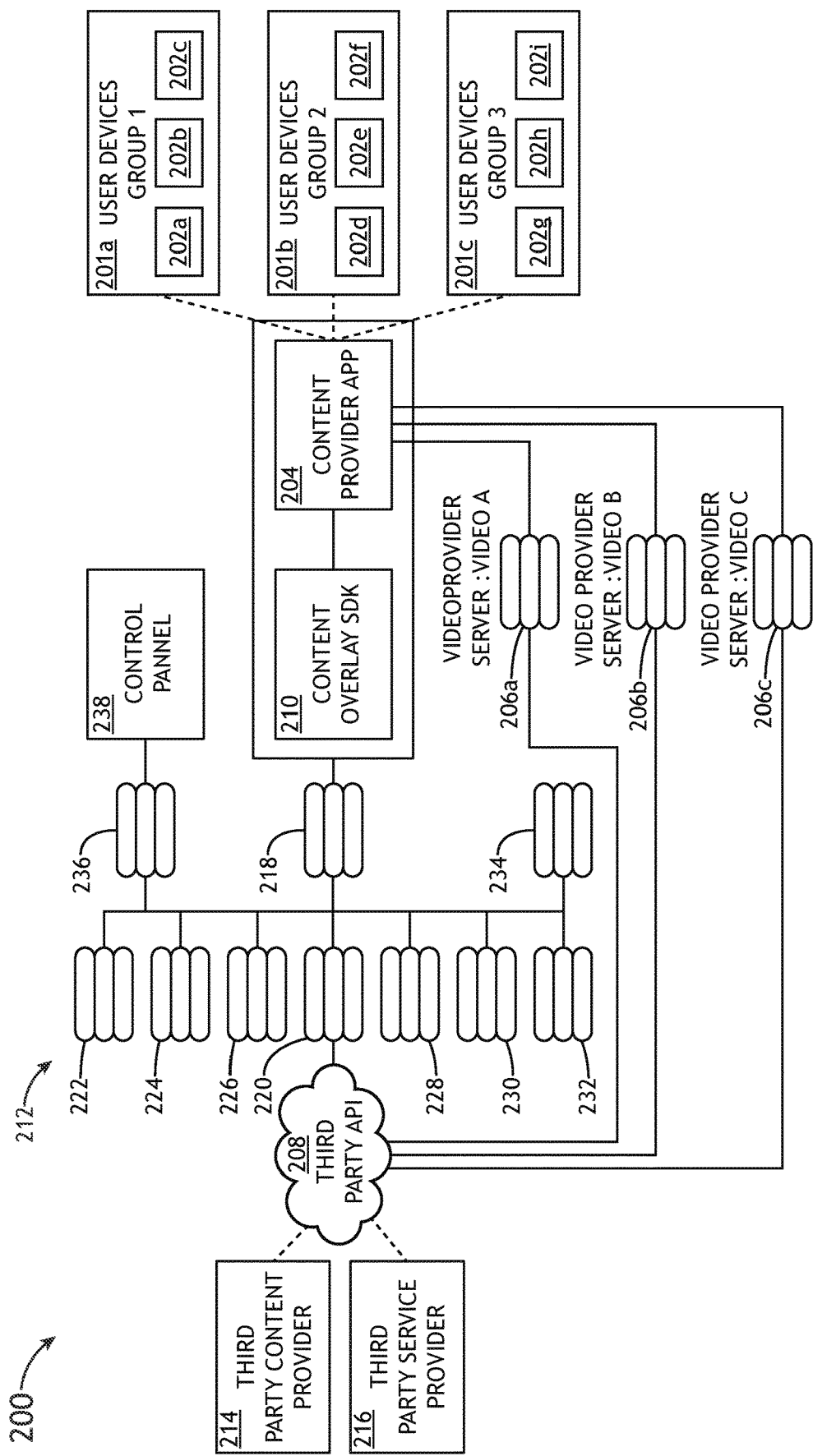
FIG. 1B illustrates a simplified block diagram of a video content system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

The present disclosure relates to a social engagement software platform for over the top (OTT), internet-based streaming video content providing applications on desktop and mobile computing user devices, (e.g., smartphones, tablets, e-book readers, laptops, and the like) and Internet-connected TVs (e.g., Apple TV, AndroidTV, Roku, Playstation and the like). It is contemplated herein that the social engagement software platform may provide interactive content overlays on user devices for both live and on-demand video content. For the purposes of the present disclosure, it should be understood that video content providing applications may include native video content applications, web-based video content applications, and hybrid video content applications. Likewise, in addition to OTT systems (e.g., Apple TV, Roku, Internet-connected TVs, and the like) and mobile user devices, it should be understood that various other types of electronic devices that are capable of displaying video content (including in virtual and augmented reality formats) can be used in accordance with various embodiments discussed herein.

Embodiments of the present disclosure are directed to an interactive engagement platform of a video content system which enables users of video content to view the video content while simultaneously accessing, viewing, interacting, or communicating with other information and/or users in an interactive content overlay. Users may be capable of interacting with other users/audiences who are watching the same and/or different video content. The interactive content overlay of the present disclosure may be implemented in any video content providing applications capable of displaying internet-delivered video content. The interactive engagement platform also allows an end-user to watch video content while simultaneously accessing and viewing additional information related to the video content, conduct transactions related to the video content (e.g., purchasing products and services, wagering, etc.), and view advertising without leaving the video content providing application.

It is noted herein that many video content providers provide video content to users via an application-based system. For example, a user may view sports-related content provided by ESPN Inc. through the web-based ESPN application, or "app." For instance, a user may install the ESPN app on their smartphone or tablet ("user device"), and may thereby be able to view ESPN content on their user device through the ESPN app. In one embodiment, the interactive content overlay system of the present disclosure utilizes a software developer kit (SDK), which includes source code or other computing instructions, which may be implemented within the video content providing application of a user device. The interactive video content may also be delivered via web-based experiences via JavaScript or other webpage codes. For example, an SDK may be implemented within the ESPN app itself. Additional embodiments of the present disclosure are directed to the use of content servers which utilize one or more application programming interfaces (API) with data delivered from a central interactive content overlay server. These APIs may be continually updated with data of proprietary features and functionality, as well as third-party content which, in turn, is ingested from one or more third-party API data feeds containing information such as real-time game, league, team and player statistics, betting odds or social media content. In another embodiment, a client administrator system coupled to the interactive content overlay server may schedule and pair client programming with various APIs related to supplemental content and services generated either directly from the interactive engagement platform or from independent third-party sources.

In one embodiment, the SDK implemented in the video content provider application requests and implements the APIs to create the interactive engagement platform's features and functionality within the video content providing application. End-users who are experiencing video content on the video content providing application can use a menu-launch button to access, through an interactive display layer on top of the video content, information and services related to the video, transaction opportunities (e.g., e-commerce, wagering, etc.), and also engage with other end-users using messaging, voice-calling, social media services and other means of communication. Additionally, advertising and various on-screen notifications may appear over the video experience. Advertisements may be triggered either directly by the client in real time, scheduled by the client ahead of time, or automatically generated by the platform based on an API trigger resulting from various in-game events (e.g., two minutes left in half, goal scored, etc.), third-party service activity (change in Fantasy leaderboard position) or activity in the platform's feature set (new message from friend received) to prompt the user to take further action.

Reference will now be made in detail to the subject matter disclosed, which is illustrated in the accompanying drawings.

Referring generally to FIGS. 1A-35, a system and method for interactive video content delivery is described, in accordance with one or more embodiments of the present disclosure.

FIG. 1A illustrates a simplified block diagram of a video content system 200, in accordance with one or more embodiments of the present disclosure. The interactive content system 200 may include, but is not limited to, one or more user devices 202, a content provider application (content provider app 204), one or more video provider servers 206, one or more third-party APIs 208, one or more third-party content providers 214, one or more third-party service providers 216, a content overlay software developer kit (content overlay SDK 210), and an interactive engagement platform 212.

In one embodiment, the one or more user devices 202 may be configured to display video content to a user. In this regard, the one or more user devices 202 may include any device capable of displaying video content including, but not limited to, smartphones, smart watches, tablets, computers, smart TVs, wearable devices, virtual/augmented reality headsets, and the like. In another embodiment, the one or more user devices 202 are configured to receive and display video content through a content provider application (content provider app 204). The content provider app 204 may be downloaded/installed on the one or more user devices 202. By way of example, the content provider app 204 may include an ESPN app, a FoxSports app, a MSNBC News app, or any other application ("app") configured to receive and display video content.

In one embodiment, the content provider app 204 is configured to receive one or more video program streams 205 from one or more video provider servers 206. The one or more video provider servers 206 may be configured to transmit video program information data (such as metadata) to one or more third-party application program interfaces 208 (third-party APIs 208). Third party content providers and third party service providers are also sending supplemental content and services data related to the video program streams to one or more application programming interfaces.

For example, as shown in FIG. 1, the content provider app 204 may be configured to receive a first video program stream 205a from a first video provider server 206a, a second video program stream 205b from a second video provider server 206b, and a third video program stream 205c from a third video provider server 206c. For instance, in the case of a FoxSports app (e.g., FoxSports content provider app 204), the content provider app 204 may be configured to receive video program data of a first sporting event (first video program stream 205a) from a first FoxSports server (first video provider server 206a), video program data of a second sporting event (second video program stream 205b) from a second FoxSports server (second video provider server 206b), and video program data of a third sporting event (third video program stream 205c) from a third FoxSports server (third video provider server 206a). It is noted herein, however, that a single video provider server 206 may be capable of providing the content provider app 204 with multiple video program streams 205.

In one embodiment, the one or more user devices 202 may be sub-divided based on the video content being viewed. For example, as shown in FIG. 1A, a first group 201a of user devices 202a-202c may be viewing a first video program (Video Program A) via the first program stream 205a, a second group 201b of user devices 202d-202f may be viewing a second video program (Video Program B) via the second video program stream 205b, and a third group 201c of user devices 202g-202i may be viewing a third video program (Video Program C) via the third video program stream 205a. It is further noted herein that a single user device 202 may include multiple content provider apps 204. For example, a single user device 202a may include a FoxSports app (content provider app 204a), an ESPN app (content provider app 204b), and a MSNBC News app (content provider app 204c). In this regard, a single user device 202 may be configured to receive video content from a number of different content providers (e.g., video provider servers 206).

In another embodiment, interactive content overlay system 200 may include a content overlay software development kit (content overlay SDK 210) communicatively coupled to, or integrated with, the one or more content provider apps 204. For example, in the case of the FoxSports app (content provider app 204), the FoxSports app may include a content overlay SDK 210. In this regard, the one or more content overlay SDKs 210 may be installed/downloaded along with the one or more content provider apps 204 on the user devices 202 themselves.

In one embodiment, the one or more content overlay SDKs 210 are configured to receive video content data from the one or more video program streams 205. In another embodiment, an interactive engagement platform 212 may be configured to receive the video program data from the content overlay SDKs 210. For example, a content overlay SDK 210 of a FoxSports app (content provider app 204) may be configured to extract metadata from the video program streams 205a-205c and transmit the extracted metadata to the interactive engagement platform 212.

In another embodiment, the interactive engagement platform 212 may be configured to retrieve additional data/information related to the video program being displayed on a user device 202, and provide one or more supplemental data payloads to the user device 202 which are viewable to a user through an interactive content overlay produced on the user device 202. For example, extracted metadata from the video program streams 205 is sent to the interactive engagement platform to analyze and retrieve additional data/information related to the extracted metadata from one or more third-party content providers 214 and/or one or more third-party service providers 216, and transmit one or more control signals configured to generate an interactive content overlay on a graphical user interface of the one or more user devices 202. In this regard, the interactive engagement platform 212 may include one or more servers, one or more databases, one or more computing sub-systems, a control panel, a network interface, an API ingestion sub-system, and the like. The interactive engagement platform 212 may be further understood with reference to FIG. 1B.

FIG. 1B illustrates a simplified block diagram of an interactive content overlay system 200, in accordance with one or more embodiments of the present disclosure. It is noted herein that any description associated with the interactive content overlay system 200 depicted in FIG. 1A may be regarded as applying to the interactive content overlay system 200 depicted in FIG. 1B, unless noted otherwise herein. Conversely, any description associated with the interactive content overlay system 200 depicted in FIG. 1B may be regarded as applying to the interactive content overlay system 200 depicted in FIG. 1A, unless noted otherwise herein.

The interactive engagement platform 212 may include one or more servers, systems, databases, and the like. For example, the interactive engagement platform 212 may include, but is not limited to, an routing/load balancer server 218, an API ingestion system 220, one or more user databases 222, an API matching system 224, an event scheduling system 226, a messaging system 228, an advertising system 230, an analytics system 232, an analysis system 234, an admin server 236, and a control panel 238. As will be described in further detail herein, it is contemplated that the various systems and servers of the interactive engagement platform 212 may take any form known in the art. For example, the various systems of the interactive engagement platform 212 may include one or more servers including one or more processors and memory. For instance, the messaging system 228 may include a dedicated server including one or more processors and memory. By way of another example, the messaging system 228 may include a messaging system communicatively coupled to the routing/load balancer server 218, wherein the messaging system is provided by a third-party messaging platform or service provider, such as Telegram, FB Messenger, Agora, and the like. In this regard, it is noted herein that the interactive engagement platform 212 may include any number of servers, sub-systems, databases, and the like. In this regard, the configuration and make-up of the interactive engagement platform 212 illustrated in FIG. 1B is provided solely for illustration, and is not to be regarded as limiting, unless noted otherwise herein.

In one embodiment, the routing/load balancer server 218 may include data and programming instructions for carrying out various steps/features of the present disclosure. In this regard, the routing/load balancer server 218 may include program instructions generating the various features and functions of an interactive content overlay on a graphical user interface of a user device 202.

An example may prove to be illustrative. In this example, a first group 201a of user devices 202a-202c may be viewing a football game (video program) through the FoxSports app (content provider app 204). The content overlay SDK 210 of the content provider app 204 may be configured to extract metadata of the video program data received through the video program stream 205a, and transmit the extracted metadata to the interactive engagement platform 212. The routing/load balancer server 218 of the interactive engagement platform 212 may be configured to receive the extracted metadata. The extracted metadata of a video program may include information regarding the video program including, but not limited to, the names of individuals/entities within the video program, the name of the program, the provider of the video program, and the like.

Continuing with the same example, the API ingestion server 220 may then be configured to search one or more third-party content providers 214 and/or one or more third-party service providers 216, via one or more third-party APIs 208, for additional content and services related to the extracted metadata. In this regard, the API ingestion server 220 may be configured to interface with the one or more third-party APIs 208 of the one or more third-party content providers 214 and/or the third-party service providers 216. For instance, if the video program was an NFL game between the Los Angeles Rams and the New England Patriots, the API ingestion system 220 may be configured to search and retrieve, from the one or more third-party content providers 214 and/or one or more third-party service providers 216, additional information/data related to the Rams, Patriots, the NFL, players/coaches on each team, and the like.

Continuing with the same example, the routing/load balancer server 218 of the interactive engagement platform 212 may be configured to transmit the retrieved additional information to the content overlay SDK 210 and the content provider app 204. The routing/load balancer server 218 may be further configured to generate one or more control signals configured to cause the one or more user devices 202 to display an interactive content menu. Furthermore, the routing/load balancer server 218 may be configured to generate one or more control signals configured to associate the additional content and services with at least one selectable button of the interactive content menu in the content overlay SDK 210. For instance, the additional content and services retrieved by the one or more third-party content providers 214 and/or one or more third-party service providers 216 may include data for users to purchase Rams/Patriots/NFL merchandise, and data regarding statistics of both teams and/or particular players. In this regard, the content overlay SDK 210 may be configured to associate the merchandise data with a first selectable button of the interactive content menu, and the statistics data with a second selectable button of the interactive content menu.

In another example, a first group 201a of user devices 202a-202c may be viewing a football game (video program) through the FoxSports app (content provider app 204). The event scheduling server 206 of the interactive engagement platform 212 may be configured to receive extracted event scheduling information from the event schedule API or database provided by the video content provider. The extracted information may include information regarding the video program including, but not limited to, the event ID, video content type, the names of individuals/entities within the video program, the name of the program, the provider of the video program, etc.

Continuing with the same example, the API ingestion server 220 may then be configured to search one or more third-party content providers 214 and/or one or more third-party service providers 216, via one or more third-party APIs 208, for additional content and services related to the extracted event scheduling information. In this regard, the API ingestion server 220 may be configured to interface with the one or more third-party APIs 208 of the one or more third-party content providers 214 and/or the third-party service providers 216. These APIs are then paired to the event ID in the API matching server. For instance, if the video program was an NFL game between the Los Angeles Rams and the New England Patriots, the API ingestion system 220 may be configured to search and retrieve, from the one or more third-party content providers 214 and/or one or more third-party service providers 216, additional information/data related to the Rams, Patriots, the NFL, players/coaches on each team, and the like.

Continuing with the same example, the routing/load balancer server 218 of the interactive engagement platform 212 may be configured to transmit to the content overlay SDK 210 and the content provider app 204 the event ID along with the retrieved API information paired to that event ID. The routing/load balancer server 218 may be further configured to generate one or more control signals paired to the video stream matching the event ID extracted from the scheduling data to cause the one or more user devices 202 to display an interactive content menu in the content overlay SDK 210. Furthermore, the routing/load balancer server 218 may be configured to generate one or more control signals configured to associate the additional content and services retrieved by the one or more third-party content providers 214 and/or one or more third-party service providers 216 with at least one selectable button of the interactive content menu in the content overlay SDK 210. For instance, the additional content and services retrieved by the one or more third-party content providers 214 and/or one or more third-party service providers 216 may include data for users to purchase Rams/Patriots/NFL merchandise, and data regarding statistics of both teams and/or particular players. In this regard, the content overlay SDK 210 may be configured to associate the merchandise data with a first selectable button of the interactive content menu, and the statistics data with a second selectable button of the interactive content menu.

In another embodiment, the interactive engagement platform 212 may include one or more user databases 222 configured to log and/or store new audience members associated with the one or more user devices 202. In this regard, the user databases 222 may serve as a device or "registration servers" in some respects. In another embodiment, user database 222 may include a filter server/crowd engine configured to manage a global audience population and randomize or filter the global audience population based on various parameters into a specific and limited audience population for delivery or display of content or services in the content overlay SDK in the mobile content provider application 204. The interactive engagement platform 212 may further include at least one analytics system 232 configured to monitor and store data related to audience-member activities while viewing video content. As it is used herein, the terms "users" or "audience members" may be regarded as referring to individuals viewing video content through the one or more user devices 202, and may be used interchangeably. In another embodiment, the interactive engagement platform 212 includes a messaging system 228 configured to receive, manage, and disseminate messages and invitations between and among audience members. As noted previously herein, the messaging system 228 may include one or more dedicated messaging servers, or may additionally/alternatively include a messaging system provided by an outside source (e.g., Telegram, FB Messenger, Agora, and the like). In another embodiment, one or more media servers, including an advertising system 230, may manage receipt and dissemination of various media and data related to various video content, including advertising, which may be associated with one or more selectable buttons of the interactive overlay content generates on the user devices 202.

As noted previously herein, an API ingestion server 220 may be configured to communicatively couple, via the one or more third-party APIs 208, to one or more third-party content providers 214 and/or one or more third-party service providers 216. An API matching server 224 may be configured to pair the one or more third-party APIs 208 to an event ID extracted from the event scheduling data in the event scheduling server. This event ID is then used to pair the content and services of one or more third-party content providers 214 and/or one or more third-party service providers 216 in the content overlay SDK 210 to the associated video stream in the content provider app 204. In this regard, the interactive engagement platform 212 may provide interactive information, entertainment and social engagement experiences relating to video content received from a plurality of third-party content providers 214/third-party service providers 216 across multiple mobile user devices 202. For example, the first group 201a of user devices 202a-202c may be viewing a first video program (Event 1), whereas the second group 201b and the third group 201c are viewing second and third video programs, respectively (Event 2 and Event 3). Events 1, 2, and 3 may each include individually distinct video content. Accordingly, the interactive content overlay system 200 including interactive engagement platform 212 may be configured to interactive information, entertainment and social engagement experiences tailored for specific audiences, specific events/programs, content providers, and the like.

Accordingly, this permits the interactive engagement platform 212 architecture to function with multiple partners producing and/or making available in their mobile video content providing application (content provider apps 204) multiple live and on-demand videos concurrently. For example, the National Football League ("NFL") and its rights holders can provide football game content having multiple, distinct implementations of the interactive content overlay produced on the graphical user interfaces of user devices 202 viewing the Chicago Bears/Green Bay Packers game. Meanwhile, individuals viewing the Dallas Cowboys/Washington Redskins game on the Fox Sports mobile application would be able to simultaneously view content in the interactive content overlay pertaining to the Dallas Cowboys/Washington Redskins game.

Additionally, Fox Sports could customize the interactive content overlay generated on the graphical user interface to provide a distinct experience for different games. This may include unique content, unique functionality, or unique advertising. For example, Fox Sports may sell advertising rights for the Bears/Packers game to Coca-Cola ("Coke"), and may further sell the advertising rights for the Cowboys/Redskins game to Pepsi that is occurring at the same time. In this regard, advertising provided through the interactive content overlay generated by the interactive engagement platform 212 may be particular to the video program being viewed on each particular user device 202.

It is noted herein that the one or more third-party content providers 214 and the one or more third-party service providers 216 may generally and collectively be referred to as "one or more third-party providers 214, 216."

It is further noted herein that the configuration of system 200 shown and described in FIG. 1B is not to be regarded as limiting, unless noted otherwise herein. In this regard, it is contemplated herein that various steps of functions shown and described as being carried out by one component of system 200 may additionally and/or alternatively be carried out by another component of system 200. For example, while the retrieval of supplemental content (supplemental data payloads) is shown and described as being carried out by the one or more servers of the interactive engagement platform 212 (e.g., one or more interactive engagement platform servers), this may additionally and/or alternatively be carried out by the one or more video content servers 206, user devices 202, and the like.

Figure 2:
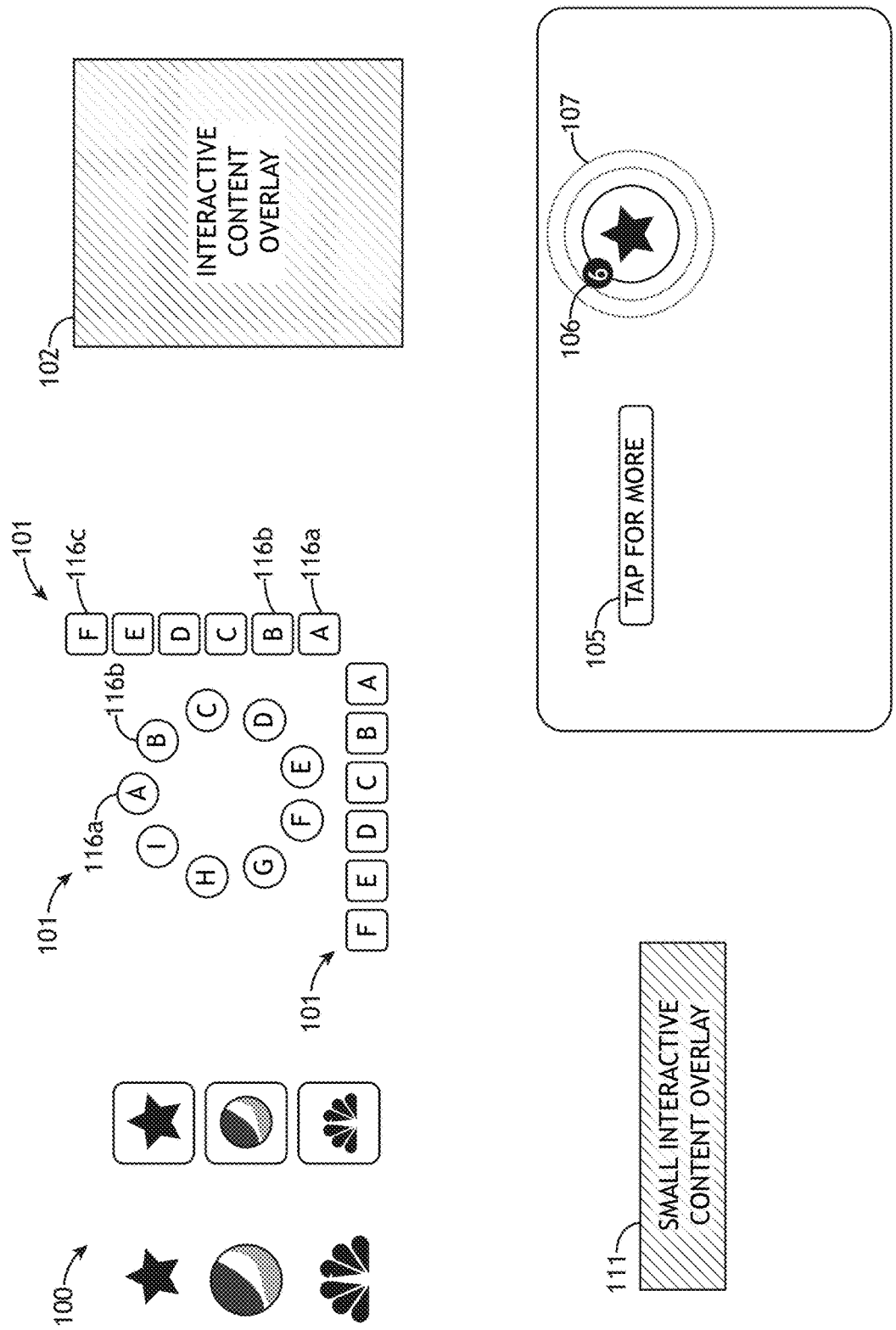
FIG. 2 illustrates various structures of an interactive content overlay for a graphical user interface, in accordance with one or more embodiments of the present disclosure.
Figure 3A:
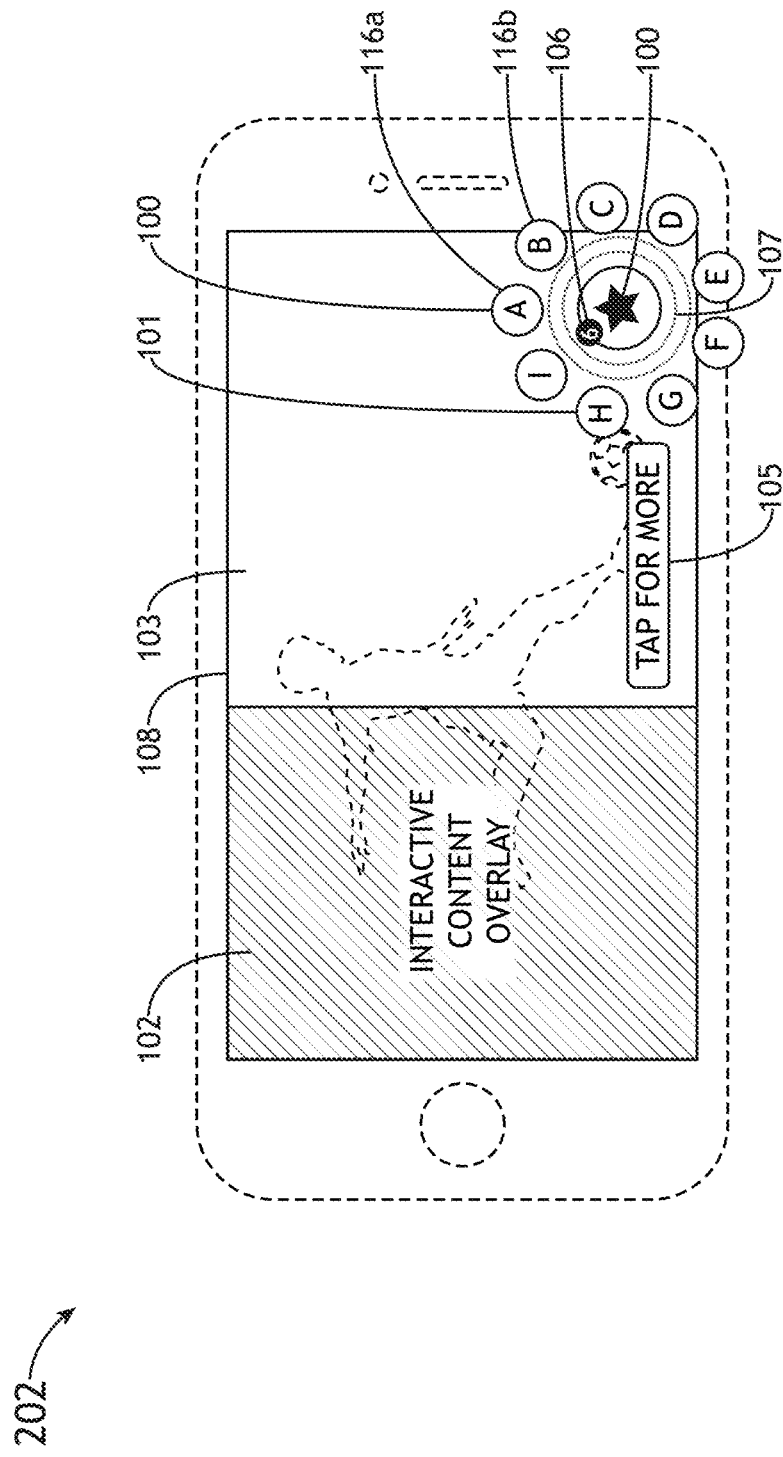
FIGS. 3A-3D illustrate an interactive content overlay on a graphical user interface of a user device in a landscape orientation, in accordance with one or more embodiments of the present disclosure.
Figure 3B:
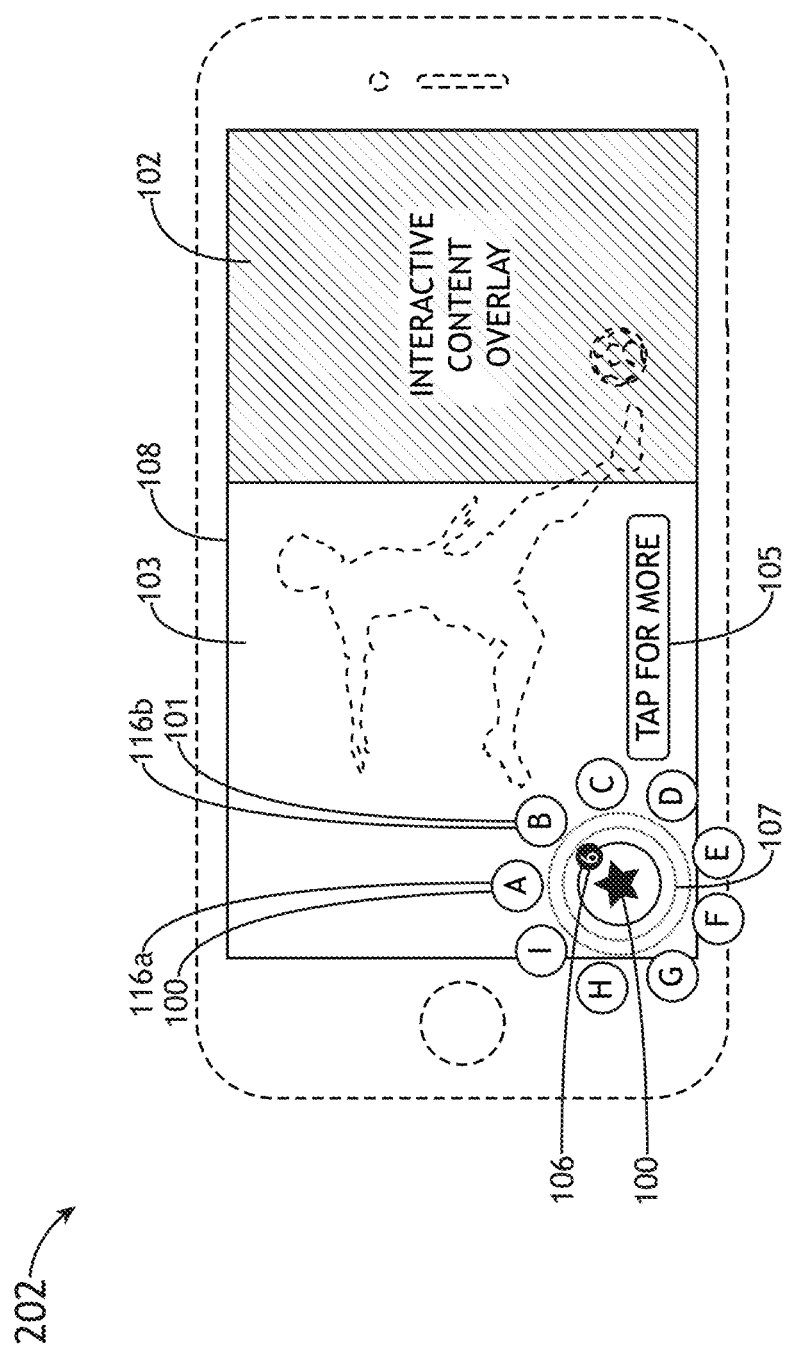
Figure 3C:
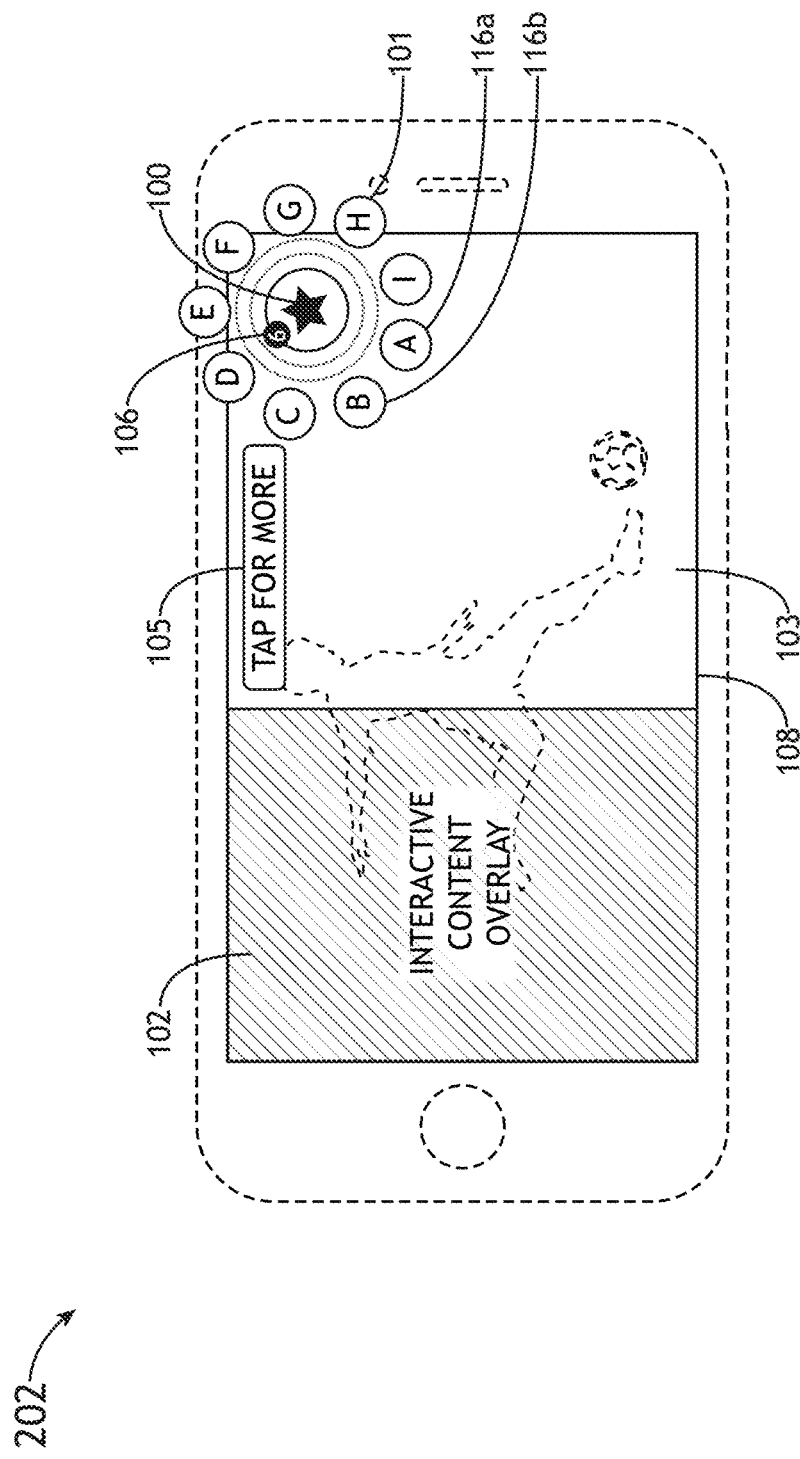
Figure 3D:
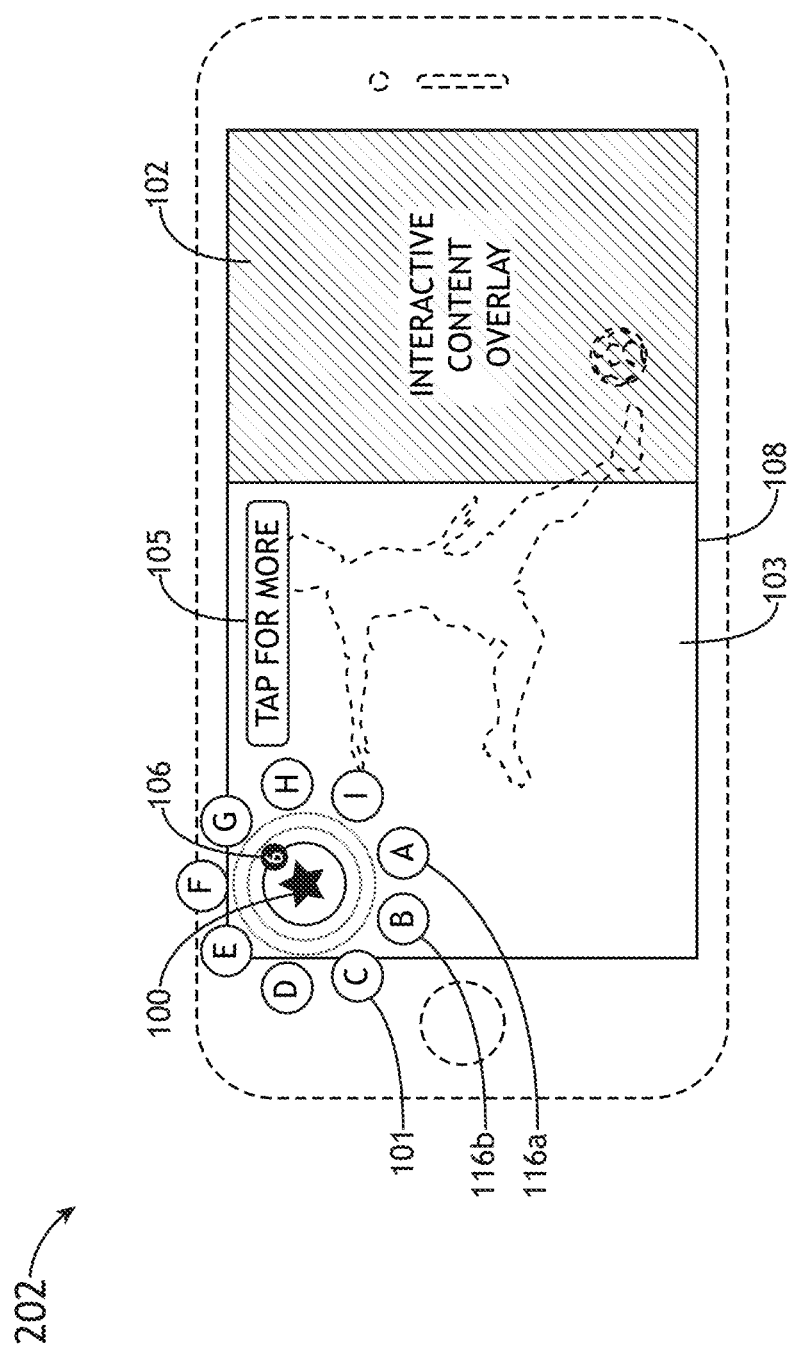

FIG. 2 illustrates various structures of an interactive content overlay for a graphical user interface, in accordance with one or more embodiments of the present disclosure.

As noted previously herein, the interactive engagement platform 212 of the interactive content overlay system 200 may be configured to generate an interactive content overlay on the graphical user interfaces of the one or more user devices 202. As shown in FIG. 2, an interactive content overlay may include, but is not limited to, a menu-launch button 100, a submenu button set 101 including one or more selectable buttons 116, an interactive content overlay window 102, a small interactive content overlay window 111, and tooltips 105.

In one embodiment, a menu-launch button 200 may be customized to appear as the logo of the media partner, advertiser, team insignia or other preferred mark. This may be similar to the watermark-like logos that often appear on video content, which may cause the menu-launch button 200 to appear integrated within the video program displayed on a user device 202. The submenu button set 101 including one or more selectable buttons 116 may be opened/expanded upon selection of the menu-launch button 200. As shown in FIG. 2, the submenu button set 101 may be configured in a number of configurations, including a circular configuration, a linear-vertical configuration, and a linear-horizontal configuration. As noted previously herein, the interactive engagement platform 212 may be configured to associate data retrieved from third-party providers 214, 216 with the one or more selectable buttons 116 of the submenu button set 101. Additional data associated with the one or more selectable buttons may be associated with the video program being viewed, and may include, but is not limited to, messaging, third-party social media, news articles, statistics, e-commerce/transaction capabilities, merchandising, advertising, and the like.

In one embodiment, the interactive content overlay window 102 and/or the small interactive content overlay window 111 may be configured to display additional content related to the video program being viewed. In another embodiment, the interactive content overlay window 102 and/or the small interactive content overlay window 111 may be partially transparent. It is noted herein that providing for partially transparent overlay content may allow a user to view additional content/data related to the video program being viewed, while not completely obstructing the video program.

In another embodiment, a menu-launch button 100 may include tooltips 105, one or more notifications 106, and/or animations 107. The tooltips 105, notifications 106, and/or animations 107 may include attention-grabbing temporary configured to notify and encourage the users/audience members to interact with the menu-launch button 100. tooltips 105, notifications 106, and/or animations 107 may be configured to make the end-user aware of new content available within the interactive content overlay provided by the interactive engagement platform 212. For example, tooltips 105, notifications 106, and/or animations 107 may inform a user of significant activity, such as the presence of a VIP in the interactive engagement platform, the availability of a new poll or contest provided in the interactive content overlay, or new activity related to content or services provided by third-parties via APIs, such as scoring updates related to the user's daily fantasy team, a specific wager placed on a game, or a flash sale on a game jersey. The interactive content overlay on the graphical user interface may include various other controls, buttons, and functionality described herein for enabling the end-user to engage with the interactive content overlay provided by the interactive engagement platform 212.

FIGS. 3A-3D illustrate an interactive content overlay on a graphical user interface 108 of a user device 202 a landscape orientation, in accordance with one or more embodiments of the present disclosure.

As shown in FIGS. 3A-3D, when a video program 103 is viewed in the horizontal or landscape (full-screen) mode in a video content provider app 204 on a user device 202, the menu-launch button 100 may be located in a corner of the graphical user interface 108 over the video program 103. Attention-grabbing temporary displays (e.g., tooltips 105, notifications 106, animations 107, and the like) may be added to the interactive content overlay generated on the graphical user interface 108, which may be displayed near/around the menu-launch button 100 in order to notify and encourage the end-user/audience to interact with the menu-launch button 100.

Upon selection/interaction with the menu-launch button 100, a submenu button set 101 including one or more selectable buttons 116 may appear in the same area where the menu-launch button 100 is located. Although a rotatable, the submenu button set 101 is illustrated in FIGS. 3A-3D as a circular formation of selectable buttons 116, it should be understood that various other types of submenu button set 101 orientations/configurations may be used without departing from the spirit and scope of the present disclosure. For example, the submenu button set 101 may be arranged in linear fashion which is displayed, in a row, horizontally along the bottom of the graphical user interface 108. By way of another example, the submenu button set 101 may be arranged in a linear fashion which is displayed, in a column, vertically along an edge of the graphical user interface 108. In one embodiment, the interactive content overlay window 102 may be generated upon selection of a selectable button 116a-106n. The interactive content overlay window 102 may be located on an opposite side of the graphical user interface 108 from where the menu-launch button 100 and submenu button set 101 is/was located. The interactive content overlay window 102 may employ a semi-transparent background/window to permit the video program 103 to be partially visible in the background. In another embodiment, the interactive content overlay window 102 in the horizontal, full-screen mode may be closed/collapsed when the end-user selects/presses any part of the graphical user interface 108 which does not contain the content overlay window 102.

It is noted herein that other arrangements/configurations of the interactive content overlay and/or submenu button set 101 may be used without departing from the spirit and scope of the present disclosure. The interactive content overlay is further shown and described in U.S. patent application Ser. No. 29/686,931 filed on Apr. 9, 2019, entitled DISPLAY SCREEN OR PORTION THEREOF WITH TRANSITIONAL GRAPHICAL USER INTERFACE FOR AN INTERACTIVE CONTENT OVERLAY, and U.S. patent application Ser. No. 29/706,035 filed on Sep. 17, 2019, entitled DISPLAY SCREEN OR PORTION THEREOF WITH TRANSITIONAL GRAPHICAL USER INTERFACE FOR AN INTERACTIVE CONTENT OVERLAY, both of which are incorporated herein by reference in the entirety.

FIGS. 4A-4E illustrate an interactive content overlay on a graphical user interface 108 of a user device 202 in a vertical/portrait orientation, in accordance with one or more embodiments of the present disclosure.

As shown in FIGS. 4A-4E, when a video program 103 (e.g., video content provided by the one or more video provider servers 206) is viewed in the vertical/portrait mode, the menu-launch button 100 may be located anywhere on the graphical user interface 108. For example, the menu-launch button 100 may be positioned at the bottom left, bottom right, or bottom center of the graphical user interface.

Figure 4A:
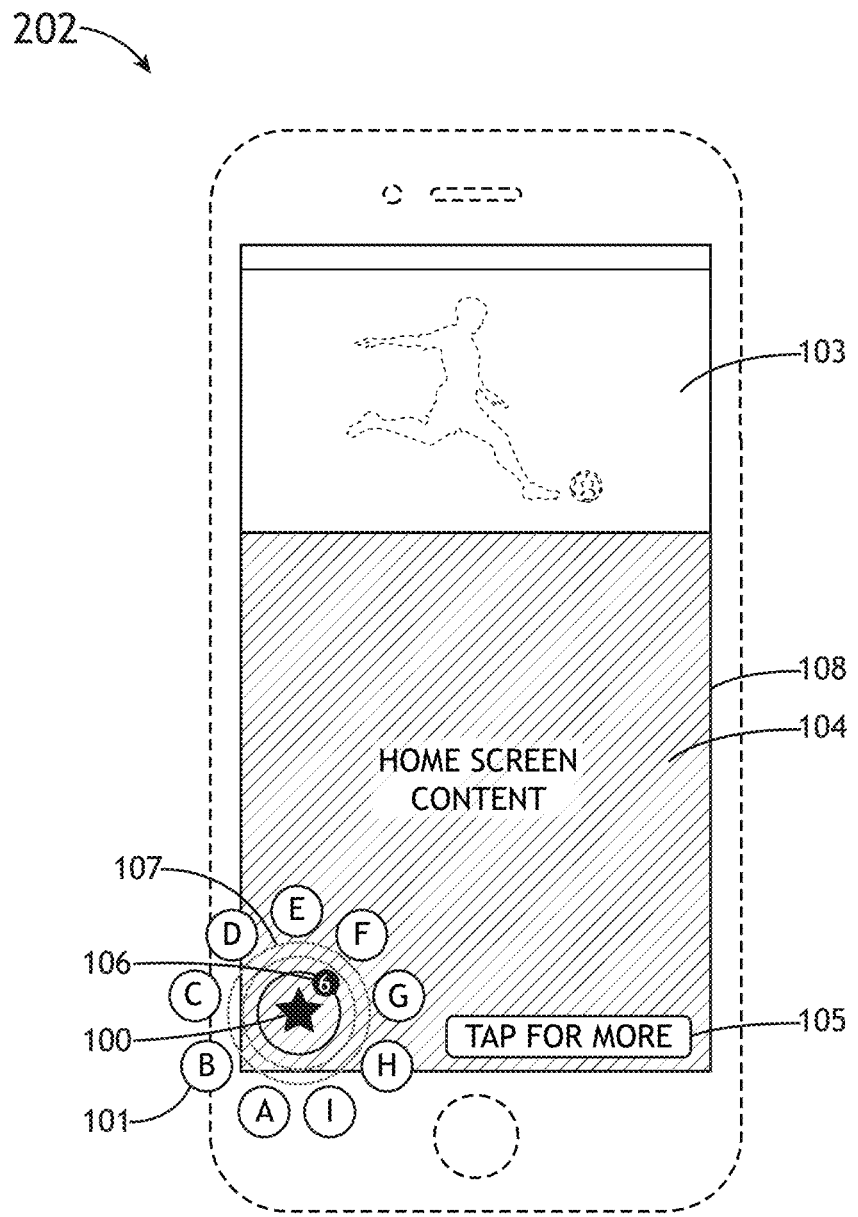
FIGS. 4A-4E illustrate an interactive content overlay on a graphical user interface of a user device in a portrait orientation, in accordance with one or more embodiments of the present disclosure.
Figure 4B:
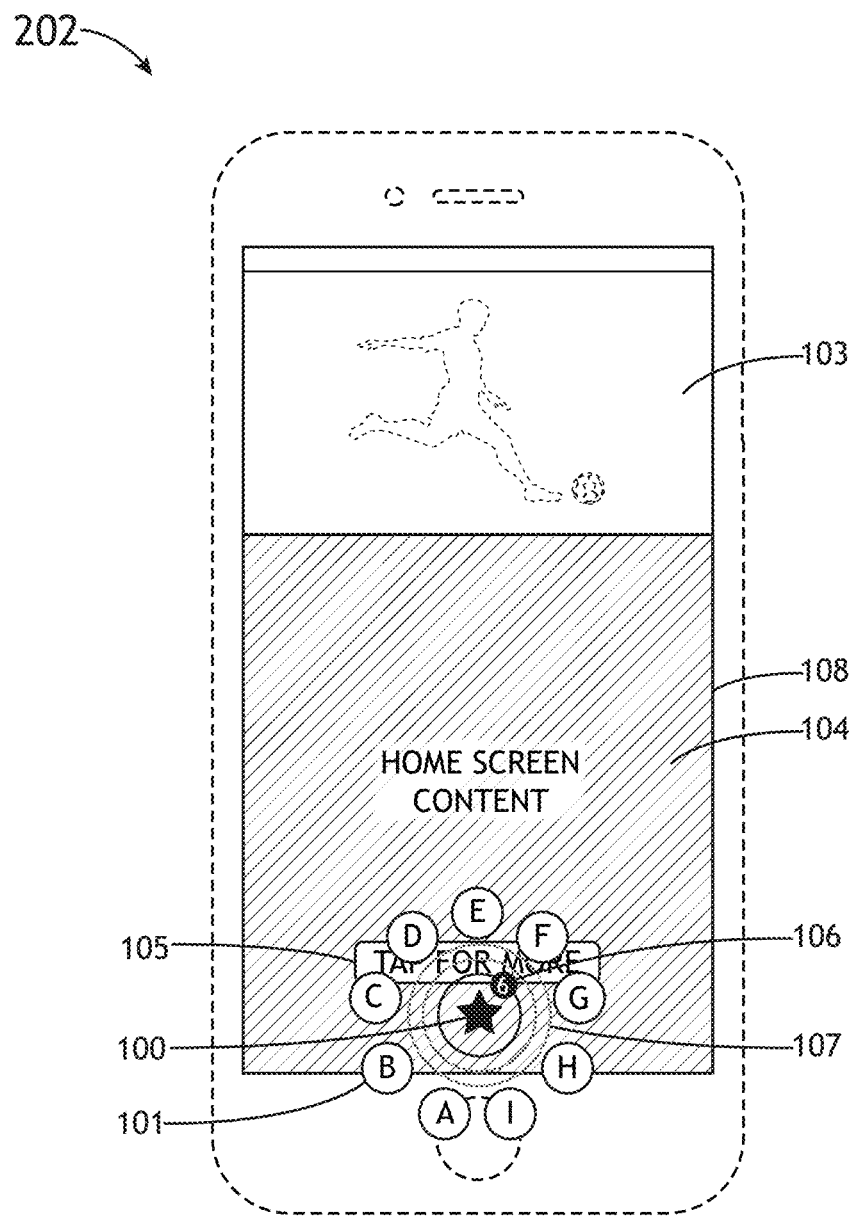
Figure 4C:
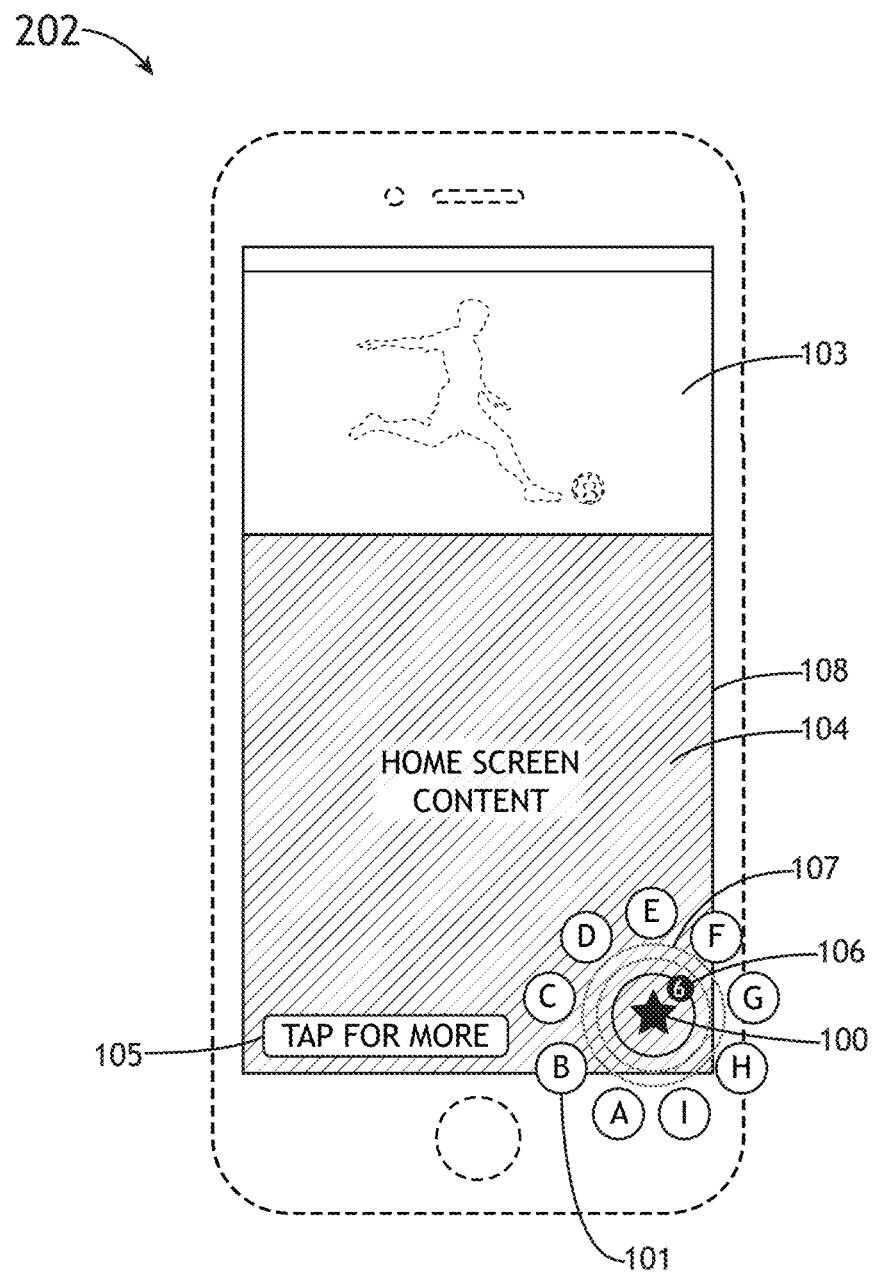

It is noted herein that content provider apps 204 often include a home page content window 104 configured to display informational content of the content provider app 204 to a user. For example, the ESPN app (content provider app 204) may include a home page content window 104 which may display to a user all the video programs 103 available to a user, and may allow a user to switch between a first ESPN video program 103a to a second ESPN video program 103b. As shown in FIGS. 4A-4C, the home page content window 104 may be located below the video program 103 being viewed. The home page content window 104 may be designated by a system administrator (via control panel 238 and admin server 236), and may include a pre-existing page/screen within the content provider app 204 or content provided by the interactive engagement platform 212. For example, the home page content window 104 may be configured to display an interactive globe/list depicting all of the end-users/audience members who are watching the same video content. In this regard, the home page content window 104 may be configured to display information/data provided by the one or more video provider servers 206 and/or the interactive engagement platform 212.

Figure 4D:
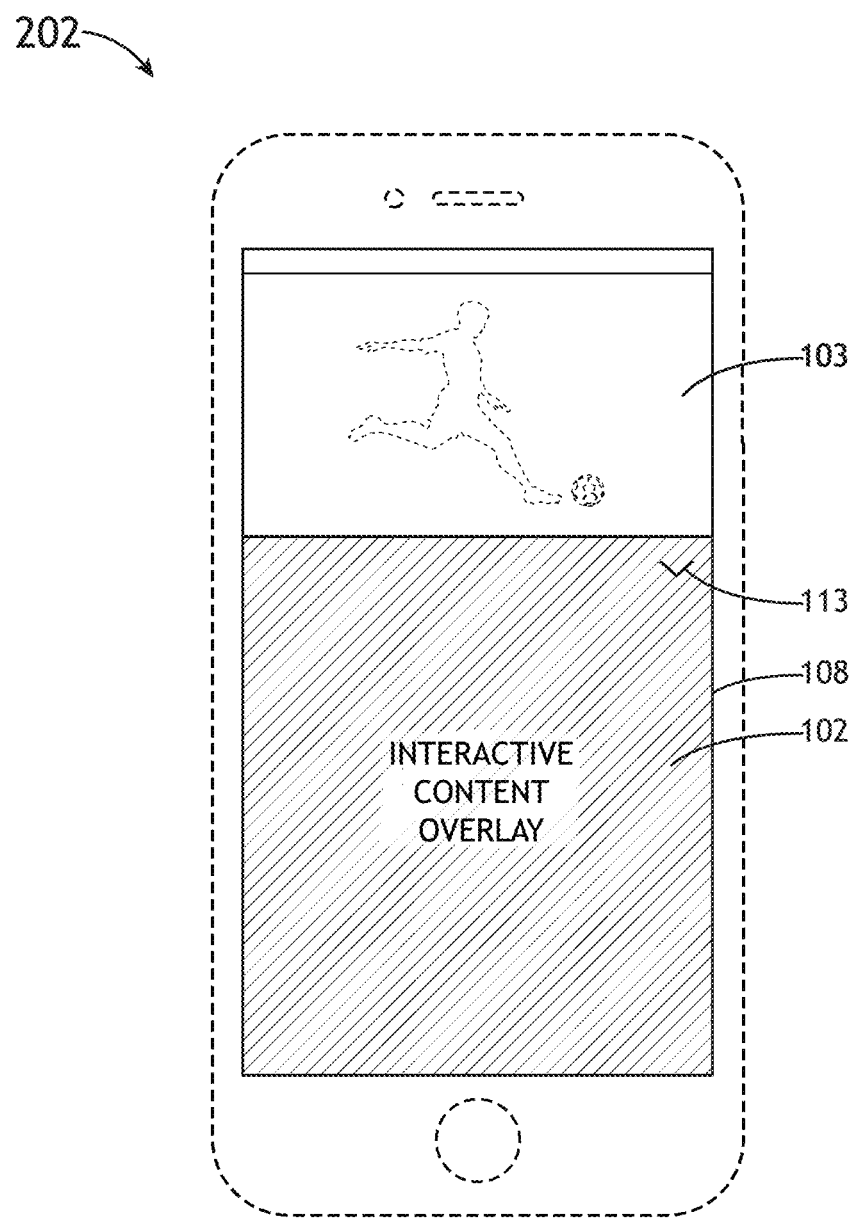
Figure 4E:
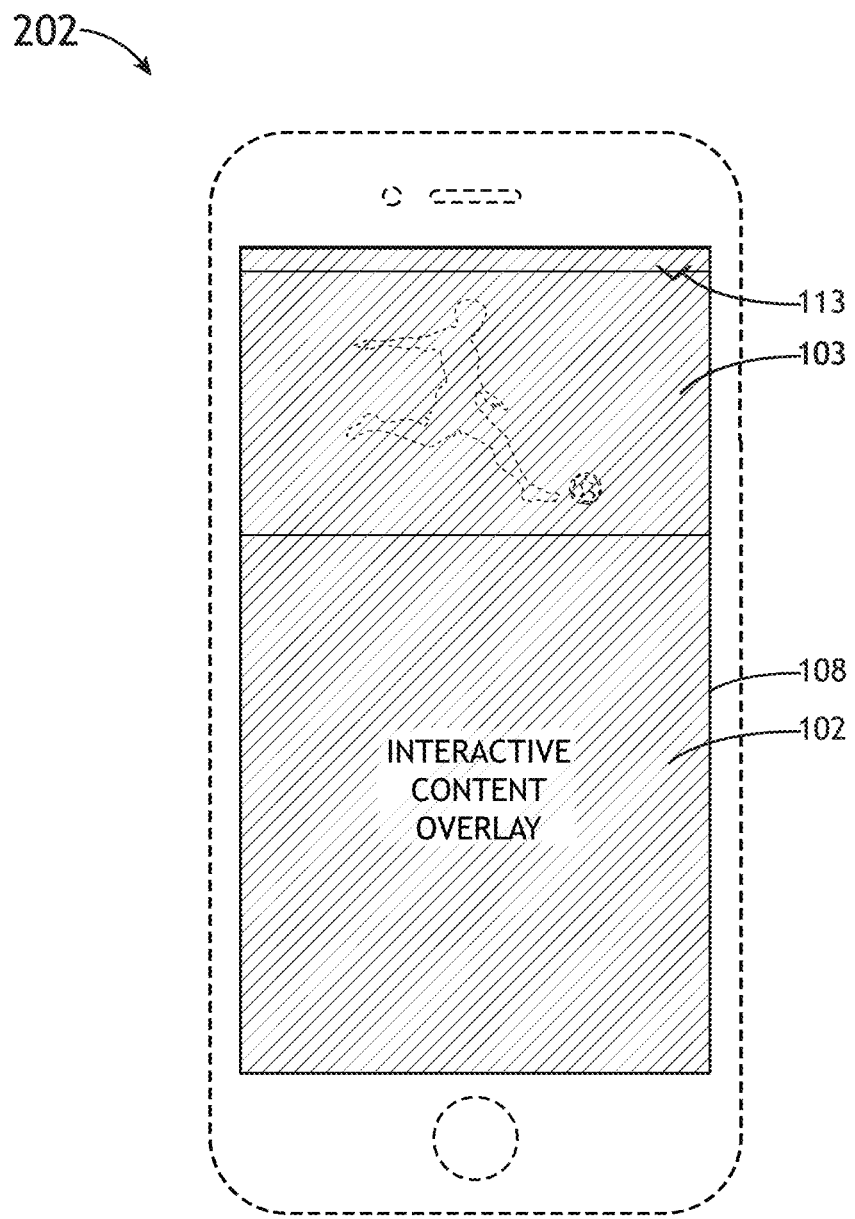

In one embodiment, upon selection of a selectable button 116 of the submenu button set 101, the interactive content overlay window 102 may be generated/appear. The interactive content overlay window 102 may be configured to display the additional data/information which was associated with the selected selectable button 116. In another embodiment, the interactive content overlay window 102 may appear over and replace the home page content window 104. In another embodiment, the interactive content overlay window 102 may be expanded and/or retracted. For example, as shown in FIGS. 4D and 4E, the interactive content overlay window 102 may be re-sized such that it is expanded and/or retracted. For instance, the interactive content overlay window 102 may be re-sized by "dragging" an edge of the interactive content overlay window 102. In another embodiment, the interactive content overlay window 102 may include a close button 113 configured to close the interactive content overlay window 102. In this regard, it is contemplated that the interactive content overlay window 102 may be minimized/closed upon selection of the close button 113 and/or upon selection of a portion of the graphical user interface 108 without the interactive content overlay window 102.

It is noted herein that the various drawings depict user devices 202 displaying the interactive content overlay in various configurations/orientations. For example, FIGS. 3A-3D illustrate user devices 202 in a landscape orientation, whereas FIGS. 4A-4D illustrate the user devices 202 in a portrait orientation. It is noted herein that any discussion regarding the interactive content overlay illustrated in the drawings may be regarded as applying to the user devices 202/interactive content overlay illustrated in any other drawing, unless noted otherwise herein.

Figure 5:
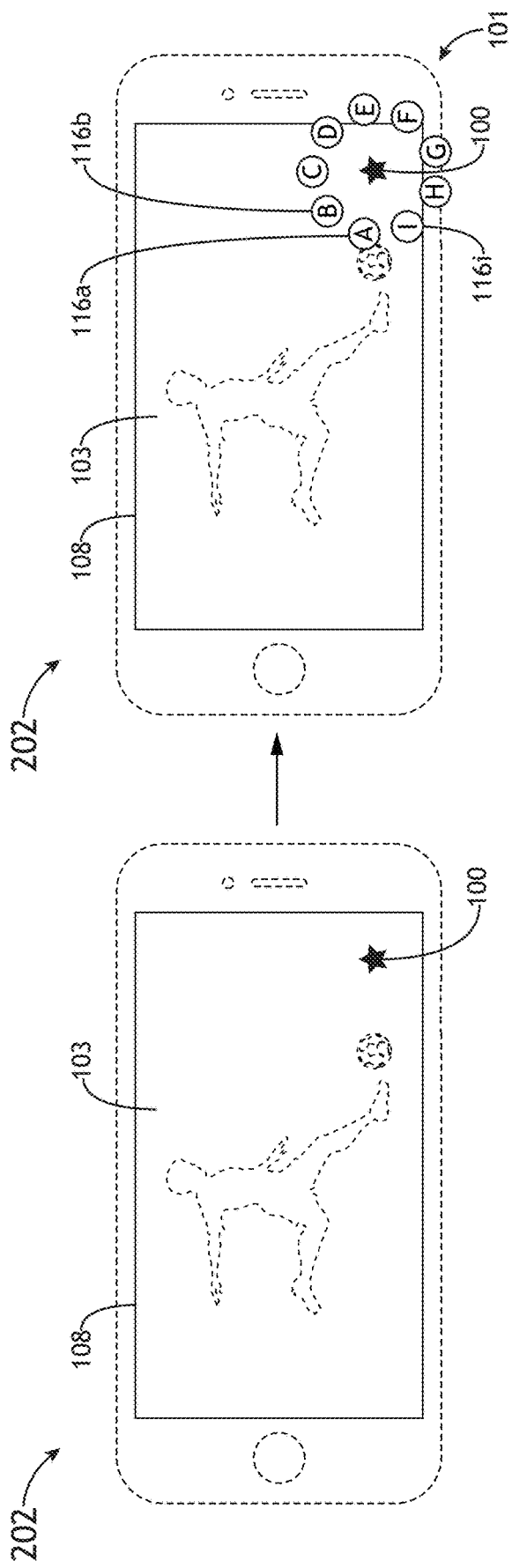
FIG. 5 illustrates a transition from a menu launch button to a menu of an interactive content overlay, in accordance with one or more embodiments of the present disclosure.

FIG. 5 illustrates a transition from a menu-launch button 100 to a submenu button set 101 of an interactive content overlay, in accordance with one or more embodiments of the present disclosure.

In one embodiment, when an end-user/audience member first views a video program 103 displayed by the content provider app 204 in the horizontal (full-screen) mode, the end-user will see the menu-launch button 100 located in a corner of the graphical user interface 108. The menu-launch button 100 may be displayed over the video program 103, as shown in FIG. 5. Upon selection of the menu-launch button 100, a menu 100 including circular set of selectable buttons 116a-116n may expand out from the menu-launch button 100. In one embodiment, the circular set of selectable buttons 116 encircle the menu-launch button 100. In one embodiment, only a sub-set of the selectable buttons 116 of the submenu button set 101 may be visible. For example, as shown in FIG. 5, selectable buttons 116a-116c may be fully visible within the graphical user interface 108, whereas selectable buttons 116d-116i may be off, or partially off, of the graphical user interface 108. In one embodiment, the submenu button set 101 of selectable buttons 116a-116i may be rotated clockwise and/or counter-clockwise in order to view each selectable button 116 within the graphical user interface 108. In another embodiment, should the end-user wish to close the submenu button set 101 without viewing an interactive content overlay window 102, the end-user may select the menu-launch button 100 and/or any part of the graphical user interface 108 (with the exception of the submenu button set 101) in order to collapse the submenu button set 101.

Figure 6:
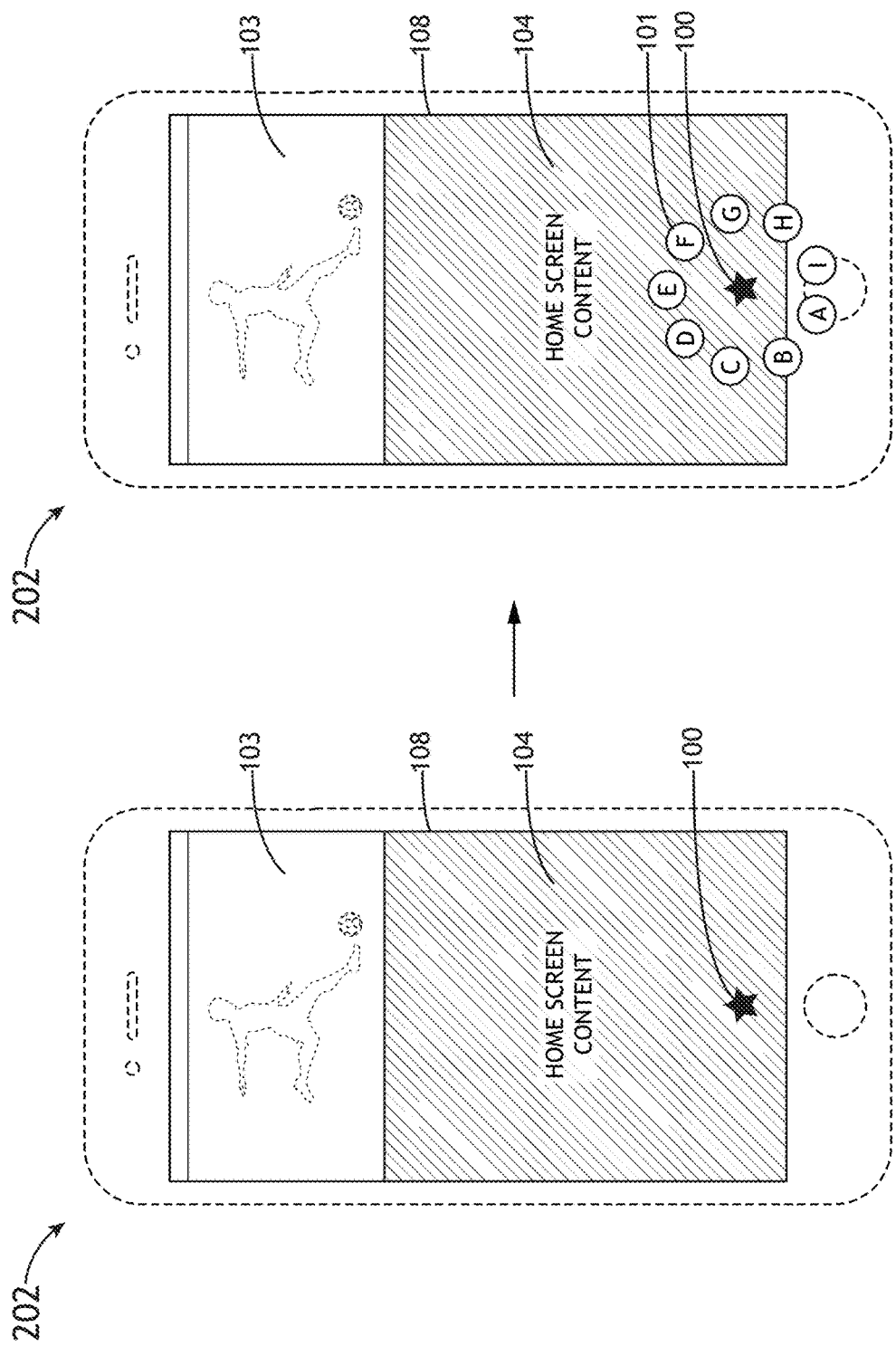
FIG. 6 illustrates a transition from a menu launch button to a menu of an interactive content overlay, in accordance with one or more embodiments of the present disclosure.

FIG. 6 illustrates a transition from a menu-launch button 100 to a submenu button set 101 of an interactive content overlay, in accordance with one or more embodiments of the present disclosure.

As shown previously herein, upon selection of the menu-launch button 100, a submenu button set 101 including a plurality of selectable buttons 116 may appear within the graphical user interface 108. As shown in FIG. 6, the menu-launch button 100 and/or the submenu button set 101 including the plurality of selectable buttons 116 may appear over, or on top of, the home page content window 104.

Figure 7:
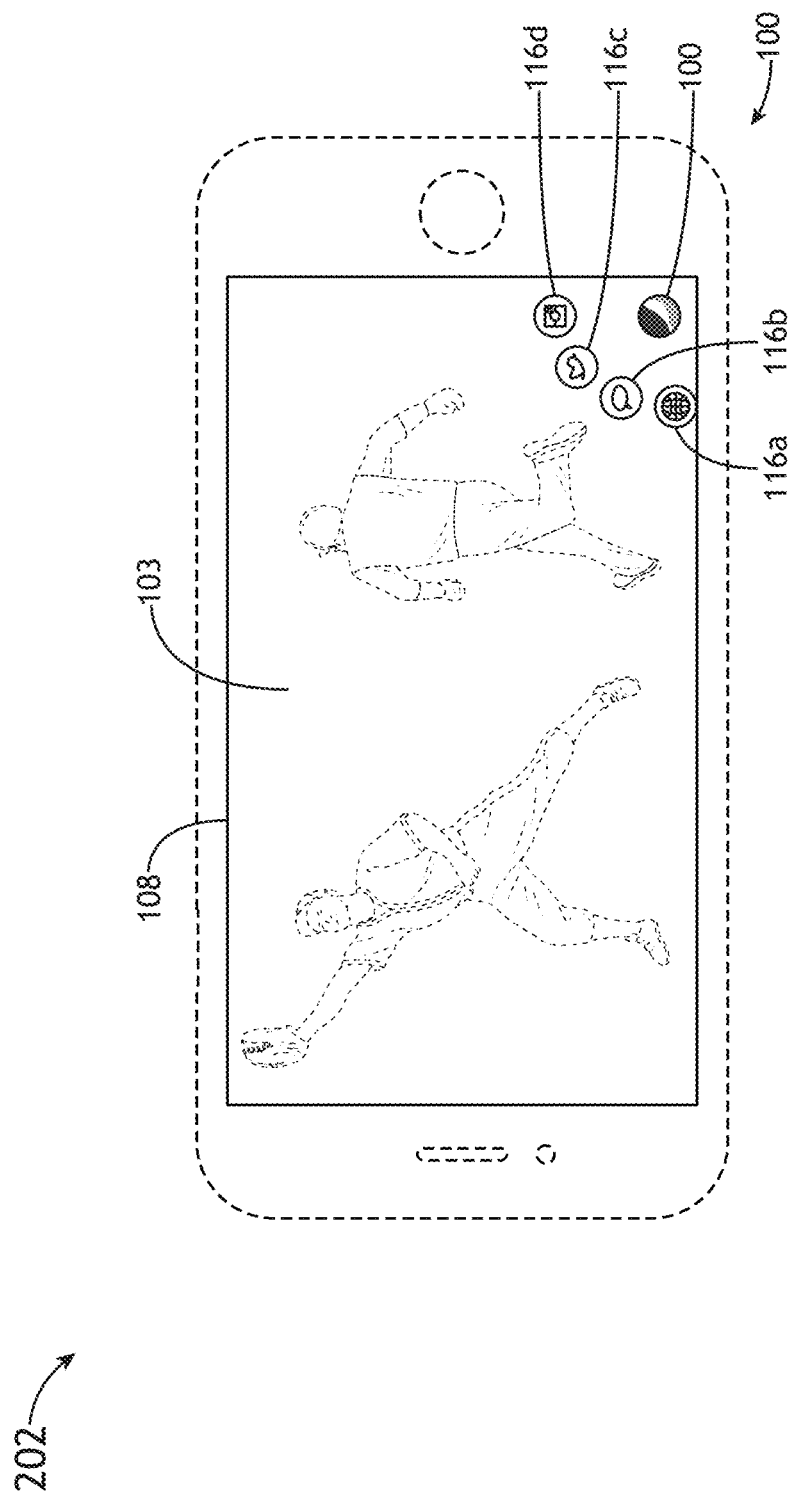
FIG. 7 illustrates a graphical user interface displaying a video program from a mobile video content provider app and an interactive content overlay menu, in accordance with one or more embodiments of the present disclosure.
Figure 8:
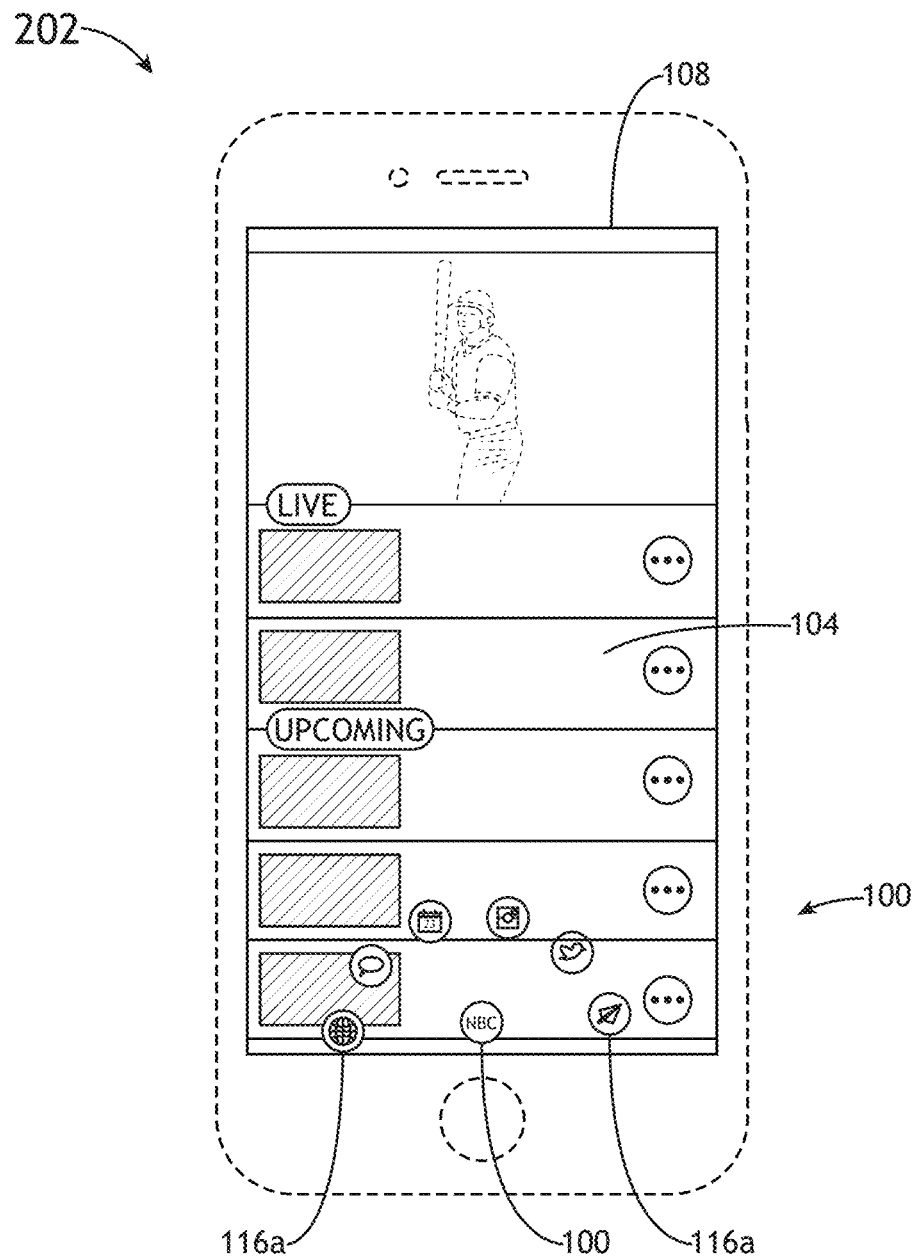
FIG. 8 illustrates a graphical user interface displaying a video program from a mobile video content provider app and an interactive content overlay menu, in accordance with one or more embodiments of the present disclosure.

FIGS. 7-8 illustrate graphical user interfaces 108 displaying a video program 103 from a mobile video content provider app 204 and an interactive content overlay, in accordance with one or more embodiments of the present disclosure. In particular, FIG. 7 illustrates an interactive content overlay displayed on a user device 202 in a landscape orientation, and FIG. 8 illustrates an interactive content overlay displayed on a user device 202 in a portrait orientation over client app content (e.g., video program selector, scores, schedule, etc.)

As shown in FIGS. 7 and 8, a video program may include sporting events, such as a football games, basketball games, soccer matches, Olympic events, and the like, as well as concerts, news and traditional cable and television programming. The menu-launch button 100 may be placed near the edge or corner of the graphical user interface 108 of the user device 202. In one embodiment, as shown in FIGS. 2, 7, and 8, the menu-launch button 100 may be branded with a sponsor or partner logo. In the horizontal (full-screen) mode, the menu-launch button 100 may be displayed over the video program 103 as shown in FIG. 7. Conversely, while in the vertical mode, the menu-launch button 100 may be displayed over the home page content window 104 with the video program 103 the top of the graphical user interface 108. In embodiments, only a partial view of the full submenu button set 101 including a plurality of selectable buttons 116 may be visible at any one time.

It is contemplated herein that selectable buttons 116 of the submenu button set 101 may be associated with third-party content providers 214, third-party service providers 216, and the like. For example, as shown in FIG. 7, a first selectable button 116a may be associated with third-party statistical data associated with the video content 103 (e.g., team website, league website, and the like), a second selectable button 116b may be associated with a messaging platform, a third selectable button 116c may be associated with a Twitter account associated with the video content 103 (e.g., team Twitter account, league Twitter account, player Twitter account, and the like), and a fourth selectable button 116 may be associated with betting odds associated with the video content 103 (e.g., favorites to win, over/under, prop bet opportunities, and the like). It is noted herein that selection of a selectable button 116 may generate an interactive content overlay 102 which includes a list of options which meet the criteria for the associated content. For example, upon selection of the third selectable button 116c associated with Twitter pages, the routing/load balancer server 218 may generate an interactive content overlay window 102 which includes a list of Twitter accounts related to the video content 103 including, but not limited to, Team 1 Twitter account, Team 2 Twitter account, Player 1 Twitter account, Player 2 Twitter account, Coach 1 Twitter account, Coach 2 Twitter account, and the like. In one embodiment, the list may be sorted and/or filtered by user preference, viewing history, relevance, and the like.

In another embodiment, as shown in FIGS. 7 and 8, a selectable button 116 of the submenu button set 101 may be associated with a messaging service within the interactive content overlay. For example, as selection of the second selectable button 116c in FIG. 7 may cause the graphical user interface 108 to generate an interactive content overlay window 102 displaying messages from other audience members. The messaging interactive content overlay window 102 may include a message input interface to send messages to other audience members. This may allow the end-user to engage in multiple messaging conversations with various audience members, private one-to-one messages, private group messages of three or more people, and public discussions that all end-users viewing that particular video program 103 are viewing. Additionally, the graphical user interface 108 may incorporate third-party social media messages, statistics, betting odds, polls, and advertising into the message display, intermingled with the user generated messages.

For example, upon selection of the selectable button 116c, a user may be able to input a message to send to a group of other users within a message input interface of the interactive content overlay window 102. After submitting the message, the message may be transmitted from the content provider app 204 to the routing/load balancer server 218. Messages may be transmitted via the messaging system 228 of the interactive engagement platform 212 and/or a third-party messaging service. In this regard, the routing/load balancer server 218 may then call and/or interface with an API of a third-party messaging service (e.g., third-party service provider 216) in order to process the message, including receiving the message, identifying recipients, and the like. In this regard, selection of the selectable button 116c may allow a user to message and/or interact with other users via a third-party messaging service (e.g., third-party service provider 216). In additional and/or alternative embodiment, messaging services may be handled by a messaging server 228. For example, the messaging server 228 may receive the message, identify the recipients of the message, and cause the routing/load balancer server 218 to transmit the message to the user devices 202 associated with the end-user recipients. Group messages may be transmitted to other users watching the same video program in the same media company app on their respective devices (e.g., a group of users watching an NFL game on the FoxSports app), and/or to other users viewing a different video program in the same media company app on their respective devices (e.g., a user watching an NFL game and a different user watching an NBA game), and/or to other users viewing a different video program in a different media company app (e.g., a user watching an NFL game in the CBS Sports app may transmit a message to a user watching an MLB game in the FoxSports app).

It is noted herein that a wide range of data/information and functionality may be associated with the one or more selectable buttons 116 including, but not limited to, a merchandise store, a ticket schedule with purchase capability, statistics, polls, social media posts, sports betting and more. The information/data content and functionality associated with each selectable button 116, as well as their associated interactive content overlay windows 102, may be managed by a control panel 238 and/or an admin server 236 of the interactive engagement platform 212. In this regard, an administrator may determine various content and format parameters, including the location and appearance of the menu-launch button 100, sponsors, advertising, composition of the submenu button set 101 including number of selectable buttons 116, and the like. Furthermore, the admin server 236 may determine which content related to the video program 103 is associated with each selectable button 116.

Figure 9:
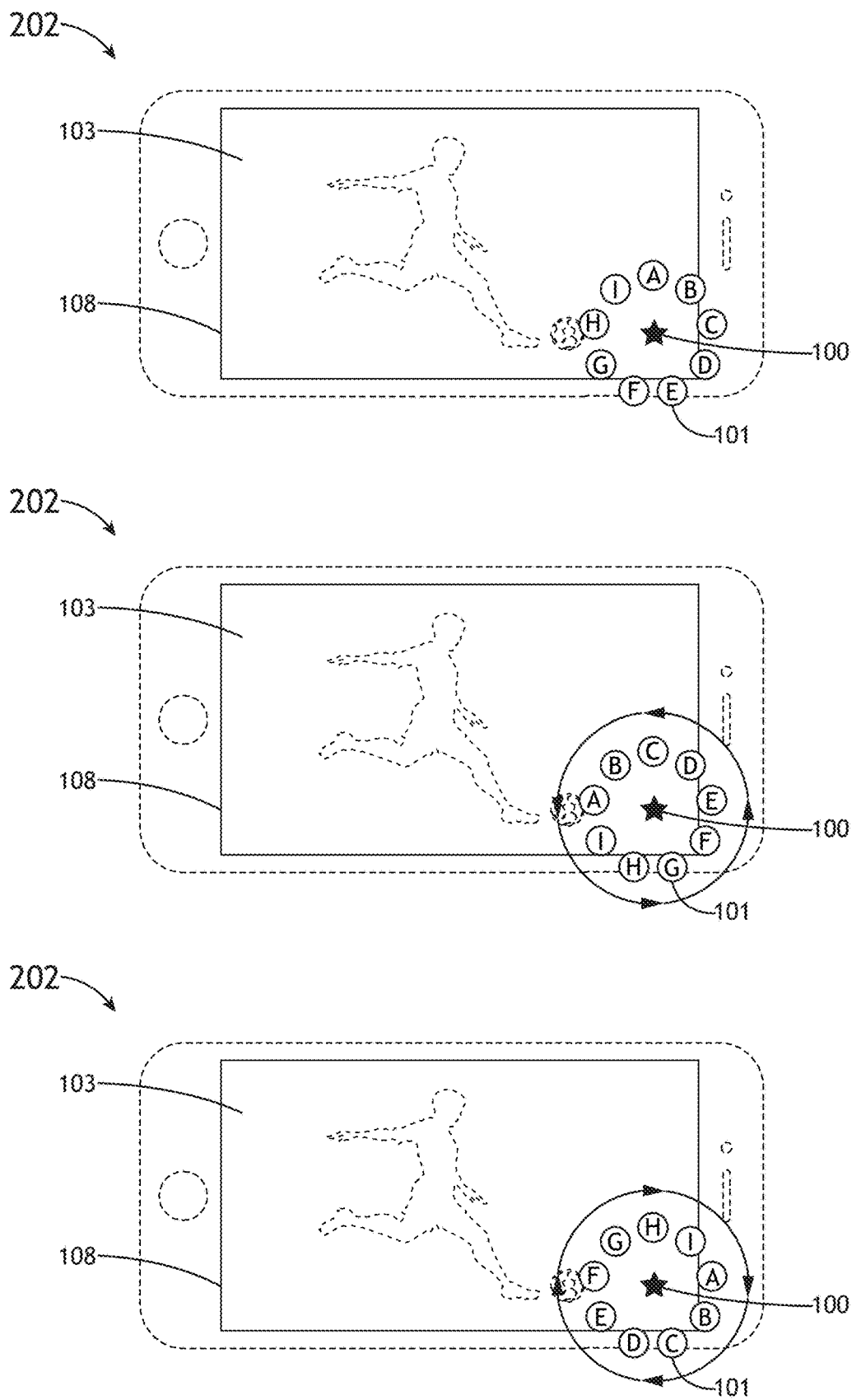
FIG. 9 illustrates an interactive content overlay menu in a circular form factor, in accordance with one or more embodiments of the present disclosure.

FIG. 9 illustrates an interactive content overlay submenu button set 101 in a circular form factor, in accordance with one or more embodiments of the present disclosure.

As noted previously herein, the routing/load balancer server 218 of the interactive engagement platform 212 may be configured to generate one or more control signals configured to cause the graphical user interface 108 of a user device 202 to display an interactive content overlay. In one embodiment, the interactive content overlay includes a menu-launch button 100 and a submenu button set 101 including a plurality of selectable buttons 101 arranged in a circular formation/form factor. For example, as shown in FIG. 9, the submenu button set 101 may include a plurality of selectable buttons 116 arranged in a circular formation in the lower right hand corner of a graphical user interface 108 of a user device 202.

In one embodiment, the submenu button set 101 arranged in a circular formation may be rotated clockwise and/or counterclockwise such that the end-user/audience may see the full range of selectable buttons 116 for engagement and interaction related to the video program 103. Although a rotatable, circular formation of selectable buttons 116 is shown, it should be understood that various other types of submenu button set 101 button design formations and animations can be used in accordance with various embodiments discussed herein. This may be better understood with reference to FIG. 10.

Figure 10:
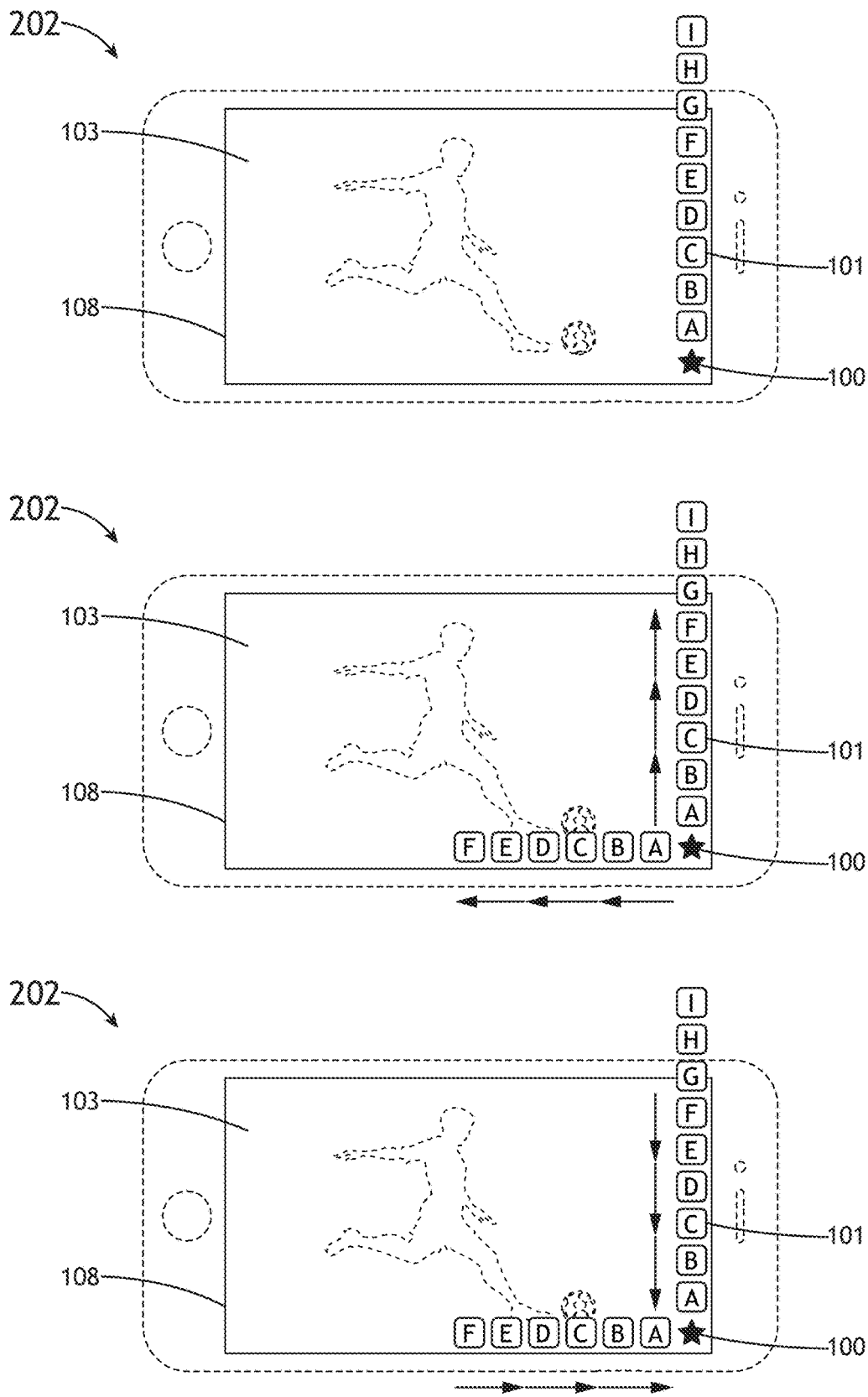
FIG. 10 illustrates an interactive content overlay menu in a linear form factor, in accordance with one or more embodiments of the present disclosure.

FIG. 10 illustrates an interactive content overlay submenu button set 101 in a linear form factor, in accordance with one or more embodiments of the present disclosure.

In one embodiment, the submenu button set 101 may include a plurality of selectable buttons 116 arranged in a linear formation/form factor. For example, as shown in FIG. 10, the submenu button set 101 may include a plurality of selectable buttons 116 arranged in a vertical and/or horizontal linear arrangement. In embodiments where the plurality of selectable buttons 116 are arranged in a vertical linear arrangement, the submenu button set 101 may be translated up and/or down such that the end-user/audience member may see the full range of selectable buttons 116 for engagement and interaction related to the video program 103. Conversely, in embodiments where the plurality of selectable buttons 116 are arranged in a horizontal linear arrangement, the submenu button set 101 may be translated left and/or right such that the end-user/audience member may see the full range of selectable buttons 116 for engagement and interaction related to the video program 103. As noted previously herein, only a subset of the selectable buttons 116 of the submenu button set 101 arranged in a horizontal/vertical linear arrangement may be visible at one time, and the ability to translate the submenu button set 101 may allow for a user to view and/or interact with each of the selectable buttons 116.

Figure 11A:
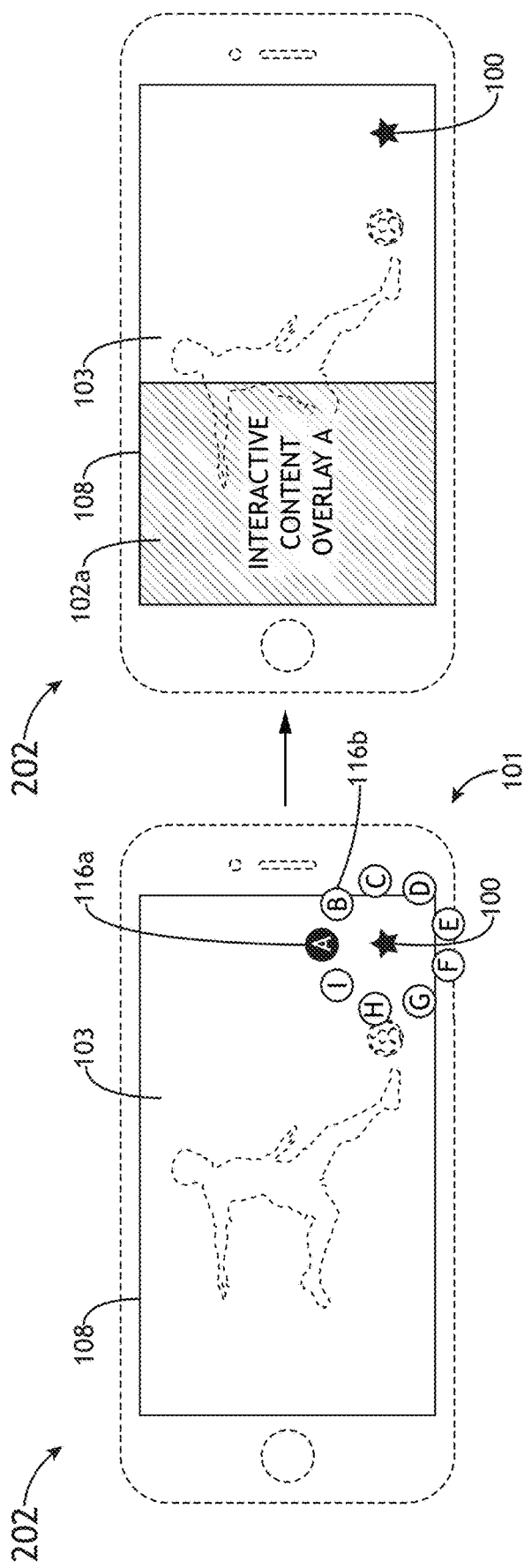
FIGS. 11A-11B illustrate a transition between selection of a selectable button of the interactive content overlay menu and an interactive content overlay window, in accordance with one or more embodiments of the present disclosure.
Figure 11B:
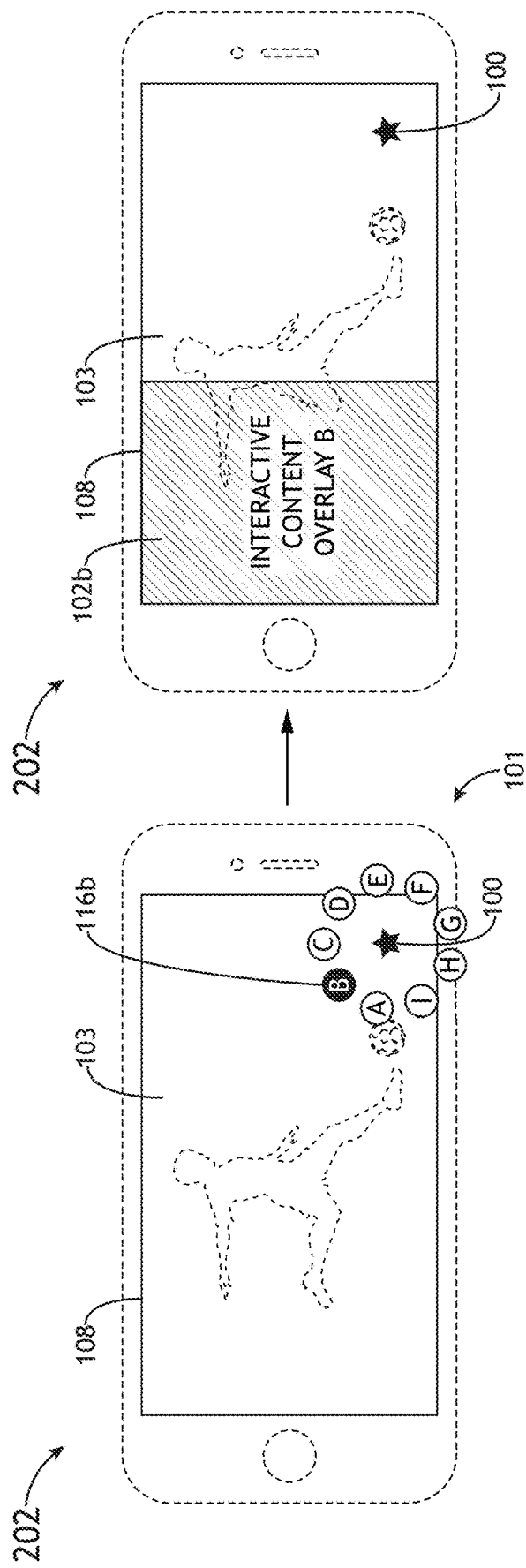
Figure 12A:
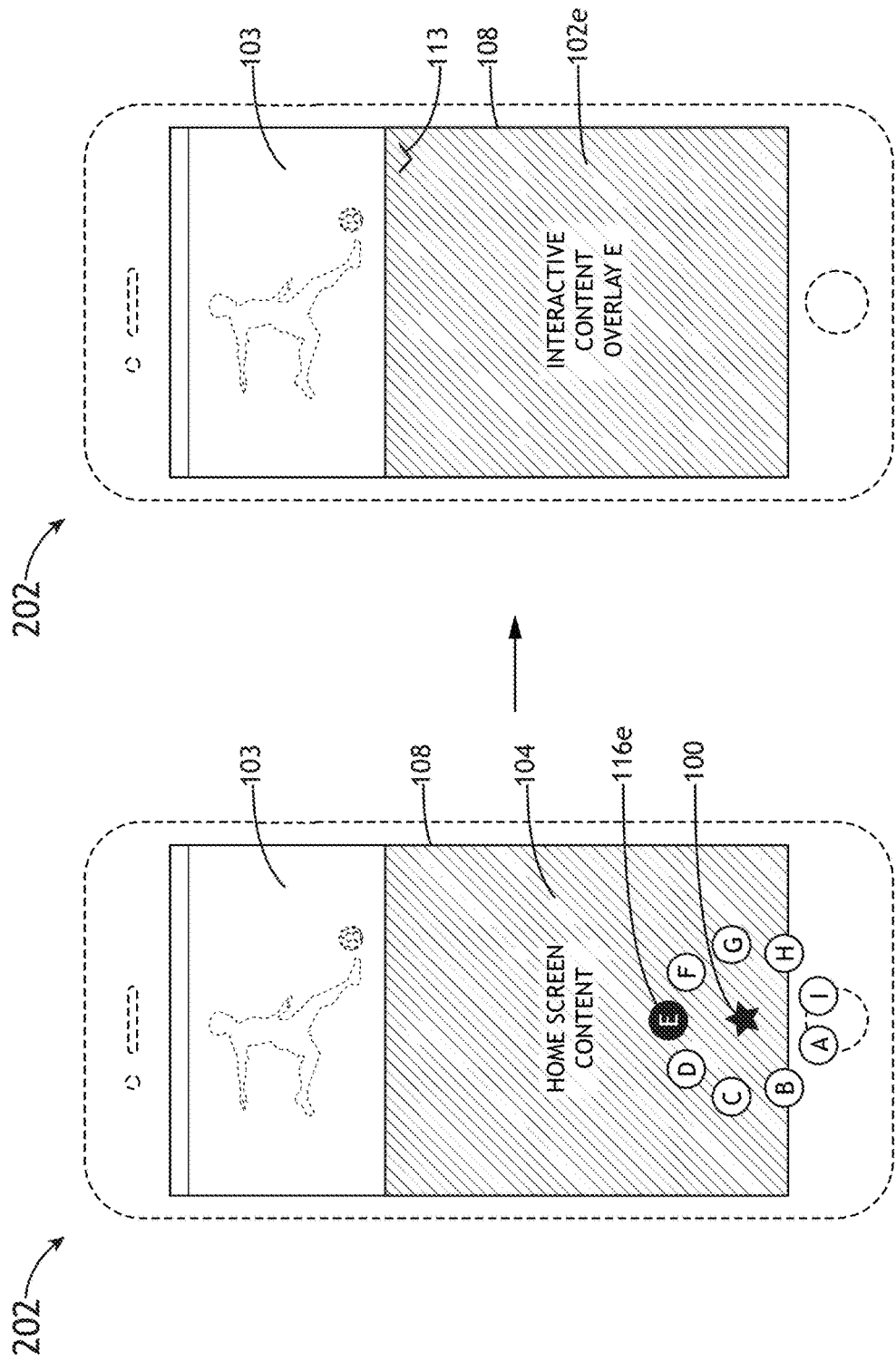
FIGS. 12A-12B illustrate transitions between selection of a selectable button of the interactive content overlay menu and an interactive content overlay window, in accordance with one or more embodiments of the present disclosure.
Figure 12B:
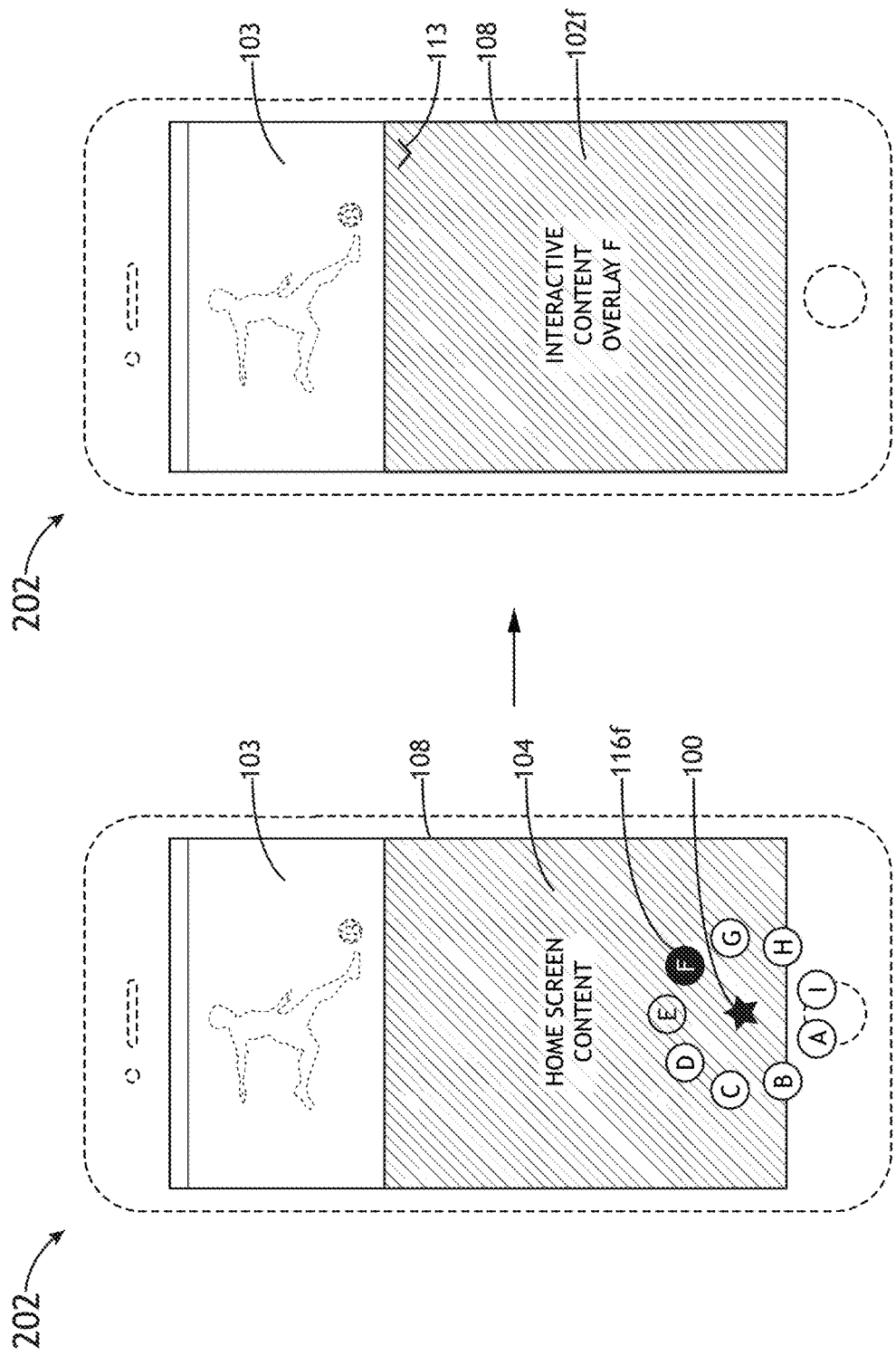

FIGS. 11A-11B illustrate a transition between selection of a selectable button 116 of the interactive content overlay submenu button set 101 and an interactive content overlay window 102, in accordance with one or more embodiments of the present disclosure. Similarly, FIGS. 12A-12B illustrate transitions between selection of a selectable button 116 of the interactive content overlay submenu button set 101 and an interactive content overlay window 102, in accordance with one or more embodiments of the present disclosure.

As noted previously herein, the routing/load balancer server 218 of the interactive engagement platform 212 may be configured to generate one or more control signals configured to cause the graphical user interface 108 of a user device 202 to display an interactive content overlay. In another embodiment, the routing/load balancer server 218 may be configured to display associated additional content related to a video program 103 with the selectable buttons 116 of the submenu button set 101. For example, where the video program 103 includes a musical performance, additional content retrieved by the interactive engagement platform may include, but is not limited to, a social media profile of a performer, a tour schedule of a performer, and the like. In this regard, the routing/load balancer server 218 may be configured to associate the social media profile of the performer with a first selectable button 116a, and may be further configured to associate the tour schedule of the performer with a second selectable button 116b.

By way of another example, as shown in FIGS. 11A and 11B, the video program 103 may include a soccer match. The routing/load balancer server 218 may be configured to extract metadata of the video program stream 205, and retrieve additional data/information/content associated with the metadata/video program. The routing/load balancer server 218 may then be configured to associate a first set of additional content with a first selectable button 116a, and a second set of additional content with a second selectable button 116b, such that selection of the first selectable button 116a generates a first interactive content overlay window 102a, and selection of the second selectable button 116b generates a second interactive content overlay window 102b.

It is noted herein that selectable buttons 116 may be associated with information and functionality generated by the interactive engagement platform 212 such as messaging functionality, designated websites, third-party content providers 214, third-party service providers 216, and the like. For example, by selecting a selectable button 112 in the submenu button set 101 for Twitter, the graphical user interface 108 may display Twitter posts (Tweets) associated with the video program 103 in the interactive content overlay window 102. Accordingly, the end-user may be able to view and/or interact with the Twitter information and data associated with the video program 103 while simultaneously viewing the video program 103. For instance, with Twitter posts, the end-user may be able to view larger versions of posted pictures, select/press links in Tweets, view links opened in a web browser contained within the interactive content overlay window 102 within the graphical user interface 108, and the like. Continuing with the same example, the interactive content overlay window 102 may allow and/or prompt a user to sign in to their own personal Twitter account such that the end-user may be able to Tweet and/or interact with the video program 103.

Figure 13A:
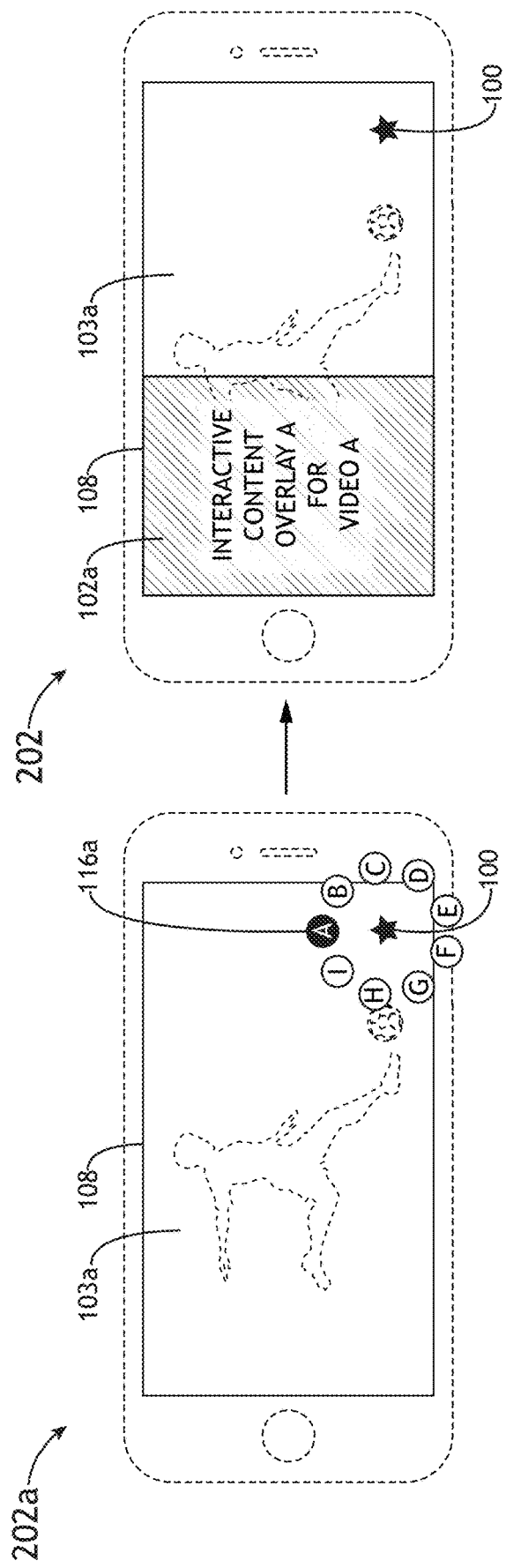
FIGS. 13A-13C illustrate transitions between selection of a selectable button of the interactive content overlay menu and an interactive content overlay window for a plurality of video contents, in accordance with one or more embodiments of the present disclosure.
Figure 13B:
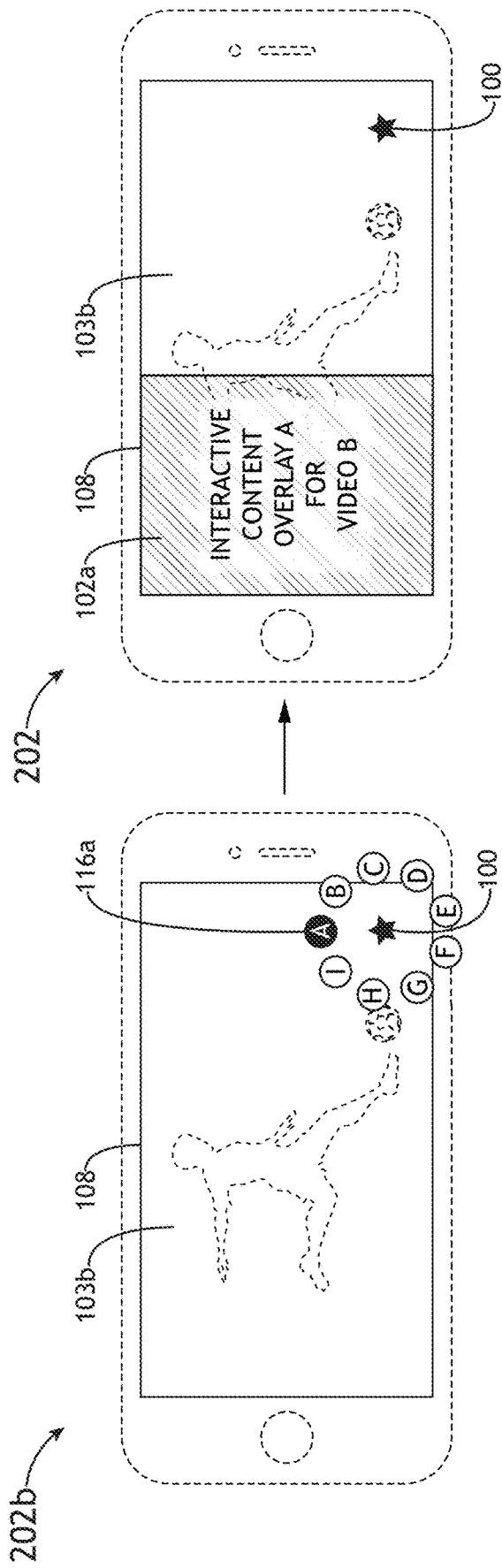
Figure 13C:
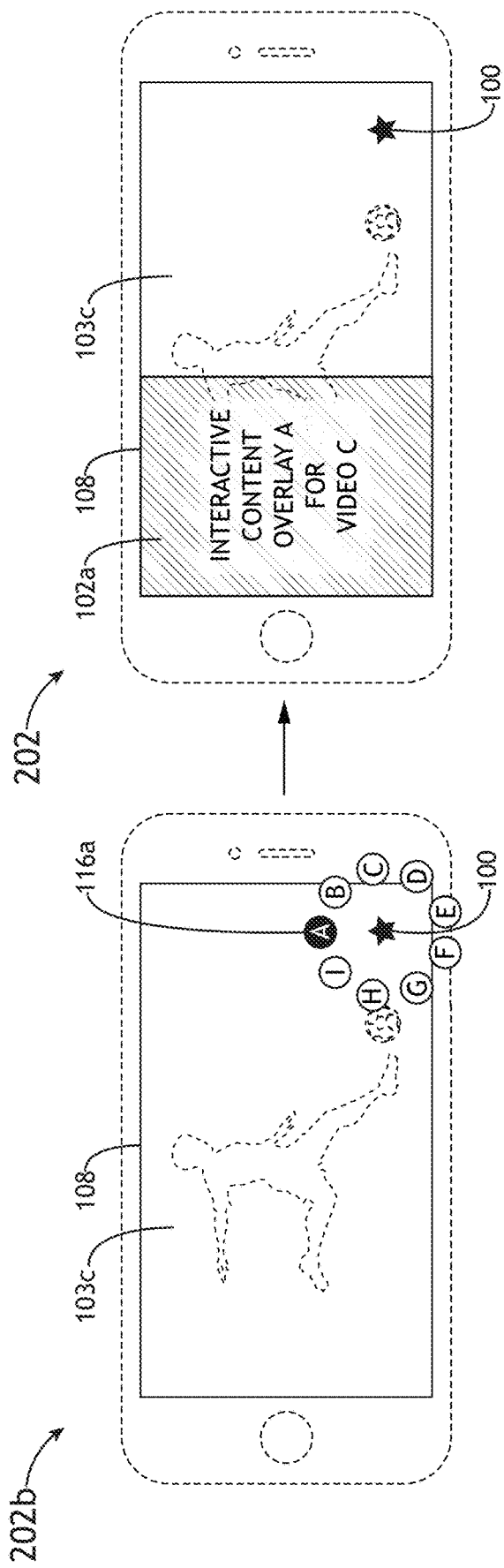

FIGS. 13A-13C illustrate transitions between selection of a selectable button of the interactive content overlay menu and an interactive content overlay window for a plurality of video contents, in accordance with one or more embodiments of the present disclosure.

In addition to providing administrative tools and functionality to manage the menu-launch button 100, the submenu button set 101, and the interactive content overlays (e.g., interactive content overlay window 102, small interactive content overlay 111), the interactive engagement platform 212 may also be configured to auto-detect, locate, and select data payload feeds/API feeds provided by third-party providers 214, 216 to display relevant content in the interactive content overlay window 102 based on user device 201 ID, the video program 103 event ID or the metadata that is associated with the audio/video content of the video program 103. It is noted herein that this functionality of the interactive engagement platform 212 may facilitate the association of video programs 103 and user devices 201 with large amounts of related additional information that can be presented in the interactive content overlay window 102 within the graphical user interface 108.

FIGS. 13A-13C, video program 103 (Video A) might be a soccer video, video program 103*b* (Video B) might be a basketball game, and video program 103*c* (Video C) might be a music video. In one embodiment, the interactive engagement platform 212 receives event data such as event date, start time, content type, media partners, etc. and Event IDs associated with the video program streams 205*a*, 205*b*, 205*c* of Video A, Video B and Video C, are received by the event scheduling system 226. The API matching system 224 then analyzes this event information and searches its existing API feeds and/or the web (via third-party APIs 208) for related information available from third-party content providers 214 and/or third-party service providers 216. API data feeds relevant to the video programs 103 are then accessed via the API ingestion system 220 and paired with the event ID and other relevant video program 103 information. The content overlay SDK 210 may then be configured to receive and read the Event IDs and their paired API data feeds sent via the routing/load balancer server 218 and present this information/data with their related video programs 103 in the content provider app by matching the event ID received from the event scheduling system 226 with the event ID of the video program streams 205 in the content provider app. For example, the routing/load balancer server 218 may transmit the data payloads and one or more control signals to the content provider app 204 via the content delivery SDK, wherein the one or more control signals are configured to associate the data payloads with small interactive content windows 111 and/or selectable buttons 116 of the submenu button set 101.

Figure 36:
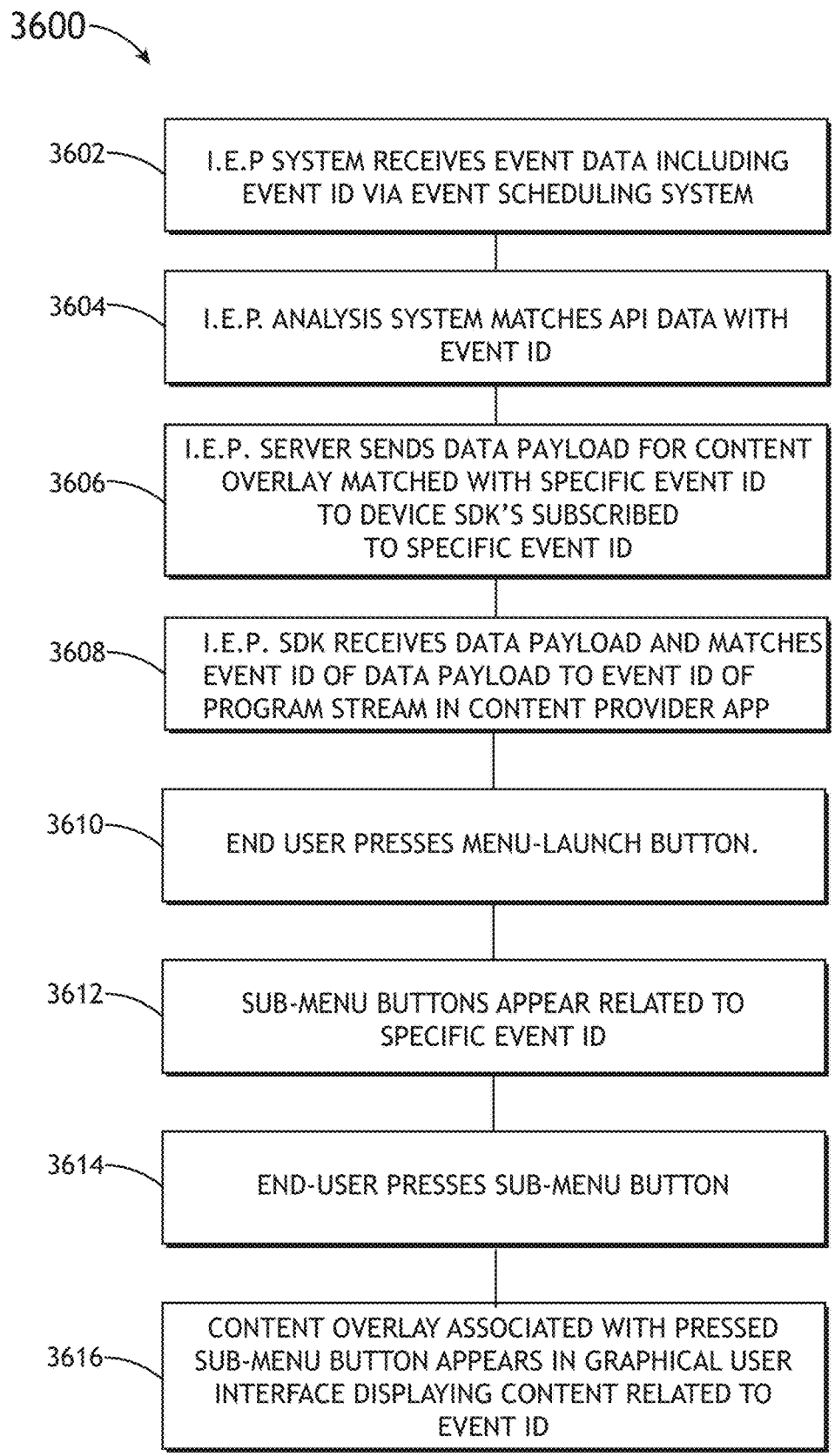
FIG. 36 illustrates a flowchart of a method for generating an interactive content overlay based on an event identifier (ID), in accordance with one or more embodiments of the present disclosure.
Figure 37:
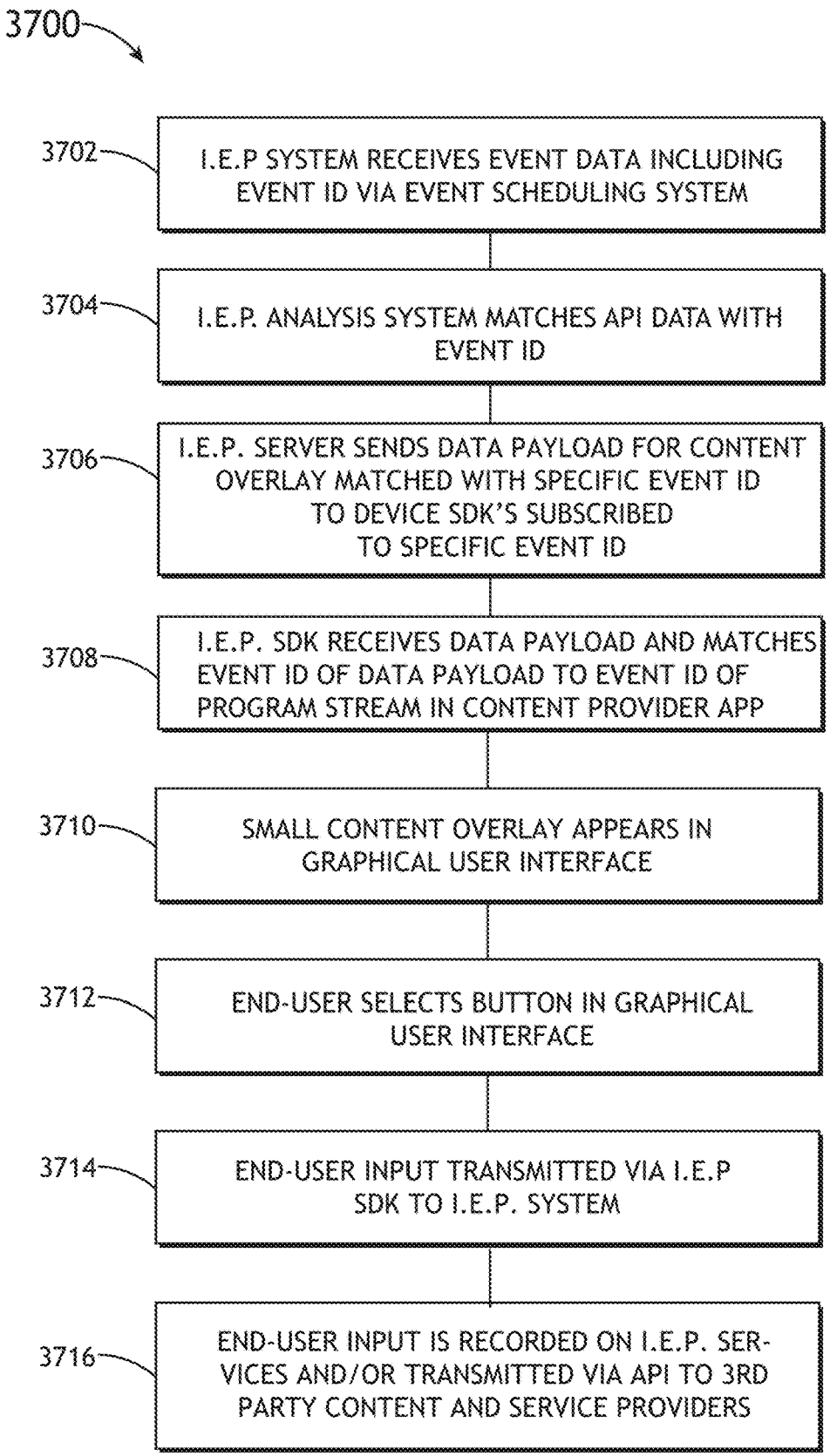
FIG. 37 illustrates a flowchart of a method for generating an interactive content overlay based on an event identifier (ID), in accordance with one or more embodiments of the present disclosure.

For example, as shown in FIG. 13A (and further shown and described in FIGS. 36-37), the interactive engagement platform 212 may receive event data such as event date, start time, content type, media partners, etc. and the Event ID associated with the Video A from the event scheduling system 226 and may be configured to identify Video A as being a sports video for soccer. Through the received event ID, the interactive engagement platform 212 may be configured to identify Video A as a soccer match with one or more soccer teams, and thus automatically search for third-party providers 214, 216 (via third-party APIs 208) for related information. In particular, the API ingestion system 220 of the interactive engagement platform 212 may be configured to retrieve additional information/data related to the soccer teams shown in the Video A. API ingestion system 220 may also search for other related information including, but no limited to, a) the Twitter and Instagram feeds associated with the soccer team(s) or soccer league, b) statistical data for the soccer player(s) and soccer team(s) in the video, the merchandise store data for soccer player(s), soccer team(s), and soccer league, and ticket information for the soccer team(s) or soccer league, and the like. The API ingestion system 220 would then be configured to receive this additional information/data as data payloads, and the ADK/API server 218 may be configured to transmit the data payloads to the content provider app 204 and associate the data payloads with various selectable buttons 116 of the submenu button set 101.

Continuing with the same example, the end-user is able to watch this particular soccer video (Video A) while simultaneously viewing the Twitter feed(s) for the soccer team(s) or soccer league, which is displayed in the interactive content overlay window 102 upon selection of a "Twitter" or "social media" selectable button within the submenu button set 101. Additionally, the end-user is able to watch the soccer video (video program 103) while simultaneously viewing the Instagram feed(s) for the soccer team(s) or soccer league, which is displayed in the interactive content overlay window 102 when the "Instagram" selectable button 116 is selected/pressed in the submenu button set 101. The user may also be able to watch the soccer video while simultaneously viewing statistics on the performance of soccer player(s) or soccer team(s) after selecting the "statistics" selectable button 116 in the submenu button set 101. Similarly, the user may also be able to watch the soccer video while simultaneously viewing merchandise of the soccer player(s), soccer team(s) or soccer league after selecting a "store" selectable button 116 within the submenu button set 101.

Referring to FIG. 13B, the system of the present disclosure would identify video program 103*b* (Video B) as being a sports video for basketball, associated with one or more basketball teams and/or a basketball league. As noted previously herein, the interactive engagement platform 212, through the received event data such as event date, start time, content type, media partners, etc. and the Event ID, may be configured to identify Video B as a basketball game with one or more basketball teams, and thus automatically search for third-party providers 214, 216 (via third-party APIs 208) for related information. In particular, the API ingestion system 220 of the interactive engagement platform 212 may be configured to retrieve additional information/data related to the basketball teams shown in the Video B. API ingestion system 220 may also search for other related information including, but no limited to, a) the Twitter and Instagram feeds associated with the basketball team(s) or basketball league, b) statistical data for the soccer player(s) and soccer team(s) in the video, the merchandise store data for basketball player(s), basketball team(s), and basketball league, and ticket information for the basketball team(s) or basketball league, and the like. The API ingestion system 220 would then be configured to receive this additional information/data as data payloads, and the ADK/API server 218 may be configured to transmit the data payloads to the content provider app 204 and associate the data payloads with various selectable buttons 116 of the submenu button set 101.

Continuing with the same example, the end-user is able to watch this particular basketball video (Video B) while simultaneously viewing the Twitter feed(s) for the basketball team(s) or basketball league, which is displayed in the interactive content overlay window 102 upon selection of a "Twitter" or "social media" selectable button within the submenu button set 101. Additionally, the end-user is able to watch the basketball video (video program 103*b*) while simultaneously viewing the Instagram feed(s) for the basketball team(s) or basketball league, which is displayed in the interactive content overlay window 102 when the "Instagram" selectable button 116 is selected/pressed in the submenu button set 101. The user may also be able to watch the basketball video while simultaneously viewing statistics on the performance of basketball player(s) or basketball team(s) after selecting the "statistics" selectable button 116 in the submenu button set 101. Similarly, the user may also be able to watch the basketball video while simultaneously viewing merchandise of the basketball player(s), basketball team(s) or basketball league after selecting a "store" selectable button 116 within the submenu button set 101.

Referring to FIG. 13C, the system of the present disclosure would identify video program 103c (Video C) as being a music video/performance for a particular artist. As noted previously herein, the interactive engagement platform 212, through the received event data such as event date, start time, content type, media partners, etc. and the Event ID, may be configured to identify Video C as a particular artist's music video/performance, and thus automatically search for third-party providers 214, 216 (via third-party APIs 208) for related information. In particular, the API ingestion system 220 may be configured to search for other related information including, but no limited to, artist-related merchandise, concert and ticket information for that artist's tour, links to iTunes, Amazon and Google Play to purchase that artist's songs and/or albums, and the like. The API ingestion system 220 would then be configured to receive this additional information/data as data payloads, and the ADK/API server 218 may be configured to transmit the data payloads to the content provider app 204 and associate the data payloads with various selectable buttons 116 of the submenu button set 101.

Continuing with the same example, the end-user is able to watch this particular music video/performance (Video C) while simultaneously viewing the Twitter feed(s) for the artist which is displayed in the interactive content overlay window 102 upon selection of a "Twitter" or "social media" selectable button within the submenu button set 101. Additionally, the end-user is able to watch the music video/performance (video program 103c) while simultaneously viewing the Instagram feed(s) for the artist, which is displayed in the interactive content overlay window 102 when the "Instagram" selectable button 116 is selected/pressed in the submenu button set 101. The user may also be able to watch the music video/performance while simultaneously viewing tickets and tour dates after selecting a "tickets" selectable button 116 in the submenu button set 101. Similarly, the user may also be able to watch the music video/performance while simultaneously viewing merchandise of the artist after selecting a "store" selectable button 116 within the submenu button set 101.

FIGS. 13A-13C, video program 103 (Video A) might be a soccer video, video program 103b (Video B) might be a basketball game, and video program 103c (Video C) might be a music video. In another embodiment of FIGS. 13A-13C, the content overlay SDK 210 is configured to receive and read the metadata associated with the video program streams 205a, 205b, 205c of Video A, Video B and Video C. The content overlay SDK 210 may then be configured to communicates this information to the interactive engagement platform 212. In another embodiment, the API ingestion system 220 of the interactive engagement platform 212 is configured to search its existing API feeds and/or the web (via third-party APIs 208) for related information available from third-party content providers 214 and/or third-party service providers 216. The interactive engagement platform 212 may then be configured to match the information/data received from the third-party APIs 208 with the appropriate video. The interactive engagement platform 212 may then transmit data payloads including the retrieved additional information/data to the content provider app 204 via the content delivery SDK 210. For example, the routing/load balancer server 218 may transmit the data payloads and one or more control signals to the content provider app 204 via the content delivery SDK, wherein the one or more control signals are configured to associated the data payloads with small interactive content windows 111 and/or selectable buttons 116 of the submenu button set 101.

For example, as shown in FIG. 13A, the interactive engagement platform 212 may receive metadata associated with Video A from the content delivery SDK 210, and may be configured to identify Video A as being a sports video for soccer. Through the received metadata, the interactive engagement platform 212 may be configured to identify Video A as a soccer match with one or more soccer teams, and thus automatically search for third-party providers 214, 216 (via third-party APIs 208) for related information. In particular, the API ingestion system 220 of the interactive engagement platform 212 may be configured to retrieve additional information/data related to the soccer teams shown in the Video A. API ingestion system 220 may also search for other related information including, but no limited to, a) the Twitter and Instagram feeds associated with the soccer team(s) or soccer league, b) statistical data for the soccer player(s) and soccer team(s) in the video, the merchandise store data for soccer player(s), soccer team(s), and soccer league, and ticket information for the soccer team(s) or soccer league, and the like. The API ingestion system 220 would then be configured to receive this additional information/data as data payloads, and the ADK/API server 218 may be configured to transmit the data payloads to the content provider app 204 and associate the data payloads with various selectable buttons 116 of the submenu button set 101.

Continuing with the same example, the end-user is able to watch this particular soccer video (Video A) while simultaneously viewing the Twitter feed(s) for the soccer team(s) or soccer league, which is displayed in the interactive content overlay window 102 upon selection of a "Twitter" or "social media" selectable button within the submenu button set 101. Additionally, the end-user is able to watch the soccer video (video program 103) while simultaneously viewing the Instagram feed(s) for the soccer team(s) or soccer league, which is displayed in the interactive content overlay window 102 when the "Instagram" selectable button 116 is selected/pressed in the submenu button set 101. The user may also be able to watch the soccer video while simultaneously viewing statistics on the performance of soccer player(s) or soccer team(s) after selecting the "statistics" selectable button 116 in the submenu button set 101. Similarly, the user may also be able to watch the soccer video while simultaneously viewing merchandise of the soccer player(s), soccer team(s) or soccer league after selecting a "store" selectable button 116 within the submenu button set 101.

Referring to FIG. 13B, the system of the present disclosure would identify video program 103b (Video B) as being a sports video for basketball, associated with one or more basketball teams and/or a basketball league. As noted previously herein, the interactive engagement platform 212, through the received metadata, may be configured to identify Video B as a basketball game with one or more basketball teams, and thus automatically search for third-party providers 214, 216 (via third-party APIs 208) for related information. In particular, the API ingestion system 220 of the interactive engagement platform 212 may be configured to retrieve additional information/data related to the basketball teams shown in the Video B. API ingestion system 220 may also search for other related information including, but no limited to, a) the Twitter and Instagram feeds associated with the basketball team(s) or basketball league, b) statistical data for the soccer player(s) and soccer team(s) in the video, the merchandise store data for basketball player(s), basketball team(s), and basketball league, and ticket information for the basketball team(s) or basketball league, and the like. The API ingestion system 220 would then be configured to receive this additional information/data as data payloads, and the ADK/API server 218 may be configured to transmit the data payloads to the content provider app 204 and associate the data payloads with various selectable buttons 116 of the submenu button set 101.

Continuing with the same example, the end-user is able to watch this particular basketball video (Video B) while simultaneously viewing the Twitter feed(s) for the basketball team(s) or basketball league, which is displayed in the interactive content overlay window 102 upon selection of a "Twitter" or "social media" selectable button within the submenu button set 101. Additionally, the end-user is able to watch the basketball video (video program 103b) while simultaneously viewing the Instagram feed(s) for the basketball team(s) or basketball league, which is displayed in the interactive content overlay window 102 when the "Instagram" selectable button 116 is selected/pressed in the submenu button set 101. The user may also be able to watch the basketball video while simultaneously viewing statistics on the performance of basketball player(s) or basketball team(s) after selecting the "statistics" selectable button 116 in the submenu button set 101. Similarly, the user may also be able to watch the basketball video while simultaneously viewing merchandise of the basketball player(s), basketball team(s) or basketball league after selecting a "store" selectable button 116 within the submenu button set 101.

Referring to FIG. 13C, the system of the present disclosure would identify video program 103c (Video C) as being a music video/performance for a particular artist. As noted previously herein, the interactive engagement platform 212, through the received metadata, may be configured to identify Video C as a particular artist's music video/performance, and thus automatically search for third-party providers 214, 216 (via third-party APIs 208) for related information. In particular, the API ingestion system 220 may be configured to search for other related information including, but no limited to, artist-related merchandise, concert and ticket information for that artist's tour, links to iTunes, Amazon and Google Play to purchase that artist's songs and/or albums, and the like. The API ingestion system 220 would then be configured to receive this additional information/data as data payloads, and the ADK/API server 218 may be configured to transmit the data payloads to the content provider app 204 and associate the data payloads with various selectable buttons 116 of the submenu button set 101.

Continuing with the same example, the end-user is able to watch this particular music video/performance (Video C) while simultaneously viewing the Twitter feed(s) for the artist which is displayed in the interactive content overlay window 102 upon selection of a "Twitter" or "social media" selectable button within the submenu button set 101. Additionally, the end-user is able to watch the music video/performance (video program 103c) while simultaneously viewing the Instagram feed(s) for the artist, which is displayed in the interactive content overlay window 102 when the "Instagram" selectable button 116 is selected/pressed in the submenu button set 101. The user may also be able to watch the music video/performance while simultaneously viewing tickets and tour dates after selecting a "tickets" selectable button 116 in the submenu button set 101. Similarly, the user may also be able to watch the music video/performance while simultaneously viewing merchandise of the artist after selecting a "store" selectable button 116 within the submenu button set 101.

Figure 14:
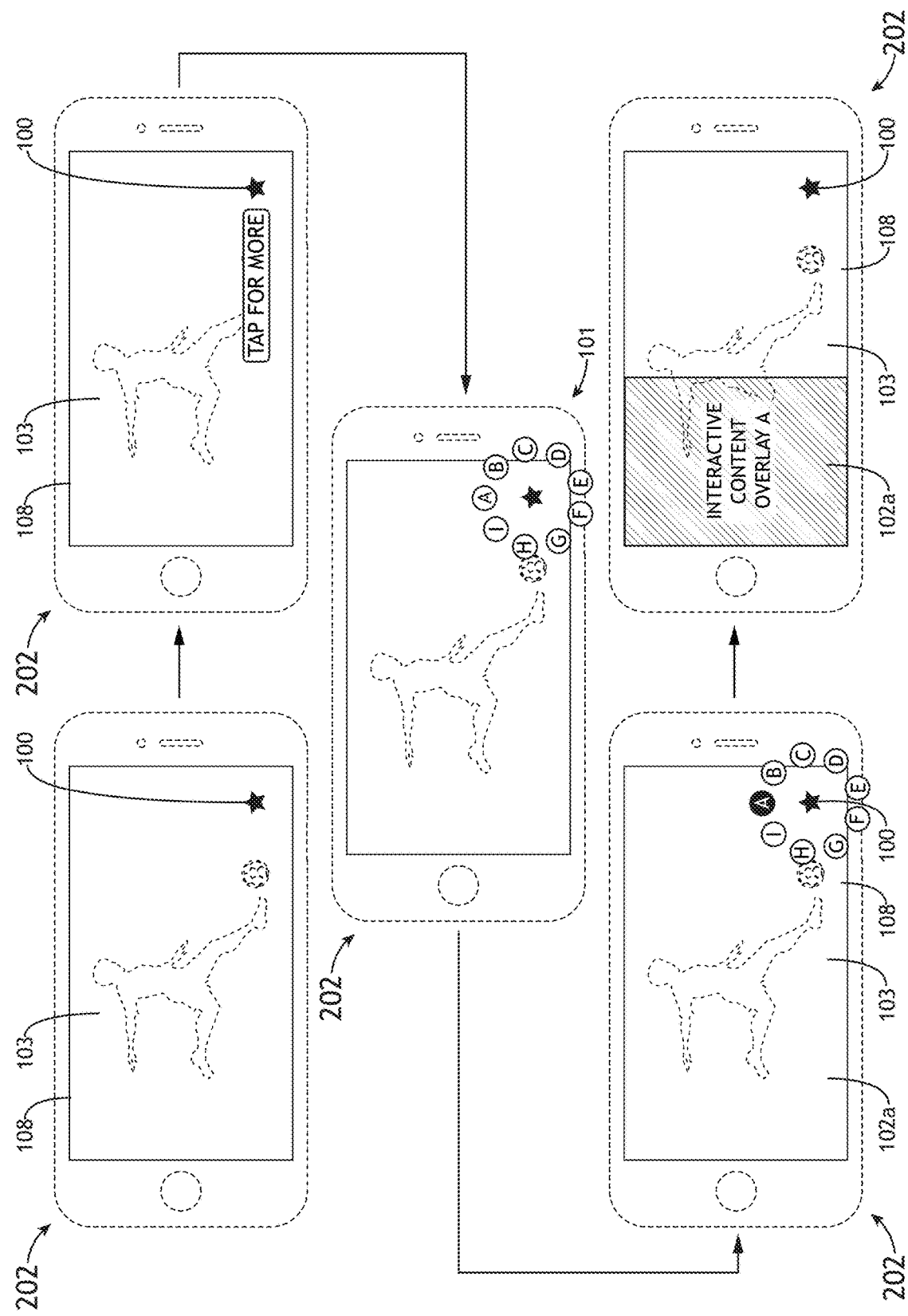
FIG. 14 illustrates transitions between various views of an interactive content overlay, in accordance with one or more embodiments of the present disclosure.

FIG. 14 illustrates transitions between various views of an interactive content overlay, in accordance with one or more embodiments of the present disclosure. In particular, FIG. 14 illustrates the process through which an end-user may operate the interactive content overlay on a graphical user interface 108 in a horizontal (full-screen) mode to access information or functionality displayed in an interactive content overlay window 102 that is related to the video program 103. As shown in FIG. 14, the interactive content overlay may allow the end-user to simultaneously view the video program 103 and the interactive content overlay window 102 on the user device 202.

When the end-user first accesses the video program 103, the user may see menu-launch button 100 displayed near the edge or corner of the graphical user interface 108 (Image 1). The menu-launch button 100 may be disposed over the video program 103. Conversely, as noted previously herein, in a vertical mode, the menu-launch button 100 may be displayed over a home page content window 104 or other content provider app page content windows 104 at the bottom of the graphical user interface 108. As shown in the second user device 202 depicted in the flow diagram of FIG. 14, the interactive content overlay may include temporary displays, including tooltips 105, notifications 106, and animations 107. These temporary displays may be configured to inform the user that there is functionality or content contained within the interactive content overlay, which may be accessed via the menu-launch button 100. When the menu-launch button 100 is selected, the graphical user interface 108 displays the submenu button set 101. By selecting one of the selectable buttons 116 of the submenu button set 101 (Image 4), the graphical user interface 108 displays an interactive content overlay window 102 containing content that is associated with the selected selectable button 116 (Image 5).

Figure 15:
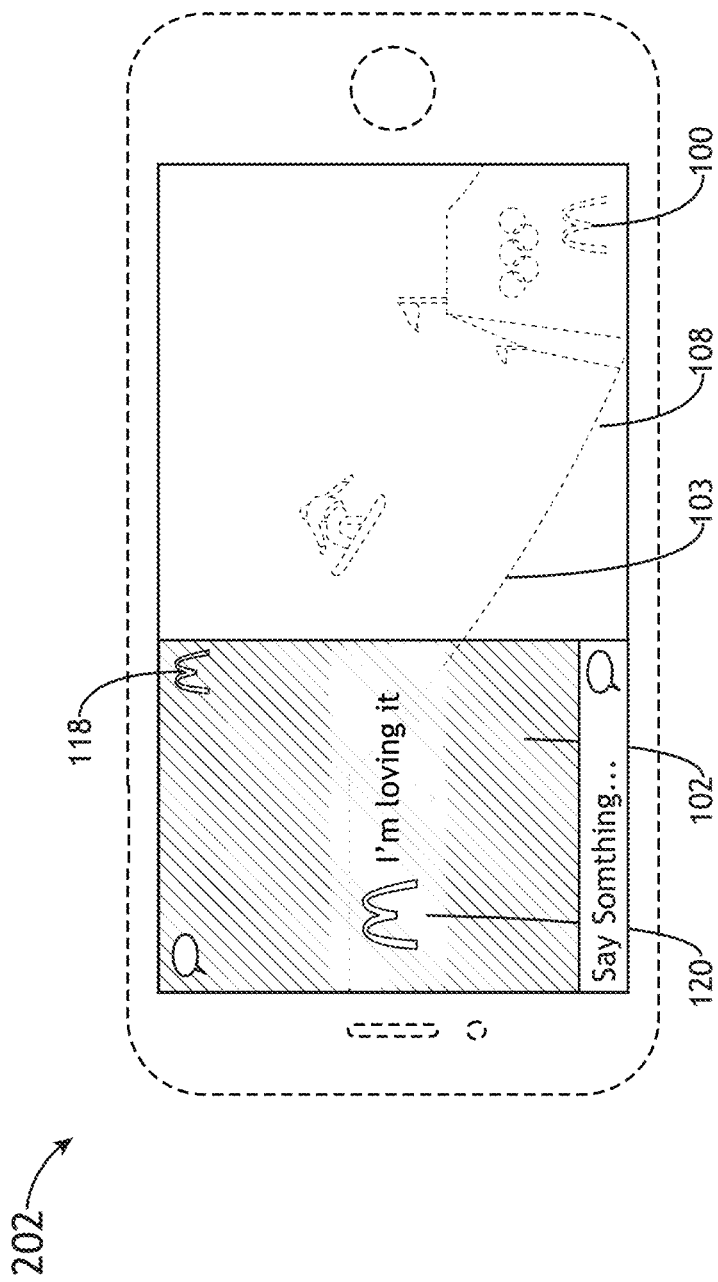
FIG. 15 illustrates an interactive content overlay window of a graphical user interface of a mobile device in a landscape orientation, in accordance with one or more embodiments of the present disclosure.

FIG. 15 illustrates an interactive content overlay window of a graphical user interface of a mobile device in a landscape orientation, in accordance with one or more embodiments of the present disclosure.

In one embodiment, the interactive engagement platform 212 can present a variety of advertising indicia and advertisements for audience viewing and interaction. For example, advertising indicia can appear in place of the menu-launch button 100. An end-user selecting on the advertising indicia (menu-launch button 100) will result in the submenu button set 101 expanding out from the advertising indicia. The advertising indicia can also be embedded as an overlay sponsor 118 of the interactive content overlay screen window 102. In this way, the interactive content overlay window 102 may be "provided by" or "sponsored by" a particular advertiser. When selected/pressed, the embedded overlay sponsor 118 may generate a display that has additional information related to that sponsor, advertiser, or advertising subject. In another embodiment, video and banner advertisements 120 also may be embedded among content in the interactive content overlay window 102. To close/deactivate the interactive content overlay window 102 in the horizontal (full-screen) mode, the end-user may select/press on any part of the graphical user interface 108 apart from the interactive content overlay window 102. To close/deactivate the interactive content overlay window 102 in the vertical mode, the end-user may select the close-button 113.

FIGS. 16A-16D illustrate interactive content overlays of a graphical user interface 108 in various modes and orientations, in accordance with one or more embodiments of the present disclosure.

Figure 16A:
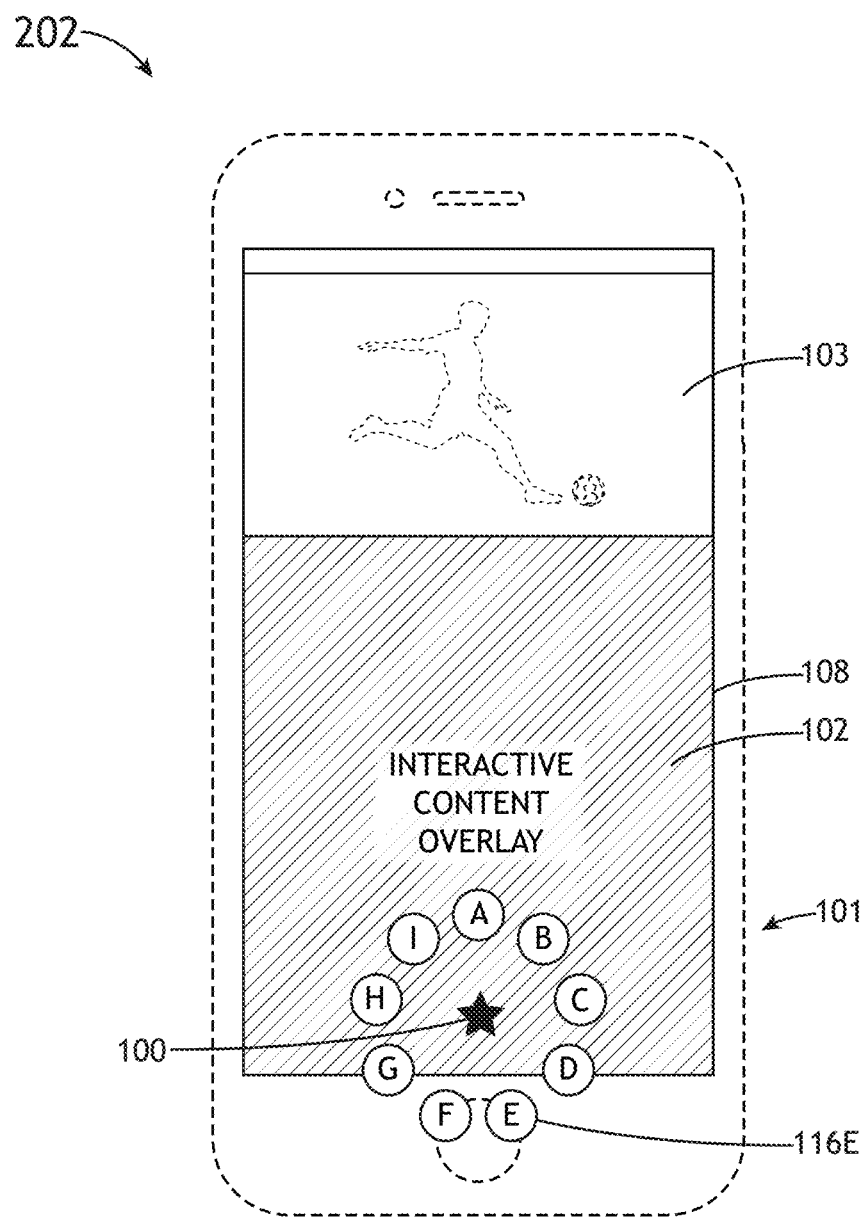
FIGS. 16A-16D illustrate interactive content overlays of a graphical user interface in various modes and orientations, in accordance with one or more embodiments of the present disclosure.
Figure 16B:
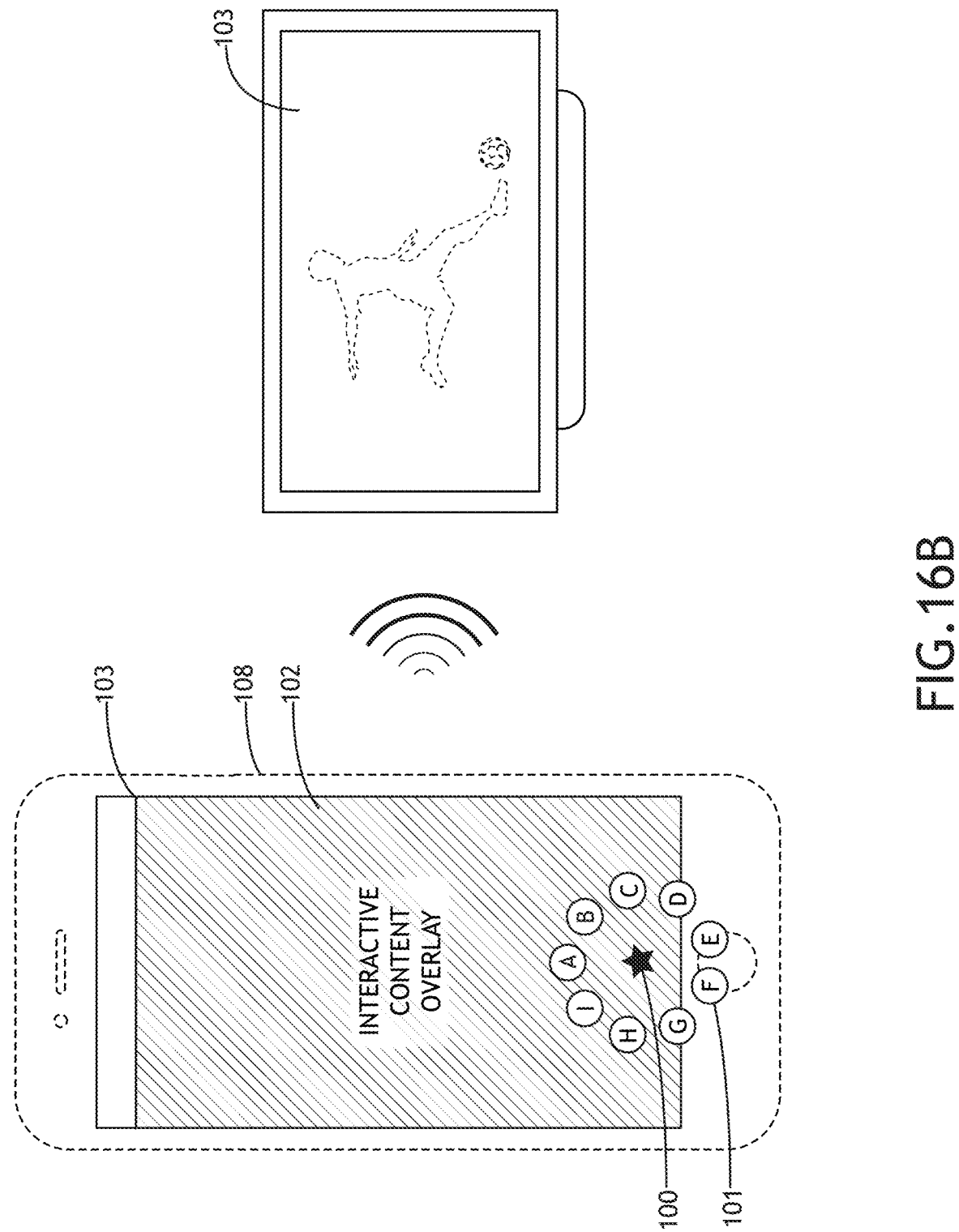
Figure 16C:
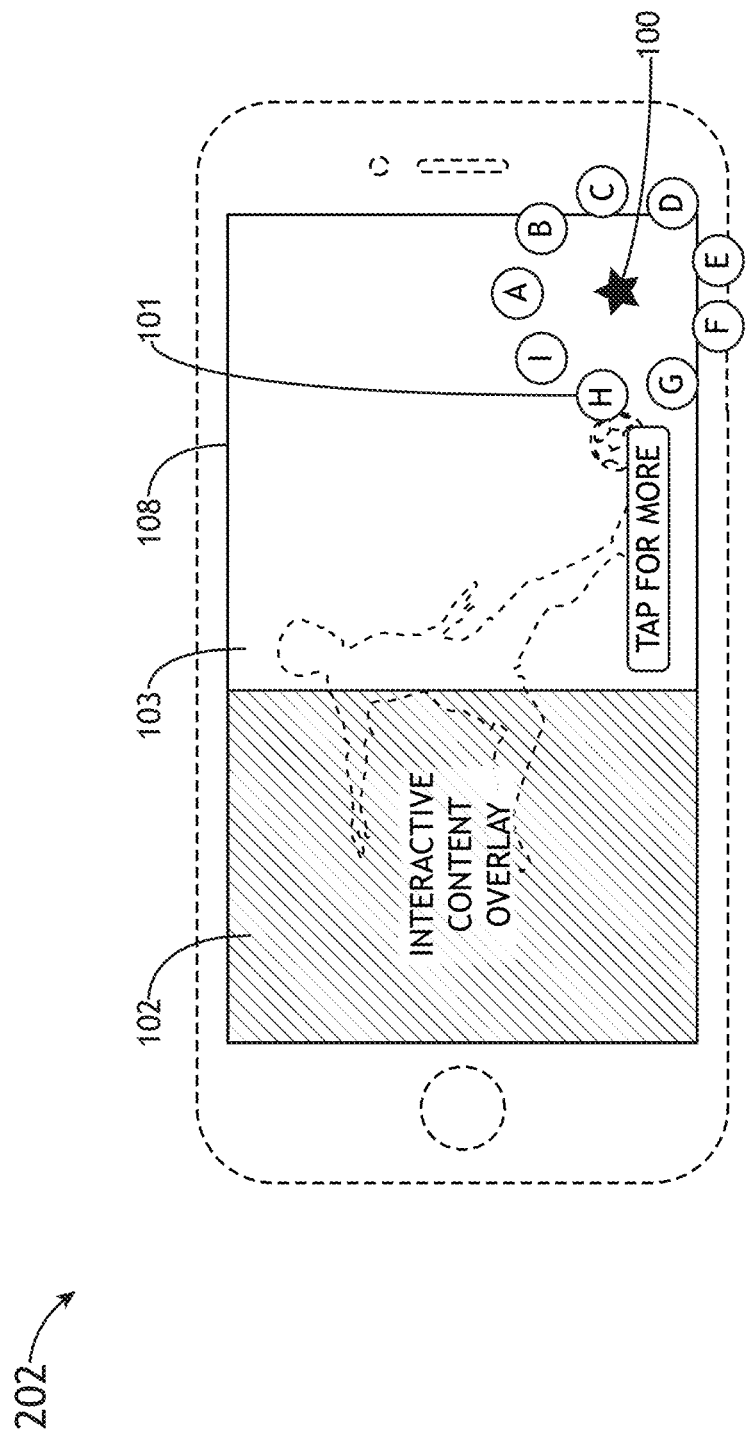
Figure 16D:
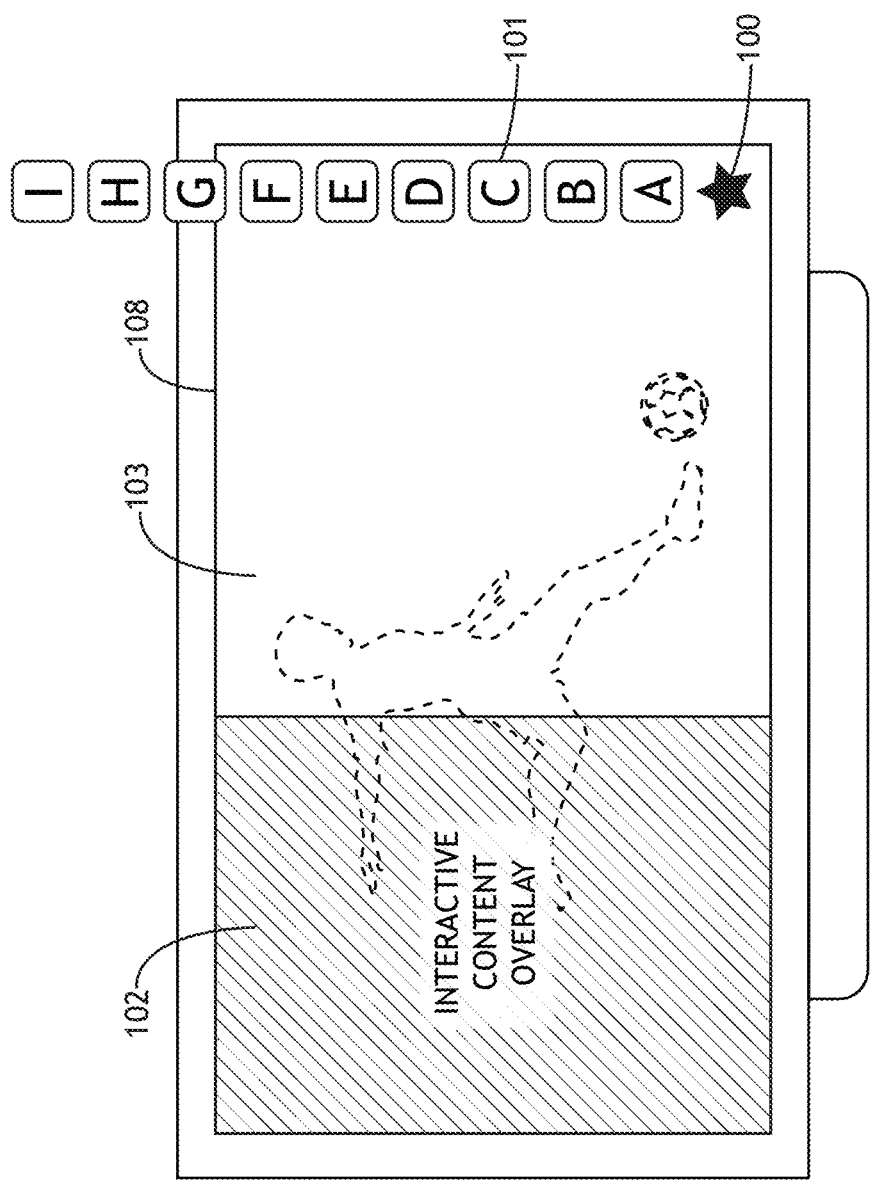
Figure 17A:
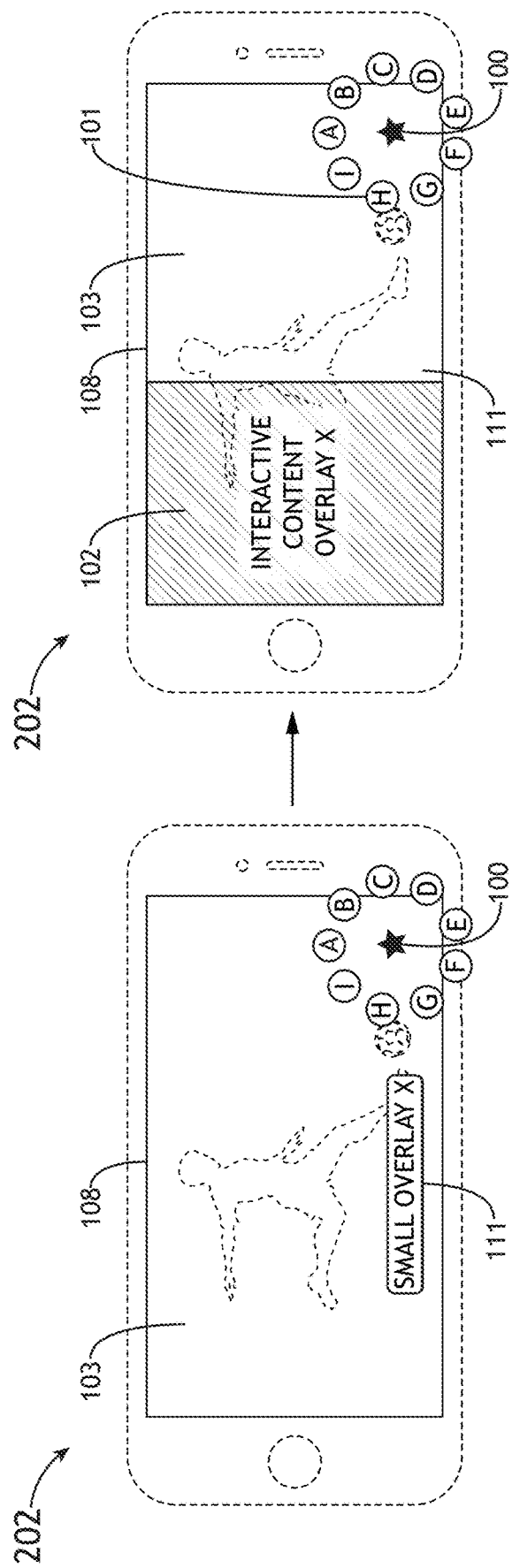
FIGS. 17A-17D illustrate interactive content overlays of a graphical user interface in various modes and orientations, in accordance with one or more embodiments of the present disclosure.
Figure 17B:
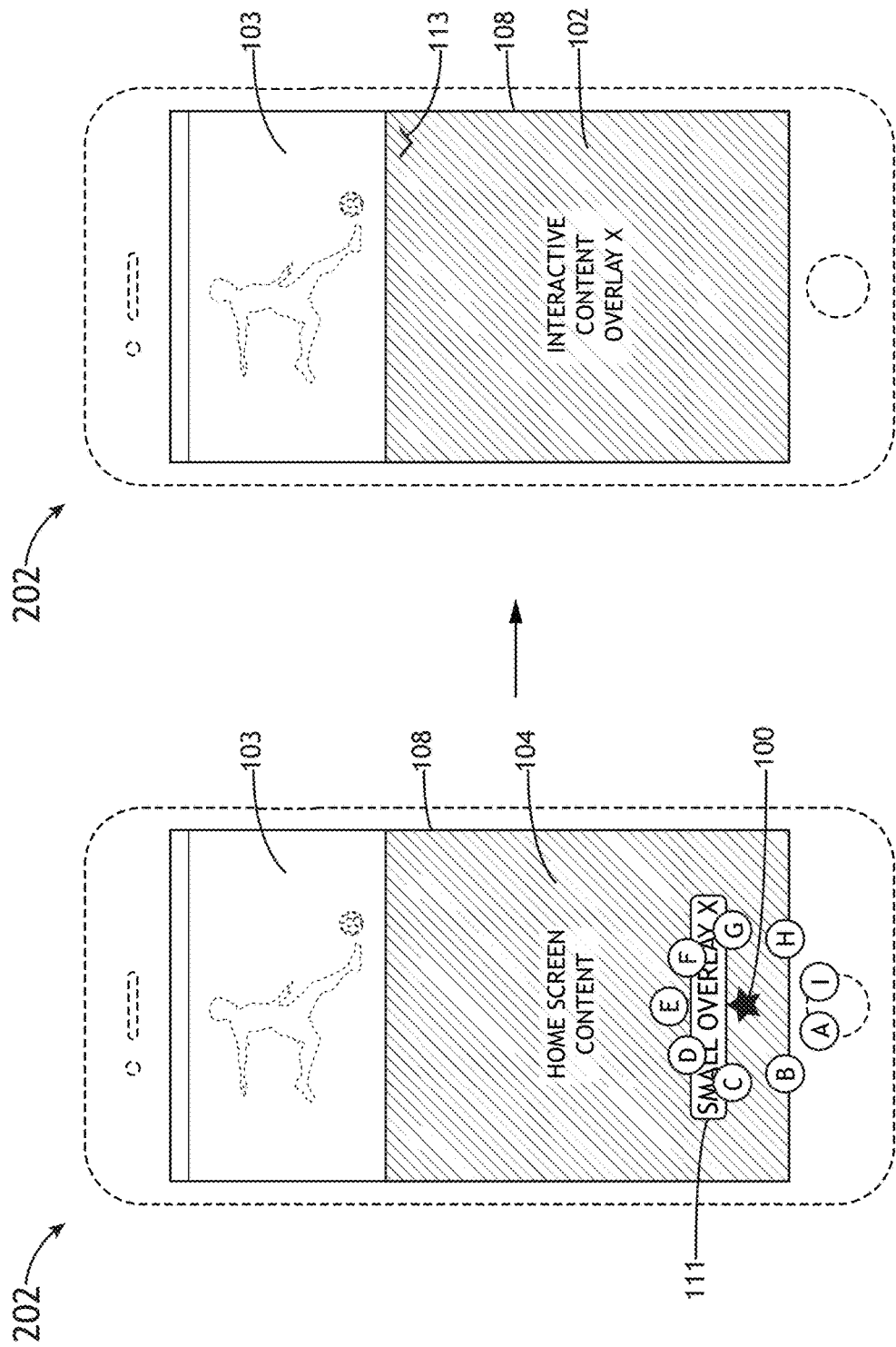
Figure 17C:
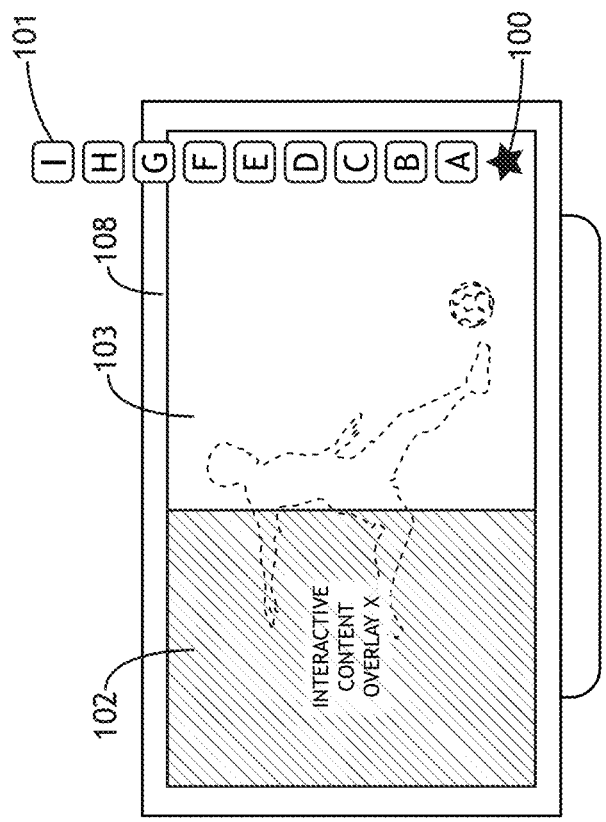
Figure 17C:
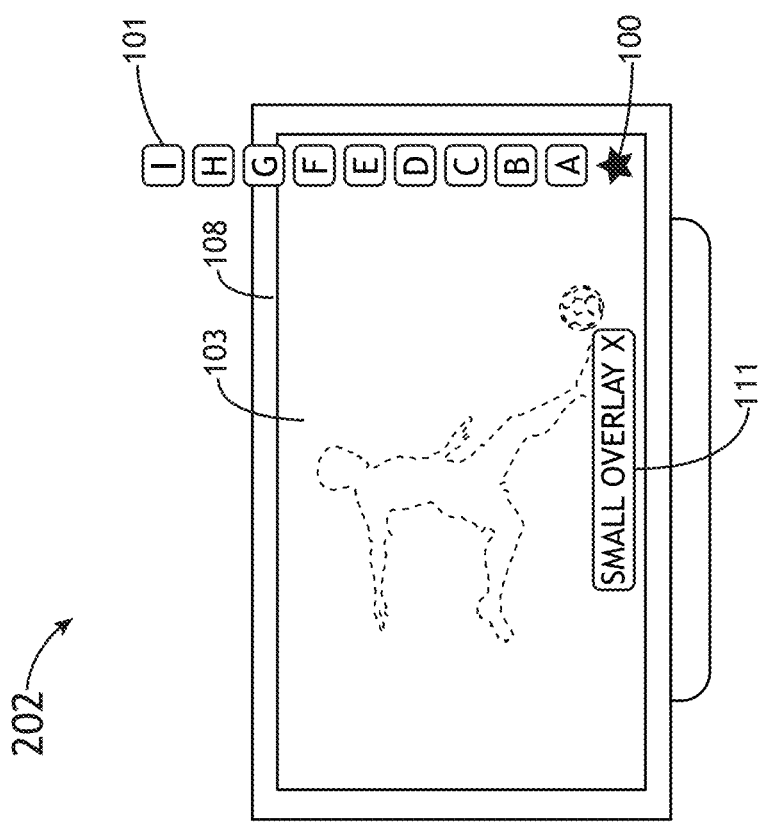
Figure 17D:
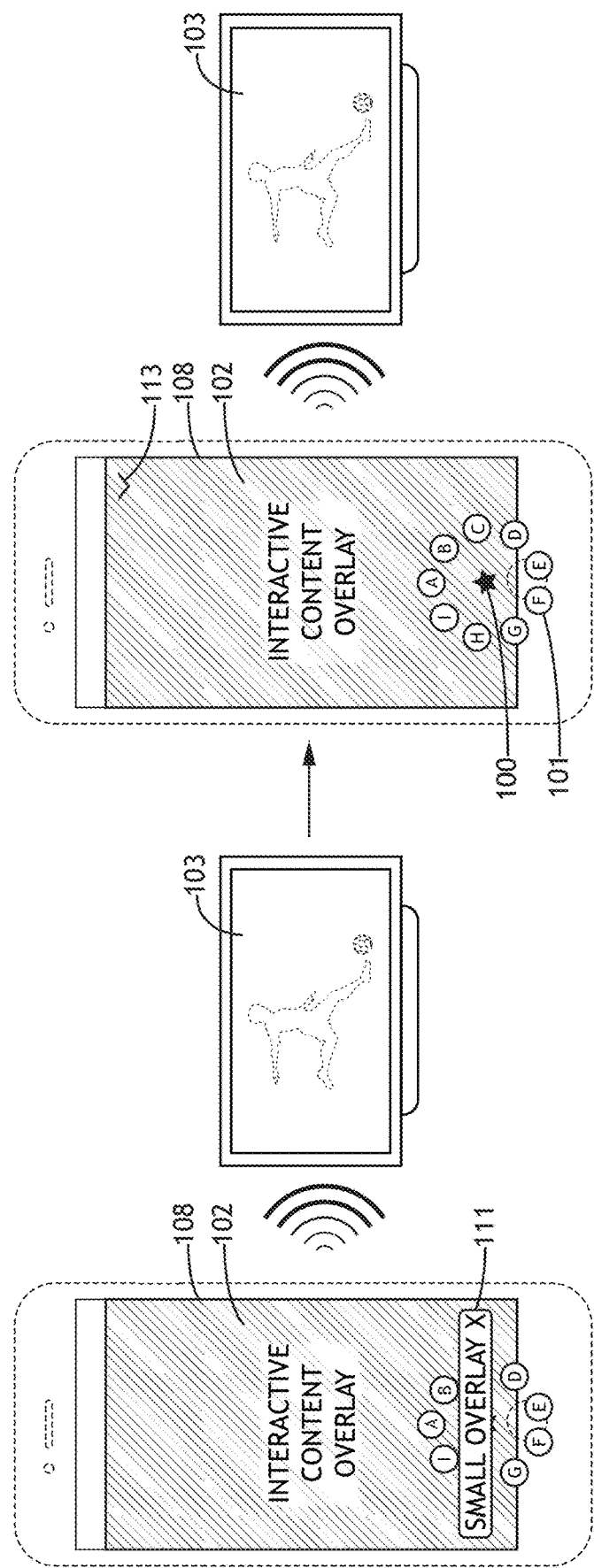

For example, FIG. 16A illustrates the relative arrangement of the interactive content overlay in a vertical/portrait mode, FIG. 16B illustrates the relative arrangement of the interactive content overlay in a screencast TV mode, FIG. 16C illustrates the relative arrangement of the interactive content overlay in a horizontal/full-screen mode, and FIG. 16D illustrates the relative arrangement of the interactive content overlay in a an interactive TV mode.

In one embodiment, as shown in FIG. 16B, a user may couple their user device 202 such that the video program 103 depicted on the user device 202 is screencast to another device, such as a TV. For example, a user may use a "screen-mirroring" function on the user device 202 to screencast a video program. In some embodiments, the TV or other screencast device may display the interactive content overlay depicted on the user device 202. In additional and/or alternative embodiments, the TV or other screencast device may show only the video program 103, and not the interactive content overlay, as shown in FIG. 16B. It is contemplated herein that a user may input one or more control commands into the user device 202, where the one or more control commands are configured to instruct the user device 202 to screencast all and/or portions of the graphical user interface 108.

In one embodiment, the interactive engagement platform 212 may be compatible with over-the-top (OTT) video content viewing devices. For example, as shown in FIG. 16D, the interactive content overlay may be used to display additional content related to a video program 103 viewed on a Smart TV or OTT device, including Roku, AppleTV, and the like. Additionally, multiple devices may be paired with each other so content entered on one device appear in the overlay of another device (e.g. messaged typed on a mobile device appear in the messaging overlay of a connected TV, or a bet entered into the overlay of a mobile device appears in the overlay of a connected TV).

FIGS. 17A-17D illustrate interactive content overlays of a graphical user interface 108 in various modes and orientations, in accordance with one or more embodiments of the present disclosure. In particular, FIGS. 17A-17D illustrate small interactive content overlay windows 111.

In one embodiment, the interactive content overlay generated on a user device 202 may include small interactive content overlays 111 which appear over the video program 103. In one embodiment, small interactive content overlay windows 111 may be generated manually by an administrator from the control panel 238. In additional and/or alternative embodiments, small interactive content windows 111 may be automatically generated by the interactive engagement platform 212 based on various parameters. In this regard, small interactive content overlay windows 111 may be used to alert users to various features, events, or content including, but not limited to, newly available content within the interactive content overlay, outside events (e.g., a new message received from a friend or a goal/touchdown scored in a game), new opportunities (e.g., newly available betting opportunities), and the like. In another embodiment, selection of a small interactive content overlay window 111 is configured to cause the graphical user interface 108 to generate the larger interactive content overlay window 102, wherein the larger interactive content overlay window 102 contains contain content related to the small interactive content overlay window 111. In another embodiment, selection of a small interactive content overlay window 111 may additionally and/or alternatively be configured to enable various other functions including, but not limited to: activate a video that is played in the content provider app 204 viewed on the user device 202, open an overlay to display active sports bets, open a web browser that appears in the content provider app 204, and the like. By way of another example, selection of a small interactive content overlay window 111 may additionally and/or alternatively be configured to generate other actions within the interactive engagement platform 212 such as logging an input to a scoring system, generating a vote to a poll, submitting a bet, or generating on-screen displays for approval/disapproval of the video program 103, such as cheers or boos.

Figure 18:
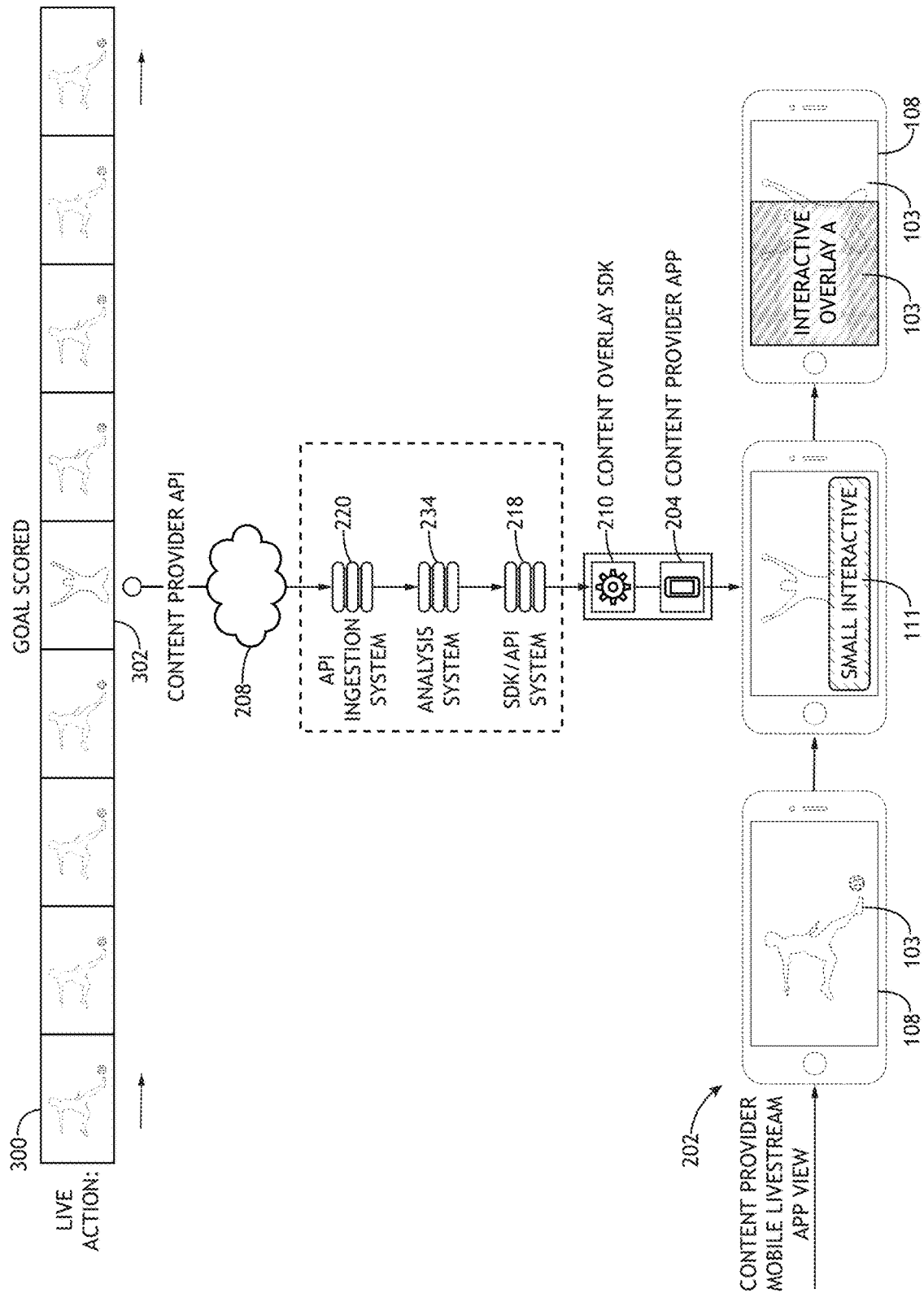
FIG. 18 illustrates a flow diagram depicting the receipt, analysis, and transmission of live action video in a video content overlay system, in accordance with one or more embodiments of the present disclosure.

FIG. 18 illustrates a flow diagram depicting the receipt, analysis, and transmission of live action video in a video content overlay system, in accordance with one or more embodiments of the present disclosure. In particular, FIG. 18 illustrates a flow diagram depicting the process by which live action video is received, analyzed, and provided to a user device 202 via the interactive engagement platform 212.

In one embodiment, live action 300 may be monitored, recorded or analyzed by a third-party provider 214, 216. For example, as shown in FIG. 18, FoxSports may be broadcasting, recording, or otherwise reporting on a soccer match. At a point 302, a goal may be scored. At this point, the third-party provider 214, 216 may generate data, show, broadcast, or otherwise report that a goal has been scored (e.g., generate a goal/event report). It is contemplated herein that the third-party provider 214, 216 may report the goal at point 302 in any manner known in the art including, but not limited to, broadcasting the live action 300 as it is occurring, generating event data, creating a news article (e.g., Tweet, social media post, and the like), and the like. After generating the goal/event report at point 302, the API ingestion system 220 of the interactive engagement platform 212 may retrieve the event report from the third-party provider 214, 216 by interfacing with the third-party API 208. In another embodiment, after retrieving the event report, the API ingestion system 220 may be configured to transmit the event report to the analysis system 234.

The analysis system 234 of the interactive engagement platform 212 may be configured to perform one or more analysis operations on the event report. For example, the analysis system 234 may recognize the event report as reporting a goal in the soccer match, and may identify that the goal may trigger new betting opportunities on the soccer match for the user based various factors including the user's betting history or video viewing history (e.g. a goal by Liverpool FC ties the game and the system recognizes that user has watched a significant number of Liverpool games and bet in several games so presents an opportunity to bet on Liverpool to win match). In this regard, the analysis system 234 may include one or more processors and a memory. In another embodiment, the routing/load balancer server 218 may be configured to transmit one or more control signals to the content provider app 204 via the content overlay SDK 210, wherein the one or more control signals are configured to cause the graphical user interface 108 of the user device 202 to display a small interactive content window 111. In another embodiment, the one or more control signals are configured to associate a data payload with the small interactive content window 111, such that selection of the small interactive content window 111 pulls up the interactive content window 102 which displays the content of the data payload. In this example, the data payload may include, but is not limited to, a video clip of the goal at point 302, updated betting opportunities resulting from the goal, stats of the soccer match, fan reactions to the goal at point 302, and the like.

Figure 19:
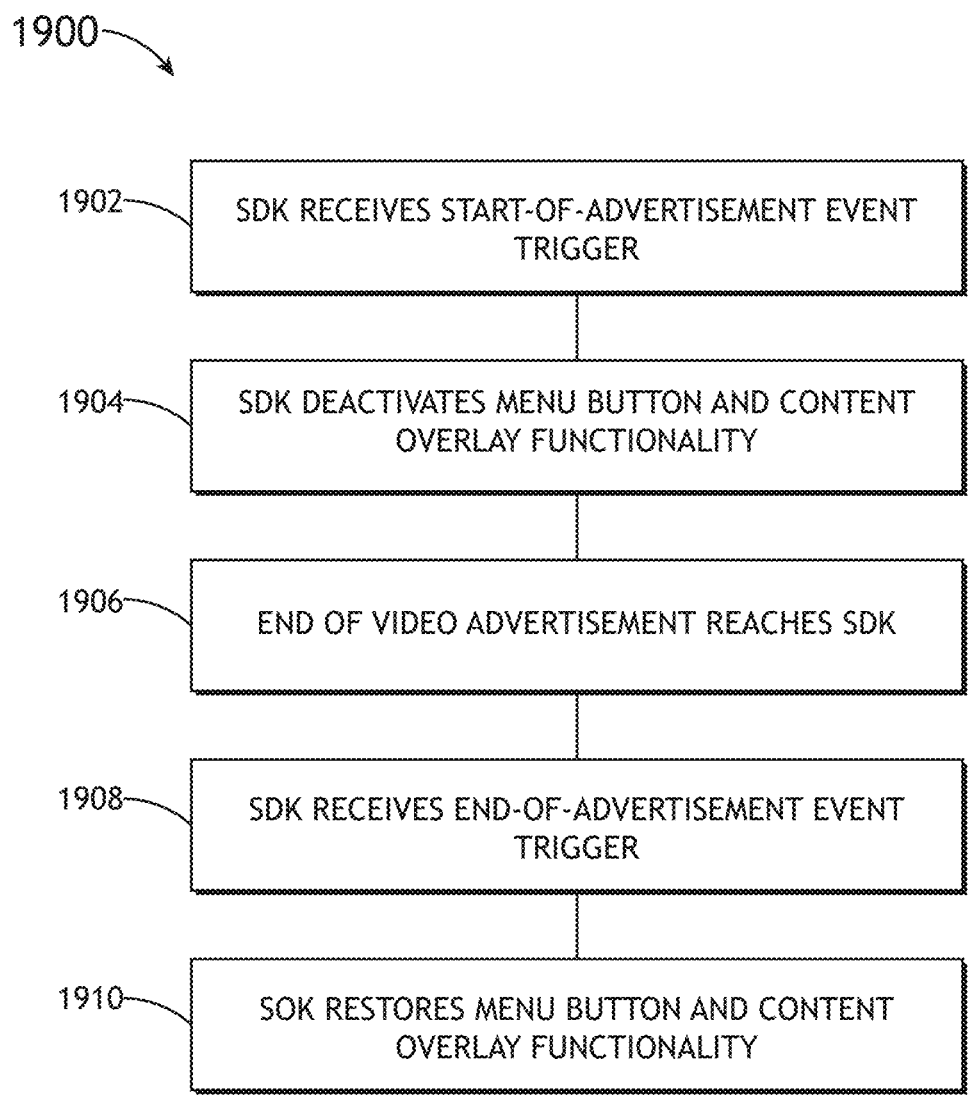
FIG. 19 illustrates a flowchart of method for advertising conflict avoidance, in accordance with one or more embodiments of the present disclosure.

FIG. 19 illustrates a flowchart of method 1900 for advertising conflict avoidance, in accordance with one or more embodiments of the present disclosure. In particular, FIG. 19 illustrates a flow diagram depicting the process by which advertising conflict between sponsored overlays and video advertisement is avoided through the temporary deactivation of the interactive content overlay. It is noted herein that the steps of method 1900 may be implemented all or in part by system 200. It is further recognized, however, that the method 1900 is not limited to the system 200 in that additional or alternative system-level embodiments may carry out all or part of the steps of method 1900.

Figure 21:
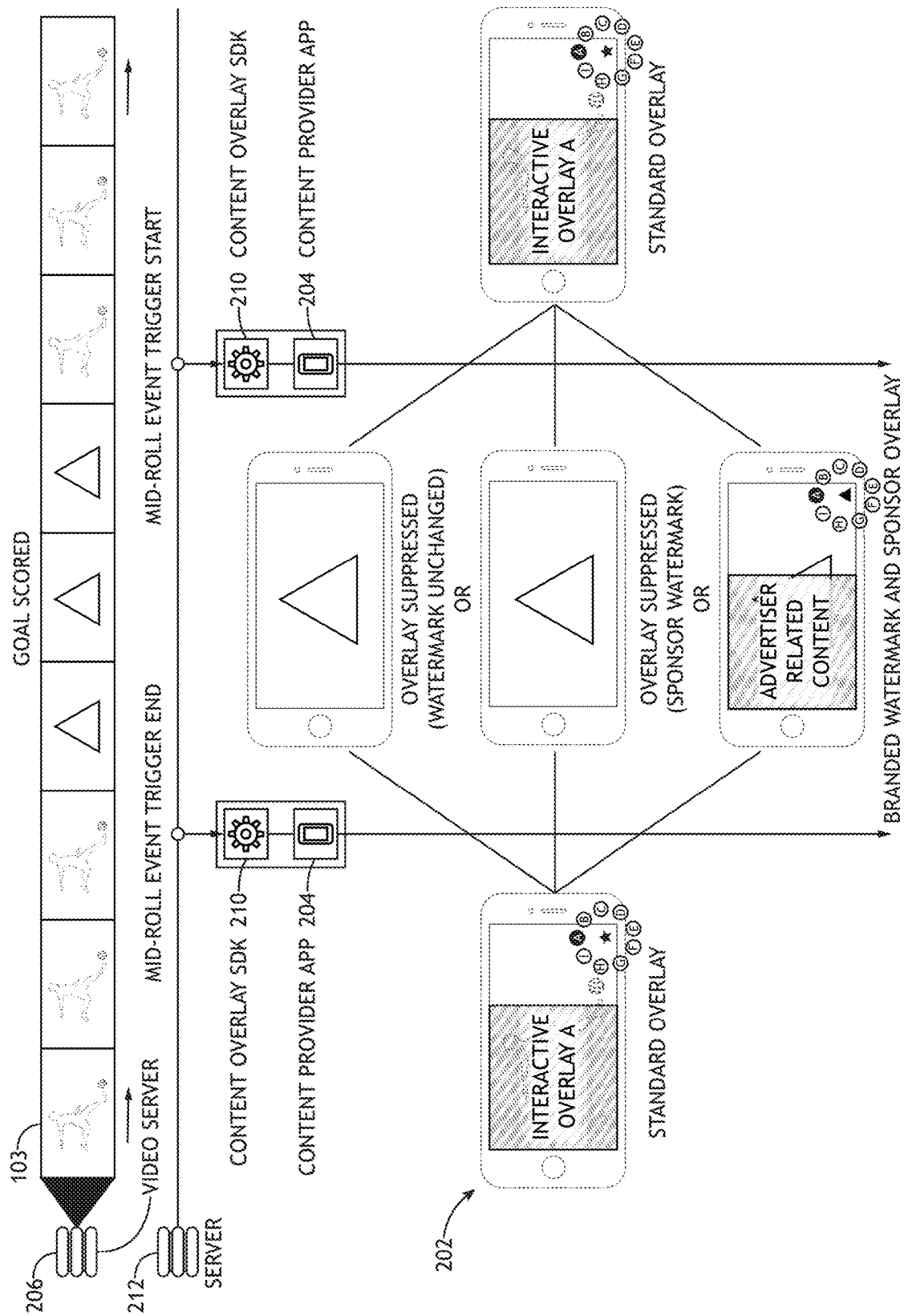
FIG. 21 illustrates a flow diagram depicting the advertising conflict avoidance in a video content overlay system, in accordance with one or more embodiments of the present disclosure.

In a step 1902, the content overlay SDK 210 receives a start-of-advertisement trigger. This may be further understood with reference to FIG. 21. FIG. 21 illustrates a flow diagram depicting the advertising conflict avoidance in a video content overlay system, in accordance with one or more embodiments of the present disclosure. As shown in FIG. 21, a video provider server 206 may be configured to provide a video program stream 205 to a content provider app 204. During the course of the video program stream 205, a mid-roll advertisement may appear. For example, during the course of a sporting event, commercials may include one or more advertisements. Upon the commencement of the advertisement, the content overlay SDK may receive a start-of-advertisement trigger, indicating the beginning of a mid-roll advertisement. In additional and/or alternative embodiments, the content overlay SDK 210 may simply be configured to identify the start of an advertisement in the video program stream 205, and thereby generate the start-of-advertisement trigger.

In a step 1904, the content overlay SDK 210 deactivates the menu-launch button 100, one or more selectable buttons 116, and/or functionality of the interactive content overlay generated on the graphical user interface 108 of one or more user devices 202. For example, as shown in FIG. 21, the content overlay SDK 210 may generate one or more deactivation control signals, wherein the one or more deactivation control signals are configured to cause the content provider app 204 to deactivate the menu-launch button 100 and the interactive content overlay. For instance, the menu-launch button 100 may be deactivated such that the advertisement may be displayed on the graphical user interface 108 without any interruptions or impeding content. It is contemplated herein that providing an advertisement conflict avoidance feature may allow for the interactive engagement platform 212 to provide users with additional content, while also not compromising or diminishing the value of advertisements displayed during a video program 103. In this regard, advertisers may be certain that their advertisements will not be blocked, or otherwise obstructed.

In a step 1906, the end of the advertisement within the video program stream 205 reaches the content overlay SDK 210. In a step 1908, the content overlay SDK 210 receives an end-of-advertisement trigger. For example, as shown in FIG. 21, upon the ending of the advertisement, the content overlay SDK may receive an end-of-advertisement trigger, indicating the end of a mid-roll advertisement. As noted previously, in additional and/or alternative embodiments, the content overlay SDK may be configured to identify the end of the advertisement in the video content stream 205.

In a step 1910, the content overlay SDK 210 restores the functionality of the menu-launch button 100, one or more selectable buttons 116, and/or the interactive content overlay. For example, as shown in FIG. 21, the content overlay SDK 210 may generate one or more re-activation control signals, wherein the one or more re-activation control signals are configured to cause the content provider app 204 to re-activate the menu-launch button 100 and the interactive content overlay.

Figure 20:
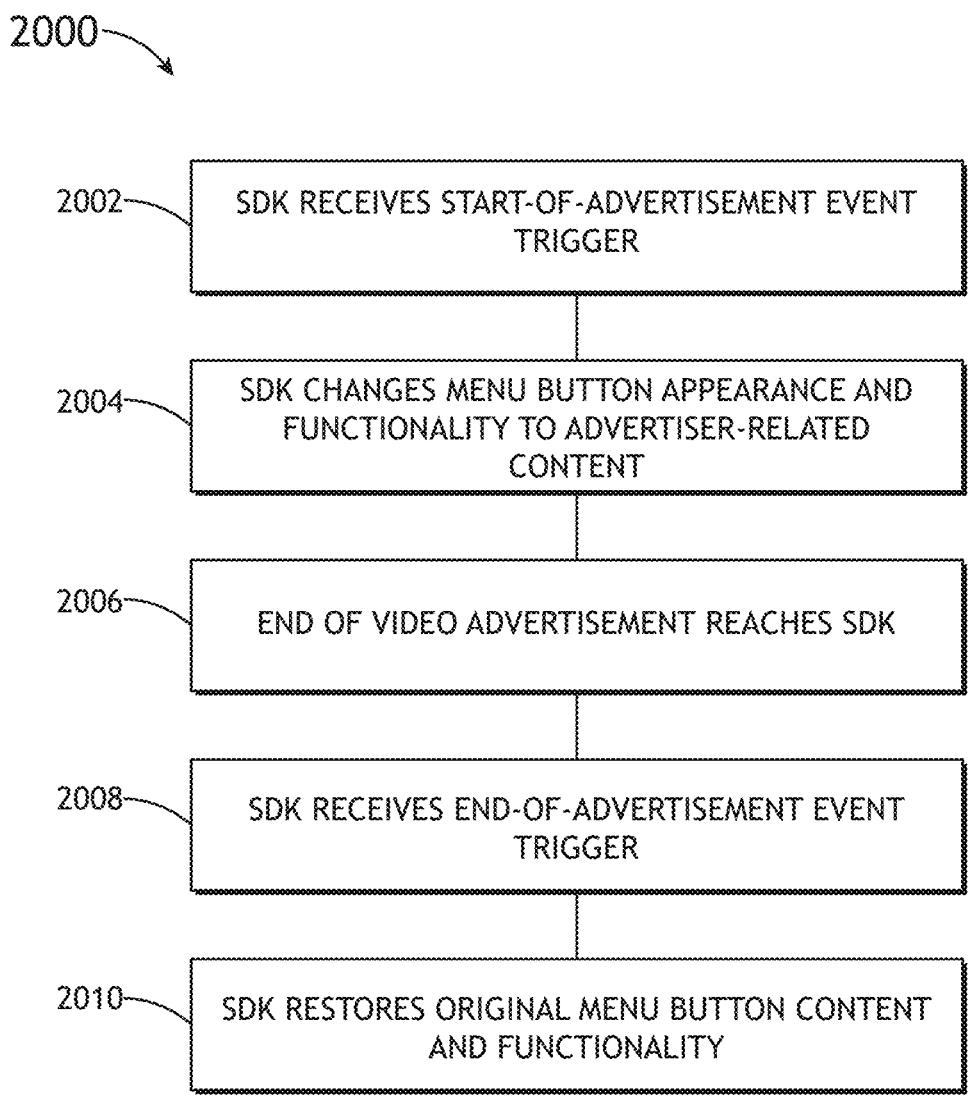
FIG. 20 illustrates a flowchart of method for advertising conflict avoidance, in accordance with one or more embodiments of the present disclosure.

FIG. 20 illustrates a flowchart of method 2000 for advertising conflict avoidance, in accordance with one or more embodiments of the present disclosure. In particular, FIG. 20 illustrates a flow diagram depicting the process by which advertising conflict between sponsored overlays and a video advertisement is avoided through the temporary transformation of the interactive content overlay. It is noted herein that the steps of method 2000 may be implemented all or in part by system 200. It is further recognized, however, that the method 2000 is not limited to the system 200 in that additional or alternative system-level embodiments may carry out all or part of the steps of method 2000.

In a step 2002, the content overlay SDK 210 receives a start-of-advertisement trigger. For example, as shown in FIG. 21, a video provider server 206 may be configured to provide a video program stream 205 to a content provider app 204. During the course of the video program stream 205, a mid-roll advertisement may appear. For example, during the course of a sporting event, commercials may include one or more advertisements. Upon the commencement of the advertisement, the content overlay SDK may receive a start-of-advertisement trigger, indicating the beginning of a mid-roll advertisement. In additional and/or alternative embodiments, the content overlay SDK 210 may simply be configured to identify the start of an advertisement in the video program stream 205, and thereby generate the start-of-advertisement trigger.

In a step 2004, the content overlay SDK 210 alters the appearance of the menu-launch button 100, one or more selectable buttons 116, and/or the interactive content overlay generated on the graphical user interface 108 of one or more user devices 202. For example, as shown in FIG. 21, the content overlay SDK 210 may generate one or more control signals, wherein the one or more control signals are configured to cause the content provider app 204 to alter the appearance of the menu-launch button 100, one or more selectable buttons 116, and/or and the interactive content overlay. For instance, the menu-launch button 100 may be changed to a sponsored watermark (e.g., watermark associated with the advertisement). By way of another example, the one or more control signals may be configured to alter the appearance of the interactive content overlay window 102 such that the content viewed in an interactive content overlay window 102 is related to the sponsor, advertiser, or advertisement subject matter. Accordingly, as demonstrated by methods 1900 and 2000, the advertisement conflict avoidance procedures of the present disclosure may be carried out in a number of different manners without departing from the spirit and scope of the present disclosure.

In a step 2006, the end of the advertisement within the video program stream 205 reaches the content overlay SDK 210. In a step 2008, the content overlay SDK 210 receives an end-of-advertisement trigger. For example, as shown in FIG. 21, upon the ending of the advertisement, the content overlay SDK may receive an end-of-advertisement trigger, indicating the end of a mid-roll advertisement. As noted previously, in additional and/or alternative embodiments, the content overlay SDK may be configured to identify the end of the advertisement in the video content stream 205.

In a step 2010, the content overlay SDK 210 restores the appearance and/or functionality of the menu-launch button 100, one or more selectable buttons 116, and/or the interactive content overlay. For example, as shown in FIG. 21, the content overlay SDK 210 may generate one or more control signals, wherein the one or more control signals are configured to cause the content provider app 204 to restore the appearance and/or functionality of the interactive content overlay.

While the advertisement conflict avoidance procedures are shown and described as being carried out by one or more servers of the interactive engagement platform 212, this is not a limitation of the present disclosure, unless noted otherwise herein. IN this regard, it is contemplated that the video content servers 206 and/or the user devices 202 may be configured to carry out the various steps of methods 1900 and 2000. For example, a user device 202 may be configured to detect advertisement start points and advertisement end points, and disable and/or modify an interactive content overlay in order to carry out the advertisement conflict avoidance procedures described herein.

Figure 22A:
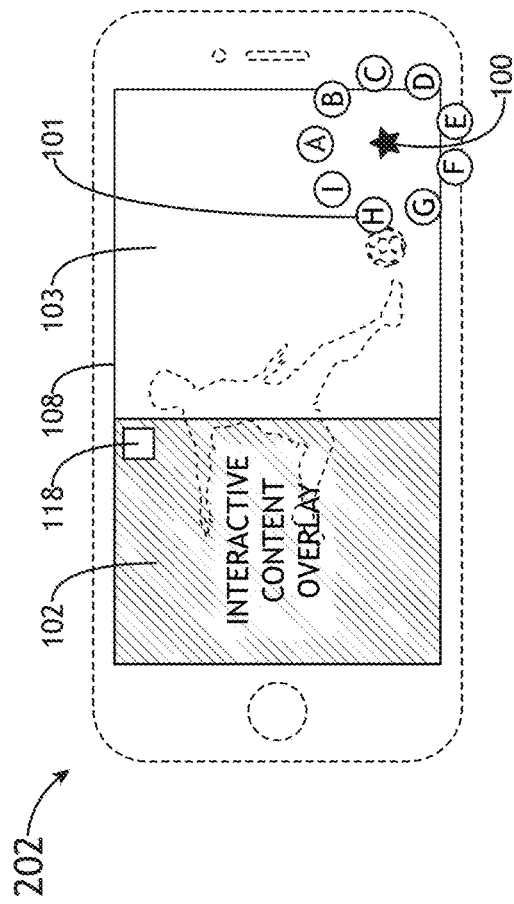
FIGS. 22A-22C illustrate various advertising conflict avoidance procedures on a graphical user interface of a user device, in accordance with one or more embodiments of the present disclosure.
Figure 22C:
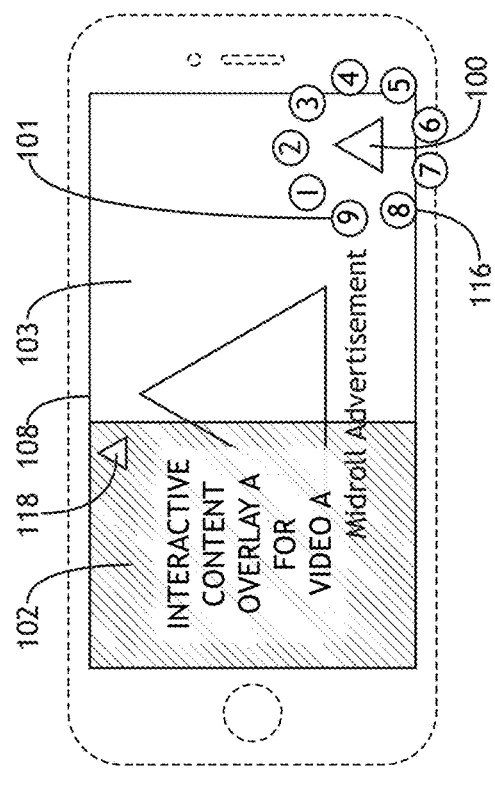
Figure 22B:
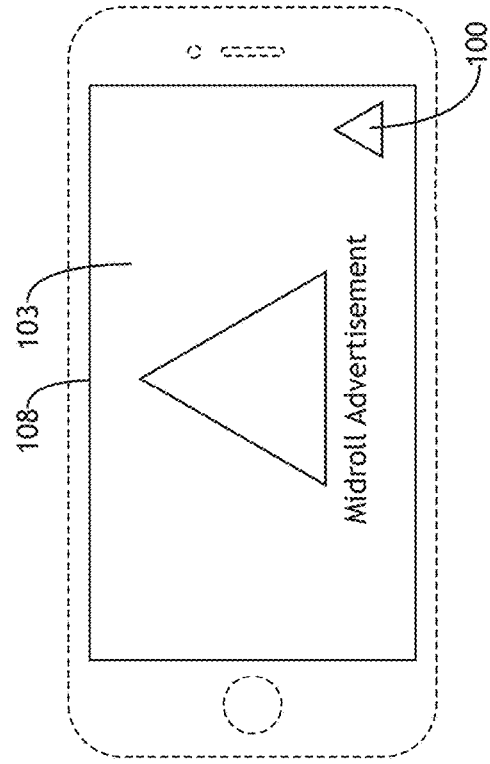

FIGS. 22A-22C illustrate various advertising conflict avoidance procedures on a graphical user interface 108 of a user device 202, in accordance with one or more embodiments of the present disclosure.

As noted previously herein, the advertisement conflict avoidance procedures of the present disclosure may be carried out in any number of ways. For example, as shown in FIG. 22B, the menu-launch button 100, one or more selectable buttons 116, and/or the interactive content overlay window 102 may be disabled, such that the advertisement is displayed un-obstructed. By way of another example, as shown in FIG. 22C, the content displayed in the interactive content overlay window 102 may be deactivated and/or suppressed such that the interactive content overlay window 102 displays information/data related to the advertisement itself.

Figure 23:
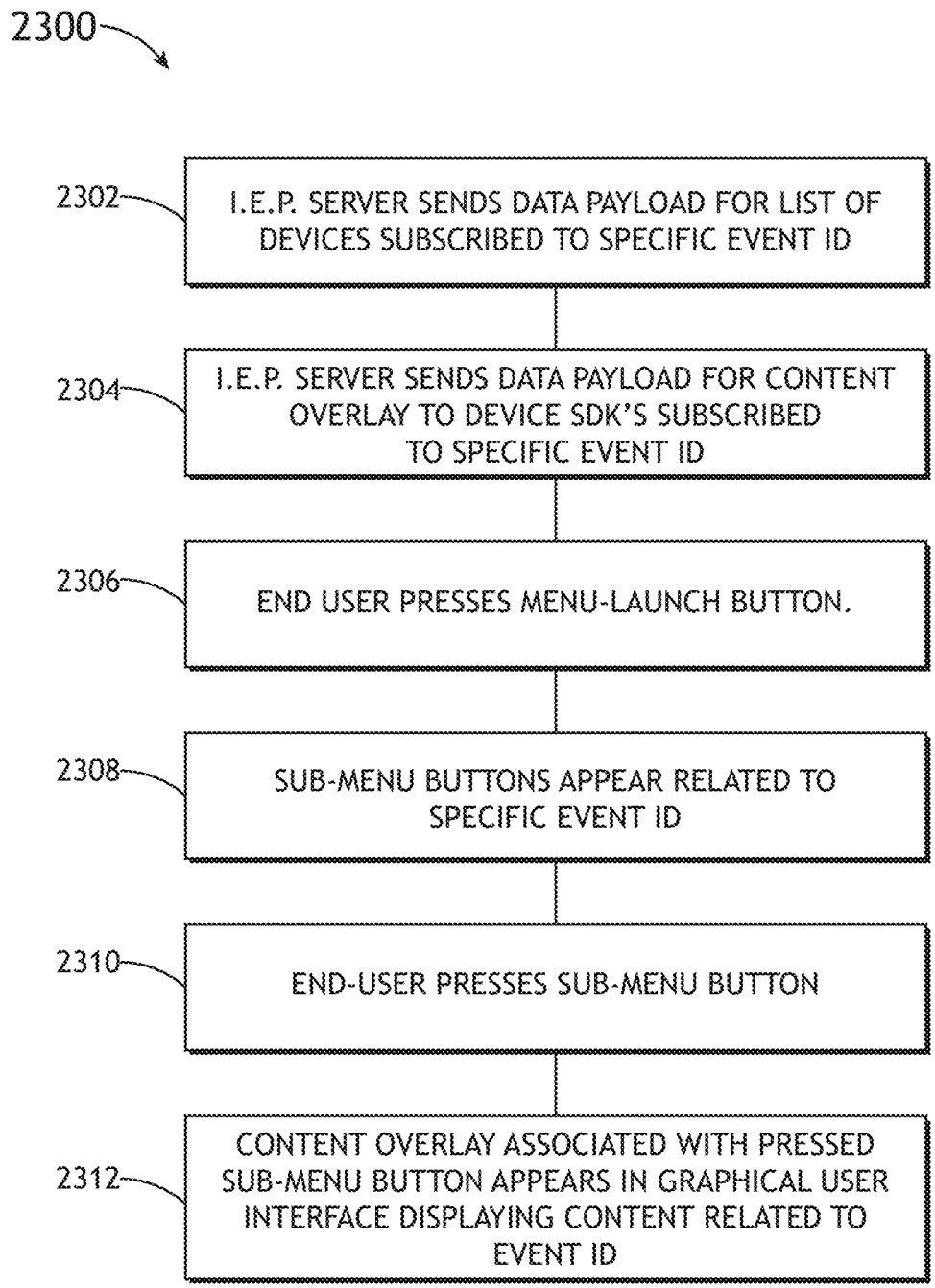
FIG. 23 illustrates a flowchart of a method for accessing an interactive content overlay of an interactive content overlay system, in accordance with one or more embodiments of the present disclosure.

FIG. 23 illustrates a flowchart of a method 2300 for generating one or more selectable buttons 116 of a submenu button set 101, in accordance with one or more embodiments of the present disclosure. In particular, FIG. 23 illustrates a method for generating a submenu button set 101 related to a particular event. It is noted herein that the steps of method 2300 may be implemented all or in part by system 200. It is further recognized, however, that the method 2300 is not limited to the system 200 in that additional or alternative system-level embodiments may carry out all or part of the steps of method 2300.

In a step 2302, the interactive engagement platform 212 identifies one or more user devices 202 subscribed to a specific Event ID. For example, the interactive engagement platform 212 may query, filter, sort, search, or otherwise identify one or more user devices 20 subscribed to a specific Event ID in one or more registration servers 222 (e.g., user databases). It is noted herein that end-users may utilize a user device 202 to subscribe to particular events or notifications. Lists of events/notifications, as well as the subscribed users/user devices 202, may then be maintained within one or more registration servers 222 (e.g., user databases), which may then be queried, filtered, sorted, searched, etc.

In a step 2304, the interactive engagement platform 212 transmits a data payload to be included within the interactive content overlay to the one or more identified user devices 202 subscribed to the specific Event ID. For example, the routing/load balancer server 218 may transmit the data payload to the content delivery SDKs 210/content provider apps 204 associated with the subscribed user devices 202.

In a step 2306, a user subscribed to the Event ID selects the menu-launch button 100. In a step 2308, a submenu button set 101 including one or more selectable buttons 116 appear. In embodiments, the one or more selectable buttons 116 of the submenu button set 101 include one or more selectable buttons 116 which are related to the specific Event ID. In this regard, each selectable button 116 may include an associated data payload which is related to the specific Event ID.

In a step 2310, the user selects a selectable button 116 of the submenu button set 101. In a step 2312, an interactive content overlay window 102 appears, wherein the interactive content overlay window 102 displays the information/data of the data payload associated with the selected selectable button 116. In this regard, the data displayed within the interactive content overlay window 102 may be content which is related to, and specifically retrieved for, the specific Event ID.

Figure 24:
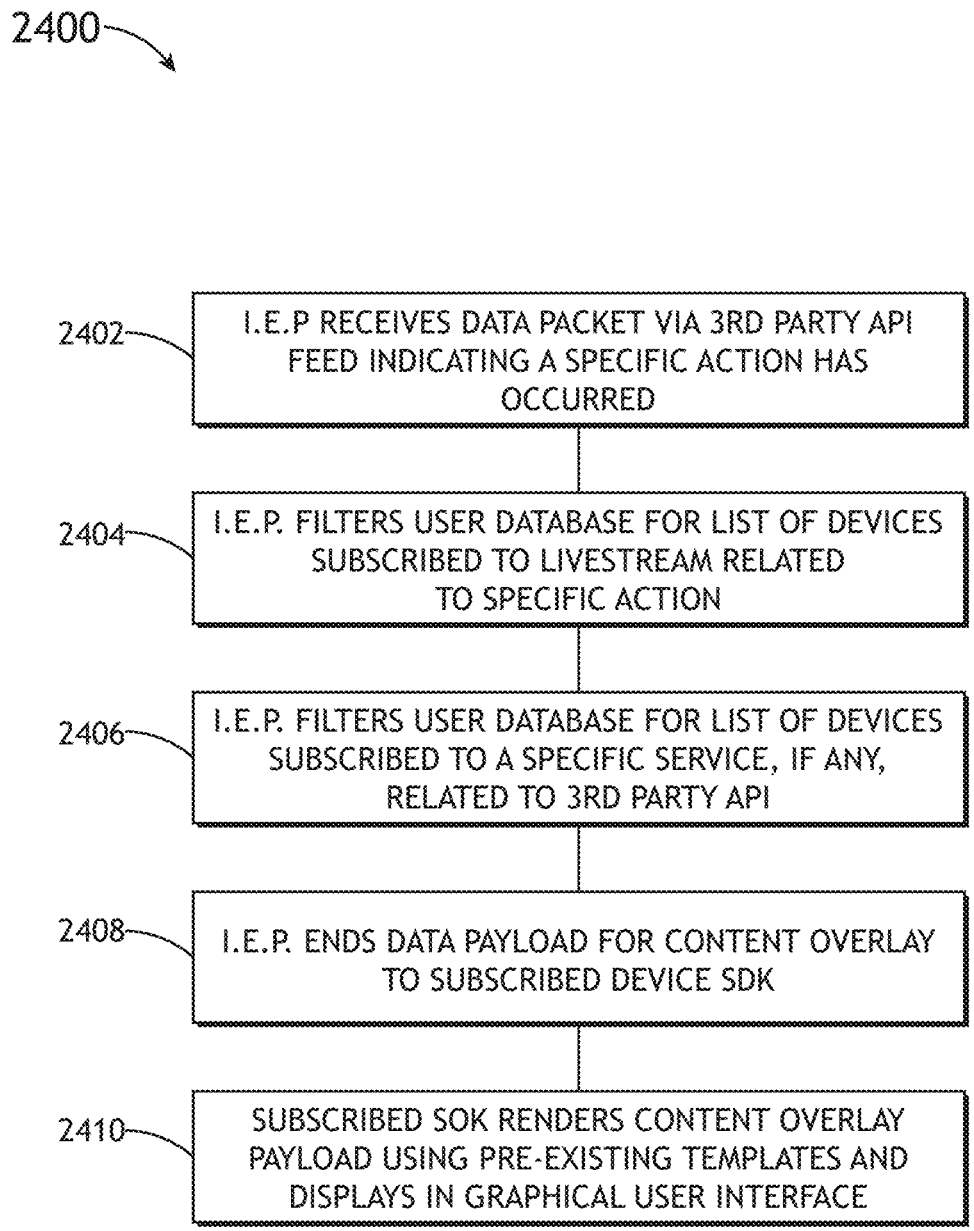
FIG. 24 illustrates a flowchart of a method for delivering in-app third party notifications in an interactive content overlay system, in accordance with one or more embodiments of the present disclosure.

FIG. 24 illustrates a flowchart of a method 2400 for delivering in-app third party notifications in an interactive content overlay system, in accordance with one or more embodiments of the present disclosure. More specifically, method 2400 illustrates the generation of in-app notifications related to third-party services. For example, the in-app notifications may include, but are not limited to, Twitter notifications, Yahoo Fantasy Football notifications, bet result notifications from a sports book, and the like. It is noted herein that the steps of method 2400 may be implemented all or in part by system 200. It is further recognized, however, that the method 2400 is not limited to the system 200 in that additional or alternative system-level embodiments may carry out all or part of the steps of method 2400.

In a step 2402, the interactive engagement platform 212 receives a data packet from a third-party API 208 indicating a specific action has occurred. For example, the API ingestion system 222 may receive a data packet from Yahoo Fantasy Football (e.g., third party content provider 214/third-party service provider 216) via a third-party API 208. The data packet may indicate that Player 1 scored a touchdown, and thereby scored points for Yahoo Fantasy Football users with Player 1 on their team. For instance, the third-party API 208 may transmit a Tweet "Touchdown Tom Brady!", and a user device 202 may display a notification showing the Tweet: "Touchdown Tom Brady!" By way of another example, a data packet received from a third-party gambling site may indicate that a team/player scored, or may indicate that the odds of a particular bet have changed.

In a step 2404, the interactive engagement platform 212 identifies one or more users (e.g., user devices 202) subscribed to a livestream related to the specific action. For example, continuing with the Yahoo Fantasy Football example, the interactive engagement platform 212 may search, query, filter, or otherwise identify within the one or more registration servers 222 (e.g., user databases 222) one or more user devices 202 which are subscribed to the FoxSports Bears vs Packers livestream.

In a step 2406, the interactive engagement platform 212 identifies one or more user devices 202 subscribed to a specific service related to the third-party API 208. For example, the interactive engagement platform 212 may search, query, filter, or otherwise identify within the one or more registration servers 222 (e.g., user databases 222) one or more user devices 202 which are subscribed to a service related to the Yahoo Fantasy Football API (e.g., third-party API 208).

In a step 2408, the interactive engagement platform 212 transmits a data payload to the one or more identified user devices 202 which subscribe to the third-party service. For example, the interactive engagement platform 212 may identify one hundred user devices 202 which are subscribed to the Yahoo Fantasy Football service. The routing/load balancer server 218 may transmit a data payload associated with the specific action to the content provider apps 204 of the one hundred user devices 202.

In a step 2410, the user devices 202 which received the data payload display information/data associated with the data payload in the graphical user interface 108. For example, the one hundred user devices 202 may display a notification in a small interactive content window 111 which alerts the users that Player 1 scored a touchdown, and therefore scored Yahoo Fantasy Football points.

It is noted herein that by querying, filtering, or searching a database or server (e.g., registration server 222) for user devices 202 which are subscribed to livestreams related to specific content/third-party APIs 208, the interactive engagement platform 212 may be configured to provide notifications, alerts, and other data to users which is tailored to each user's own tastes and subscriptions.

Figure 25:
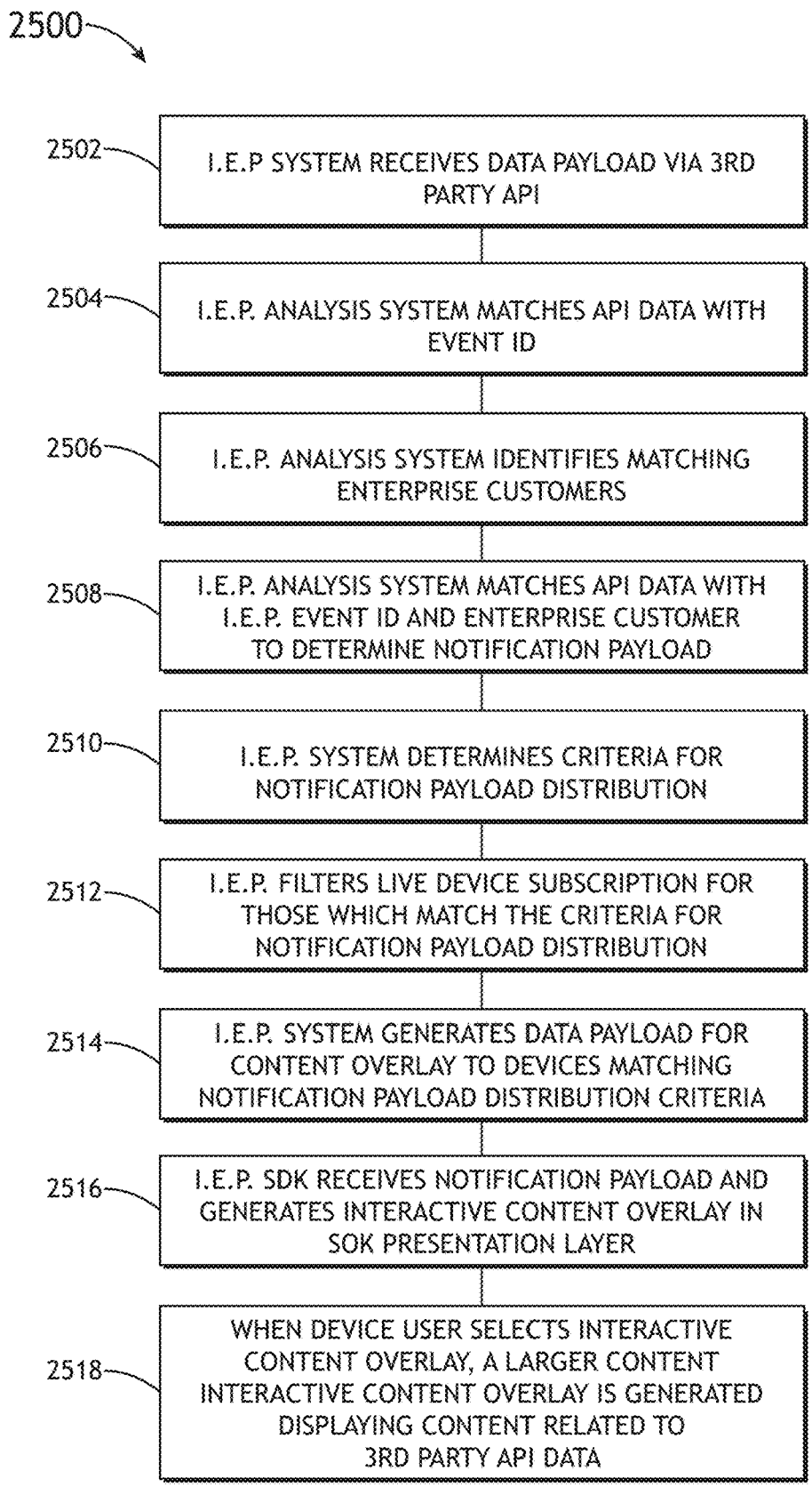
FIG. 25 illustrates a flowchart of a method for delivering a notification payload from a third-party in response to video events, in accordance with one or more embodiments of the present disclosure.

FIG. 25 illustrates a flowchart of a method 2500 for automatically delivering a notification payload from a third-party in response to game or other events, in accordance with one or more embodiments of the present disclosure. It is noted herein that the steps of method 2500 may be implemented all or in part by system 200. It is further recognized, however, that the method 2500 is not limited to the system 200 in that additional or alternative system-level embodiments may carry out all or part of the steps of method 2500.

More specifically, method 2500 illustrates a sequence for generating content in an interactive content overlay which is based on some action which takes place in the video program 103 being viewed. For example, a user may be watching the Manchester United vs. Chelsea game (e.g., video program 103) on their user device 202. During the game, a goal is scored. According to method 2500, the interactive engagement platform 212 may identify feeds from third-party APIs 208 which include ads based on a goal being scored in the game. For instance, if a feed from a third-party API 208 indicates an advertisement giving viewers free French fries in the event a goal is scored in the Manchester United vs. Chelsea game, the interactive engagement platform 212 may generate a notification which says "Goal! Free French Fries!" Any API trigger (e.g., in-game event, live video event) may be used as a trigger to generate notifications and/or interactive content overlays.

In a step 2502, the interactive engagement platform 212 receives a data payload from a third-party API 208. In a step 2504, the interactive engagement platform 212 matches the data payload with an Event ID. For example, the interactive engagement platform 212 may identify that the data payload is associated with Video A (e.g., video program 103a).

In a step 2506, the interactive engagement platform 212 identifies one or more users (user devices 202) which match to the data payload based on the event ID. In a step 2508, the interactive engagement platform 212 matches the data payload received from the third-party API 208 (Bears touchdown) with the Event ID (e.g., Event ID associated with the game "Bears vs Packers") and one or more identified user devices 202 to determine a notification payload (e.g., an advertisement). This may be carried out by the analysis system 234 of the interactive engagement platform 212. In a step 2510, the interactive engagement platform 212 determines distribution criteria of the notification payload (if Bears score a touchdown then show advertisements to users in Chicago watching Bears game).

In a step 2512, the interactive engagement platform 212 filters, queries, searches, or otherwise identify one or more user devices 202 within the one or more registration servers 222 (user databases) which match the distribution criteria of the notification payload. In a step 2514, the interactive engagement platform 212 transmits a notification data payload to the one or more identified user devices 202 which match the distribution criteria. For example, the routing/load balancer server 218 may transmit a notification data payload to the content overlay SDKs 210 interfaced with the content provider apps 204 of the one or more identified user devices 202. In a step 2516, content overlay SDKs 210 of the one or more identified user devices 202 receives the notification data payload.

In a step 2518, the content provider app 204/content overlay SDK 210 generates one or more control signals configured to cause the graphical user interface 108 to display the information/data associated with the notification data payload. For example, the one or more control signals may be configured to cause the graphical user interface 108 to display a notification 105 and/or small interactive content overlay window 111. Upon selection of the notification 105 and/or small interactive content overlay window 111, the graphical user interface 108 may display the information/data associated with the notification data payload in an interactive content overlay window 102. For example, the interactive content overlay window 102 may display the message "Goal! Free French Fries!" and/or other information related to the data payload received from the third-party API 208.

Figure 26:
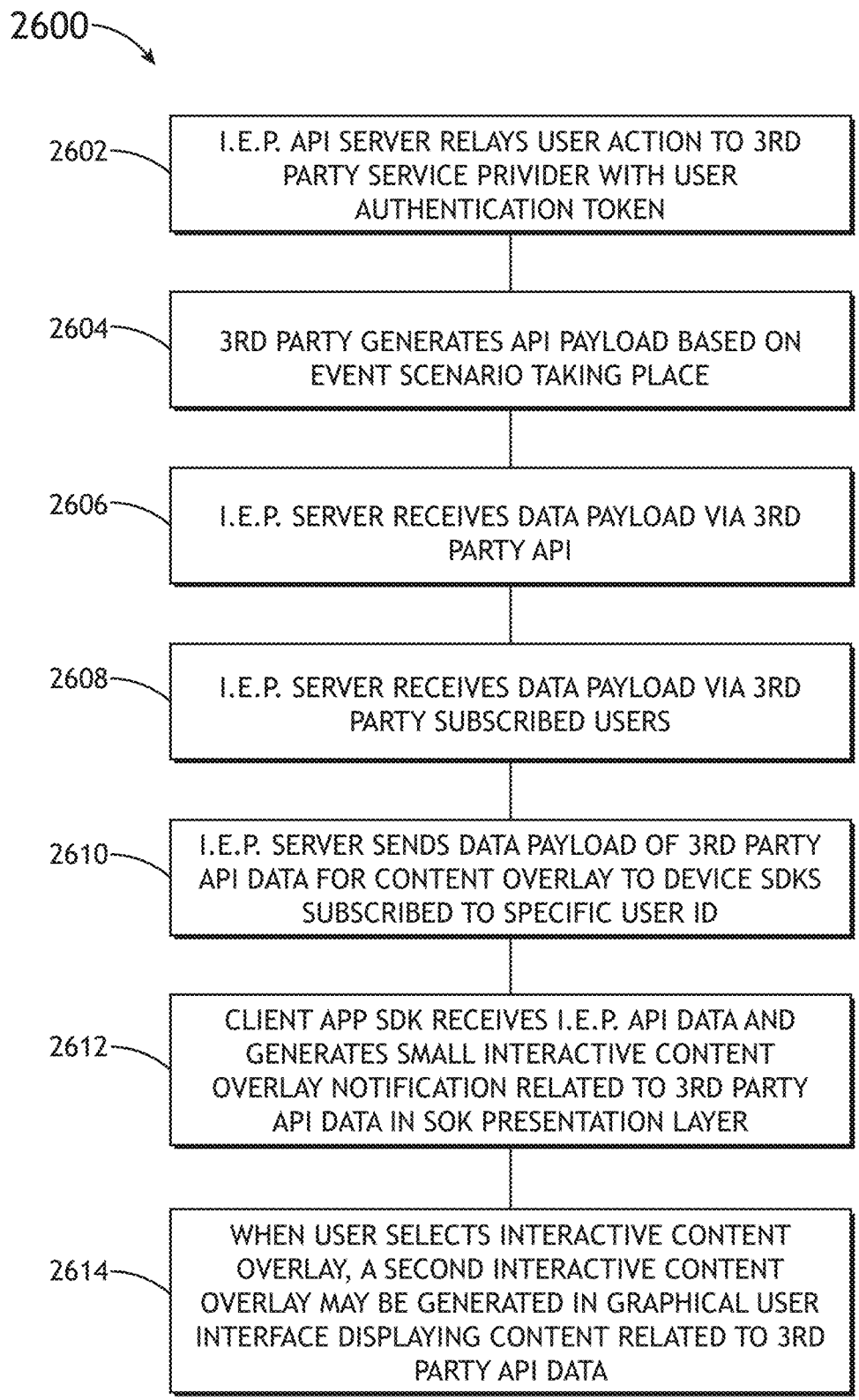
FIG. 26 illustrates a flowchart of a method for delivering a notification payload from a third party service provider based on user subscription services, in accordance with one or more embodiments of the present disclosure.

FIG. 26 illustrates a flowchart of a method 2600 for delivering a notification payload from a third party service provider based on user subscription services, in accordance with one or more embodiments of the present disclosure. It is noted herein that the steps of method 2600 may be implemented all or in part by system 200. It is further recognized, however, that the method 2600 is not limited to the system 200 in that additional or alternative system-level embodiments may carry out all or part of the steps of method 2600.

In particular, method 2600 illustrates a method for generating notifications based on data payloads received from third-party APIs 208 which are related to services for which a user (e.g., user device 202) has a subscription. Various services to which a user/user device 202 may have a subscription may include, but are not limited to, fantasy leagues, gambling operation services, services provided by the interactive engagement platform 212 itself, and the like.

In a step 2602, the interactive engagement platform 212 relays a user action to a third-party service provider 216 with a user authentication token. For example, a user may input one or more input commands (user action) via the user device 202, and the interactive engagement platform 212 may be configured to receive the one or more input commands (via the routing/load balancer server 218) and relay the one or more input commands, with an authentication token, to the third-party service provider 216 (via the third-party APIs 208). In this regard, a user (user device 212) may effectively "subscribe" to a service provided by the third-party service provider 216.

In a step 2604, the third-party service provider 216 may generate a data payload based on an event taking place. For example, if the third-party service provider 216 includes a gambling service provider, the gambling service provider 216 may generate a data payload in response to the odds changing in an upcoming basketball game. In this regard, the generated data payload may include data relating to the event. For instance, the data payload may include a notification as to the odds change, the previous odds, the current odds, a reason for the change, and the like.

In a step 2606, the interactive engagement platform 212 receives the data payload from the third-party service provider 216 (via the third-party API 208). In a step 2608, the interactive engagement platform 212 matches the data payload with one or more user devices 202 subscribed to receive the data payload. In a step 2610, the interactive engagement platform 212 (via routing/load balancer server 218) transmits the data payload received from the third-party service provider 216 to the content delivery SDK 210 associated with the one or more subscribed user devices 202. In a step 2612, the content delivery SDK 210 and/or the content provider app 204 generates a small interactive content overlay window 111 to display data of the data payload.

In a step 2614, the content provider app 204/content overlay SDK 210 generates an interactive content overlay window 102 in response to a user's selection of the small interactive content overlay window 111. The interactive content overlay window 102 may then display the data/information of the data payload received from the third-party service provider 216. For example, continuing with the gambling service provider example, the interactive content overlay window 102 may display the previous odds of the basketball game, the current odds, the reason for the change, and the like. By way of another example, the interactive graphical user interface 102 may direct the user to the website of the third-party service provider 216 in order to allow the user to place a bet on the new odds.

Figure 27:
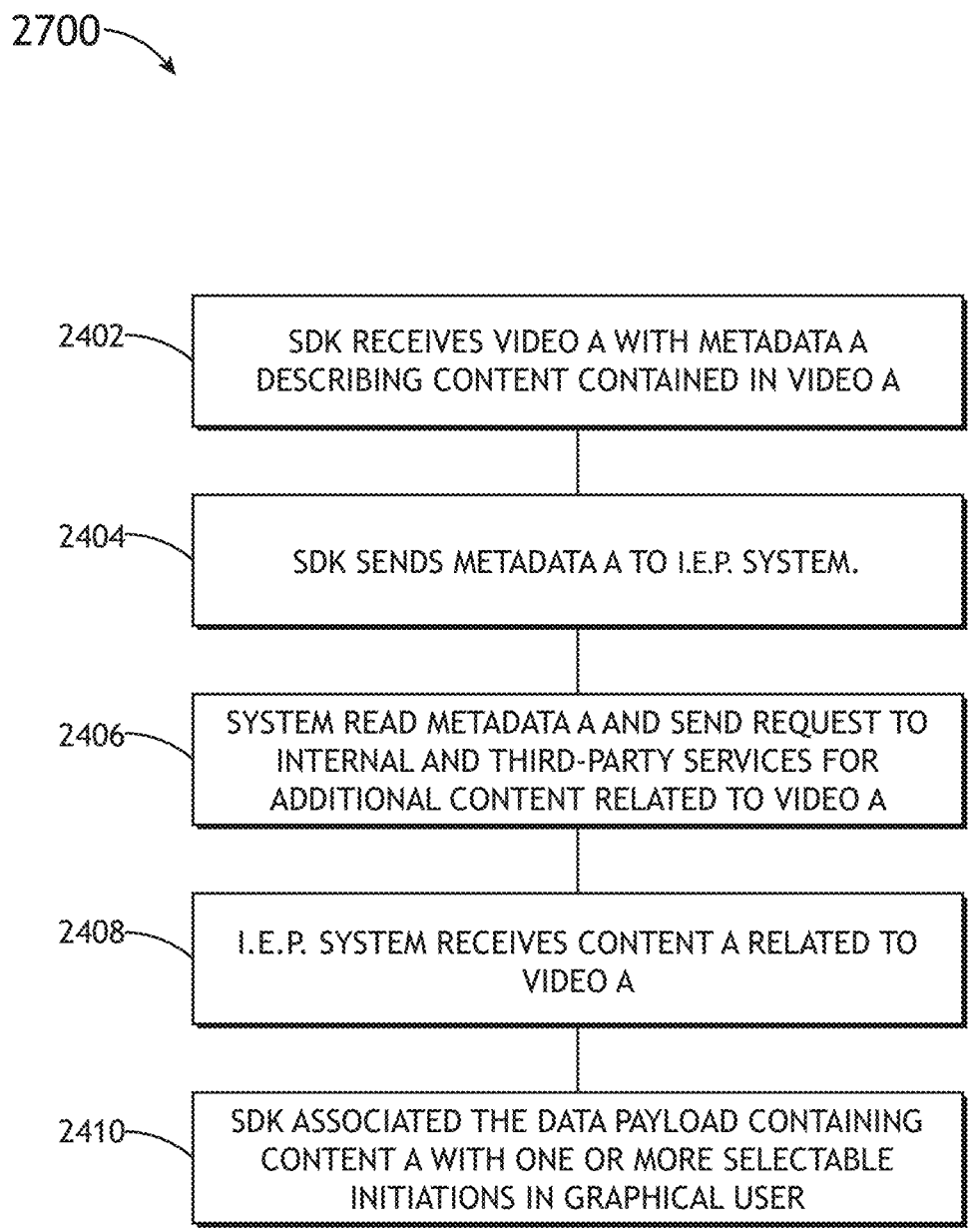
FIG. 27 illustrates a flowchart of a method for dynamically sourcing content within an interactive content overlay system, in accordance with one or more embodiments of the present disclosure.

FIG. 27 illustrates a flowchart of a method 2700 for dynamically sourcing content within an interactive content overlay system, in accordance with one or more embodiments of the present disclosure. In particular, method 2700 illustrates a sequence for automatically pairing video content (e.g., video program 103 content) with supplemental content to appear in the interactive content overlay. It is noted herein that the steps of method 2700 may be implemented all or in part by system 200. It is further recognized, however, that the method 2700 is not limited to the system 200 in that additional or alternative system-level embodiments may carry out all or part of the steps of method 2700.

In a step 2702, Metadata A describing the content contained within Video A is received and extracted by the content overlay SDK 210. For example, the content overlay SDK 210 may extract the metadata from the video content stream 205a for Video A and determine that Video A is a football game between Team 1 and Team 2.

In a step 2704, Metadata A is transmitted to the interactive engagement platform 212 by the content overlay SDK 210. In a step 2706, the interactive engagement platform 212 reads Metadata A and transmits one or more requests for additional content related to Video A. For example, the analysis system 234 may analyze Metadata A to determine that Video A is a football game between Team 1 and Team 2, and may transmit one or more requests for additional content related to Team 1, Team 2, players from either team, the league hosting the game, and the like. It is noted herein that requests for additional information may be sent to content/service providers within the interactive engagement platform 212 (e.g., advertising system 230, registration server 222, and the like), third-party content providers 214, and/or third-party service providers 216.

In a step 2708, the interactive engagement platform 212 receives Content A (e.g., data payload for Content A), wherein Content A is related to Video A. For example, the API ingestion system 220 may receive a data payload for Content A from a third-party content provider 214. In a step 2710, the interactive engagement platform 212 transmits the data payload including Content A to the content overlay SDK 210. In a step 2712, the content overlay SDK 210 associates the data payload containing Content A with one or more selectable buttons 116 displayed on the graphical user interface 108.

As noted previously herein, supplemental content associated with selectable buttons 116 may include a wide variety of supplemental content. In some embodiments, as noted previously herein, the supplemental content associated with selectable buttons 116 may be partially dependent on the video program 103 being viewed. For example, all NFL football games (video program 103) may include selectable buttons 116 which are associated with statistics, social media platforms of the teams/players, and merchandise of the teams/league. It is further noted herein that the interactive engagement platform 212 may be configured to tailor the supplemental content associated with selectable buttons 116 for each user. In this regard, the supplemental content associated with selectable buttons 116 may be based, at least partially, on geographic location of each user device 102, viewing preferences/tendencies of each user, gambling histories, historical use of the interactive engagement platform, and the like.

Figure 28:
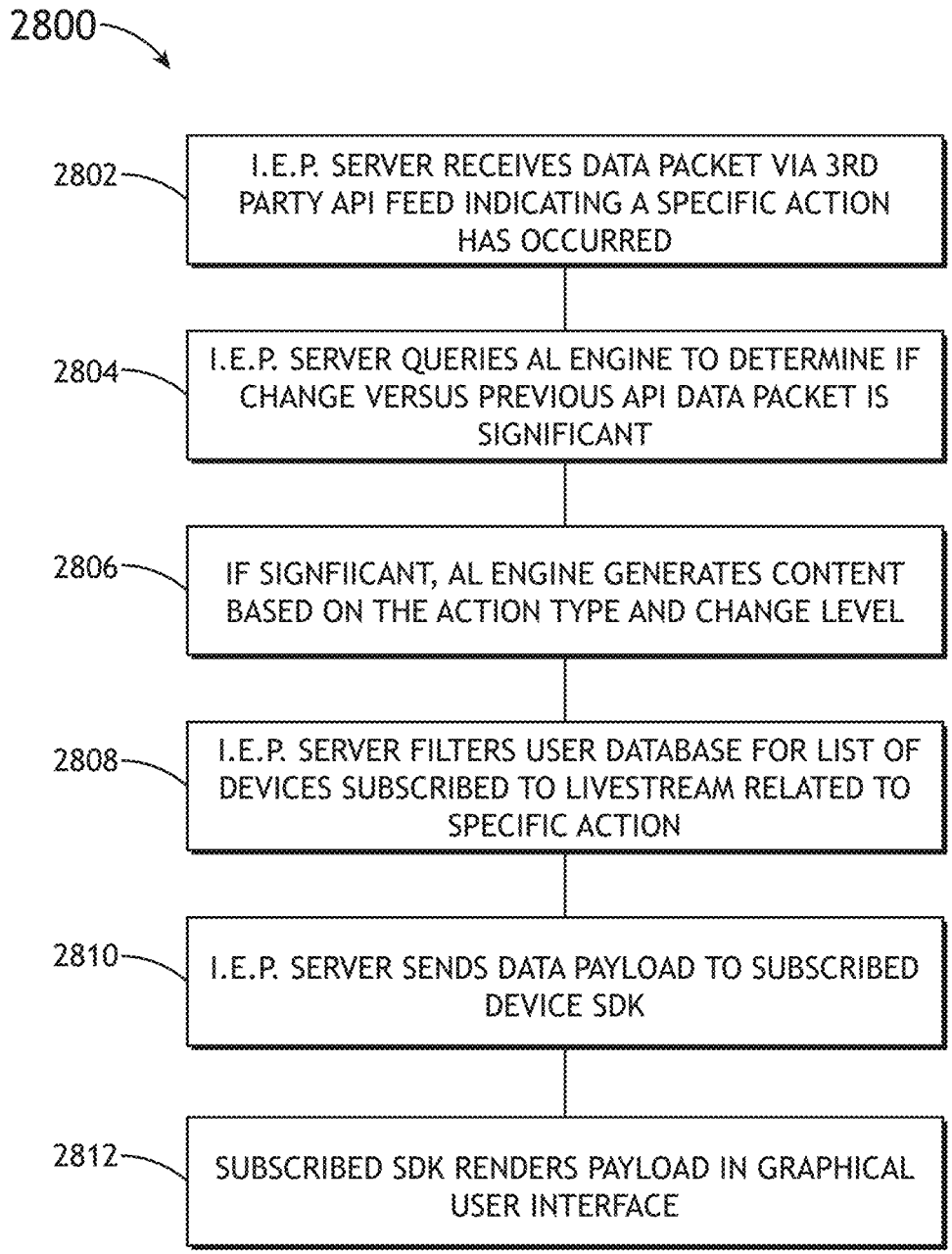
FIG. 28 illustrates a flowchart of a method for dynamically sourcing content within an interactive content overlay system, in accordance with one or more embodiments of the present disclosure.

FIG. 28 illustrates a flowchart of a method 2800 for dynamically sourcing content within an interactive content overlay system, in accordance with one or more embodiments of the present disclosure. It is noted herein that the steps of method 2800 may be implemented all or in part by system 200. It is further recognized, however, that the method 2800 is not limited to the system 200 in that additional or alternative system-level embodiments may carry out all or part of the steps of method 2800.

In particular, method 2800 illustrates a sequence for automatically generating content/notifications in the interactive content overlay based on some action which takes place in the video program 103 being viewed on the user device 202. For example, a user may be viewing a soccer match (e.g., video program 103) on a user device 202. If a goal is scored in the match, the system 200 may recognize this as a betting opportunity, and may automatically generate a notification 105 or small interactive content overlay 111 alerting the user to the new betting opportunity.

In a step 2802, the interactive engagement platform 212 receives a data packet from a third-party API 208 indicating a specific action has occurred. For example, the API ingestion system 220 may receive a data packet from third-party content provider 214 indicating that a goal has been scored in a soccer match.

In a step 2804, the interactive engagement platform 212 determines if the event indicated by the data packet is significant. The interactive engagement platform 212 may determine if the event indicated by the data packet is significant by comparing the data packet to one or more previous data packets received by the third-party API 208. In one embodiment, the interactive engagement platform 212 may utilize artificial intelligence to determine if the event is significant. For example, the analysis system 234 of the interactive engagement platform 212 may include one or more artificial intelligence (AI) modules, wherein the one or more AI modules are configured to determine whether the event indicated by the data packet is significant. The AI module may use any machine learning techniques known in the art.

In a step 2806, the interactive engagement platform 212 generates additional content based on the event that occurred and the significance of the change. For example, the AI module of the analysis system 234 may generate additional content related to the data packet. Continuing with the same example, additional content may include, but is not limited to, newly available bets, statistics related to the event, and the like. In a step 2808, the interactive engagement platform 212 identifies one or more user devices 202 subscribed to a livestream related to the specific action. In a step 2810, the interactive engagement platform 2810 transmits a data payload including the additional generated content to the content overlay SDKs 210 of the one or more identified user devices 202. In a step 2812, the content overlay SDK 210 associates the received data payload with a notification 105, small interactive content overlay window 111, a selectable button 116, or the like, within the graphical user interface.

Figure 29:
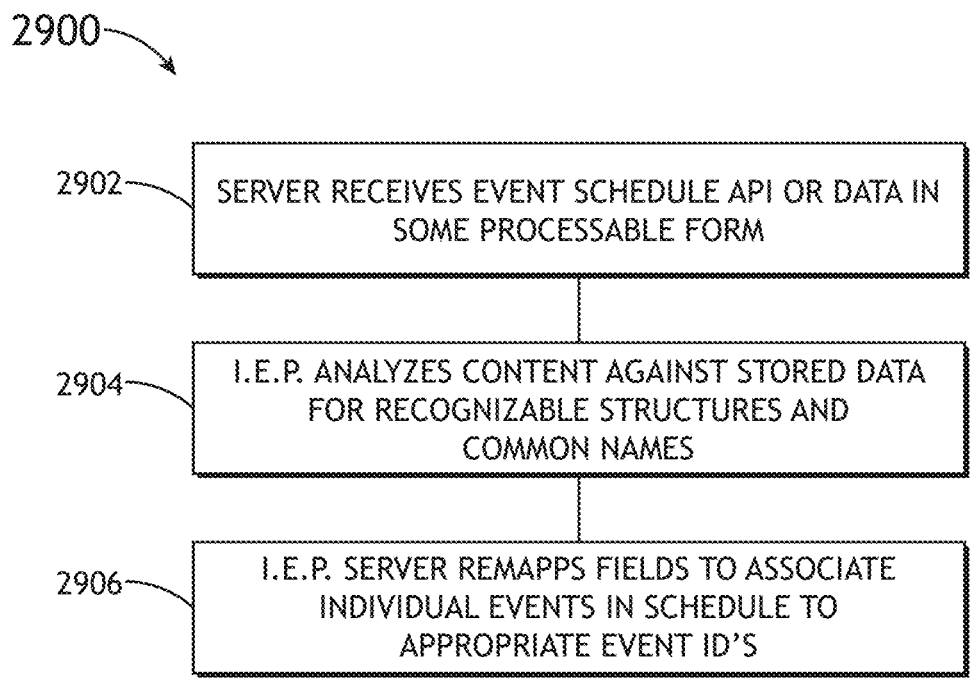
FIG. 29 illustrates a flowchart of a method for re-mapping event fields, in accordance with one or more embodiments of the present disclosure.

FIG. 29 illustrates a flowchart of a method 2900 for re-mapping event fields, in accordance with one or more embodiments of the present disclosure. It is noted herein that the steps of method 2900 may be implemented all or in part by system 200. It is further recognized, however, that the method 2900 is not limited to the system 200 in that additional or alternative system-level embodiments may carry out all or part of the steps of method 2900.

In one embodiment, method 2900 may be used to automatically match different independent schedules to an interactive engagement platform 212 Event ID. For example, NBC Sports is to be onboarded as a new client within the interactive engagement platform 212 (e.g., NBC Sports content provider app 204). Upon adding NBC Sports as a client, all 780 games of a Premier League season would need to be matched. In this regard, method 2900 may be used to automatically re-map event fields in order to significantly reduce onboarding time.

In a step 2902, the interactive engagement platform 212 receives an event schedule from a third-party provider 214, 216 via a third-party API 208. In a step 1904, the interactive engagement platform 212 analyzes the event schedule and compare the event schedule against stored data (e.g., stored event schedules, stored Event IDs, and the like) for recognizable structures and common names. For example, the event scheduling system 226 may compare the Premier League team names with stored data (e.g., stored event schedules, stored Event IDs, and the like) for recognizable structures and common names. For instance, if Premier League games are also shown by a different third-party provider 214, 216, the event scheduling system 226 may be configured to recognize a particular team and/or particular game as corresponding to a team and/or game previously stored within the event scheduling system 226 and associated with an existing interactive engagement platform 212 Event ID. In a step 2906, the interactive engagement platform 212 re-maps fields/events of the received event schedule to appropriate interactive engagement platform 212 Event IDs.

Figure 30:
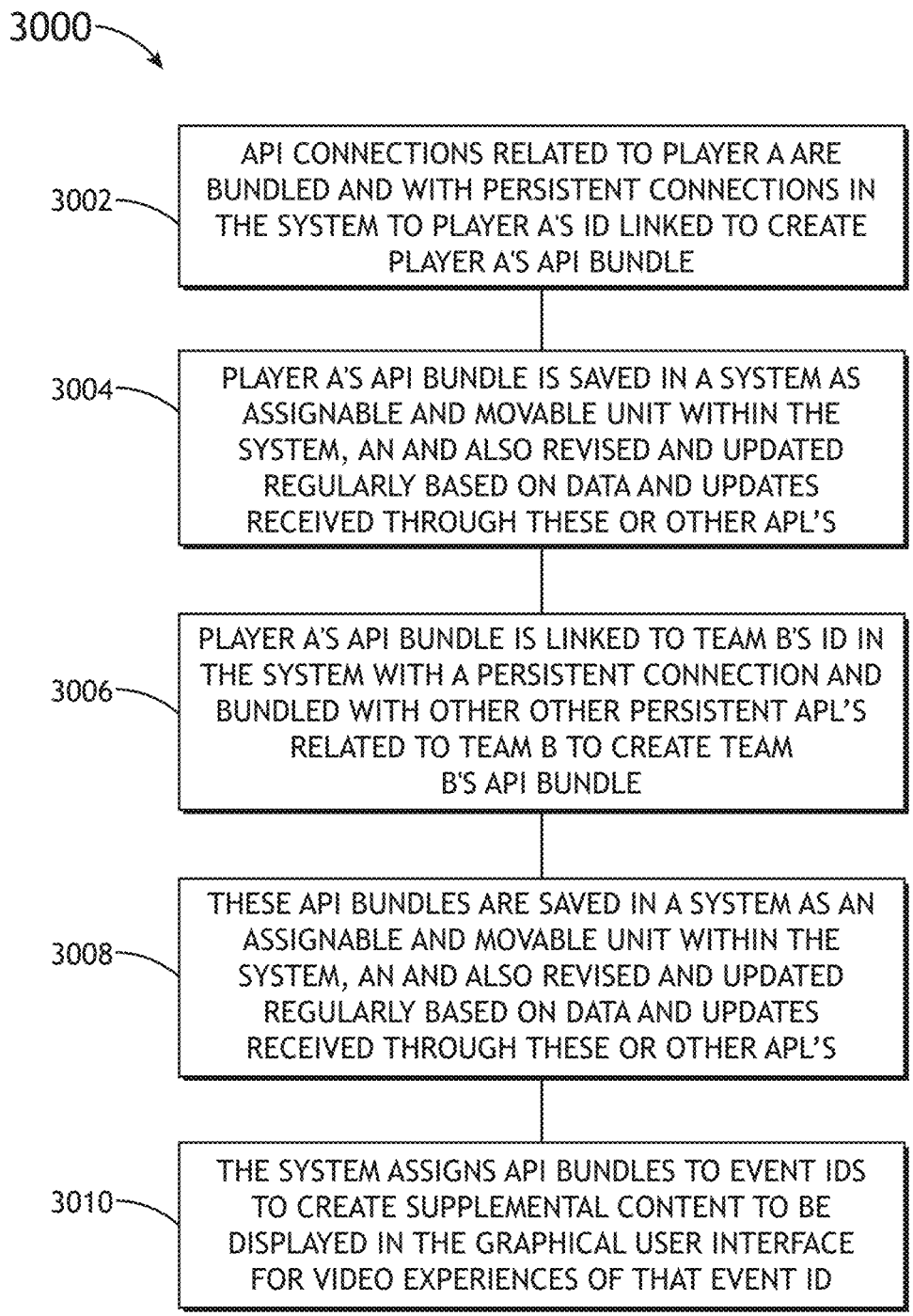
FIG. 30 illustrates a flowchart of a method for associating individuals and/or entities with various API bundles, in accordance with one or more embodiments of the present disclosure.

FIG. 30 illustrates a flowchart of a method 3000 for associating individuals and/or entities with various API bundles, in accordance with one or more embodiments of the present disclosure. It is noted herein that the steps of method 3000 may be implemented all or in part by system 200. It is further recognized, however, that the method 3000 is not limited to the system 200 in that additional or alternative system-level embodiments may carry out all or part of the steps of method 3000.

As it is used herein, the term "API bundle" may be regarded as referring to a collection of one or more data streams received from the one or more third-party APIs. In one embodiment, method 3000 may be utilized by system 200 to create a database comprised of hub-and-spoke "API bundles." Within an API bundle, an entity (e.g., a team, a player, and the like) may make up the "hub," and the "spokes" may include content and APIs related to the hub entity. For example, if Player 1 on Team A was set as the hub of an API bundle, spokes may include, but are not limited to, Team A, League A, Player 2 on Team A, Player 3 on Team A, Player 1 on Team B, and the like. It is contemplated herein that creating API bundles and maintaining the API bundles with up-to-date connections, the organization and flow of supplemental content which may be provided to the interactive content overlay may be greatly simplified.

In a step 3002, Player A's API bundle is created. For example, API connections related to Player A may be bundled and linked to Player A's ID with persistent connections within the interactive engagement platform 212. In a step 3004, Player A's API bundle is saved within a database of interactive engagement platform 212. Player A's API bundle may be saved as an assignable and moveable unit. Furthermore, Player A's API bundle may be revised and updated on a regular basis based on data received from third-party providers 214, 216. For example, if data received from a third-party provider 214, 216 indicates that Player A has been traded to a different team, the interactive engagement platform 212 may edit Player A's API bundle such that the spokes more accurately represent Player A following the trade.

In a step 3006, Player A's API bundle may be linked to a team and additional API bundles related to the team. For example, Player A's API bundle may be linked to Team B's ID within the interactive engagement platform 212 with a persistent connection to create a single collective API bundle. Player A's API bundle may be further bundled and linked with other APIs and API bundles related to Team B to create Team B's collective API bundle.

In a step 3008, API bundles are saved within the interactive engagement platform 212 as assignable and movable units. As noted previously herein, the API bundles may be continuously and/or regularly revised/updated based on data received from third-party APIs 208.

In a step 3010, the interactive engagement platform 212 assigns API bundles to Event IDs to create supplemental content which may be displayed in the graphical user interface 108. For example, Event ID: 65 may be a game between Team A and Team B, including Player 1 and Player 2. In this example, the API matching system 224 may be configured to assign the API bundles for Team A, Team B, Player 1, and Player 2 to Event ID: 65. In this regard, users viewing the game (Event ID: 65) may be provided with the API bundles for the relevant teams and players, which includes supplemental content relevant to the game. The use of API bundles may be further understood with reference to FIGS. 31A-31B.

Figure 31A:
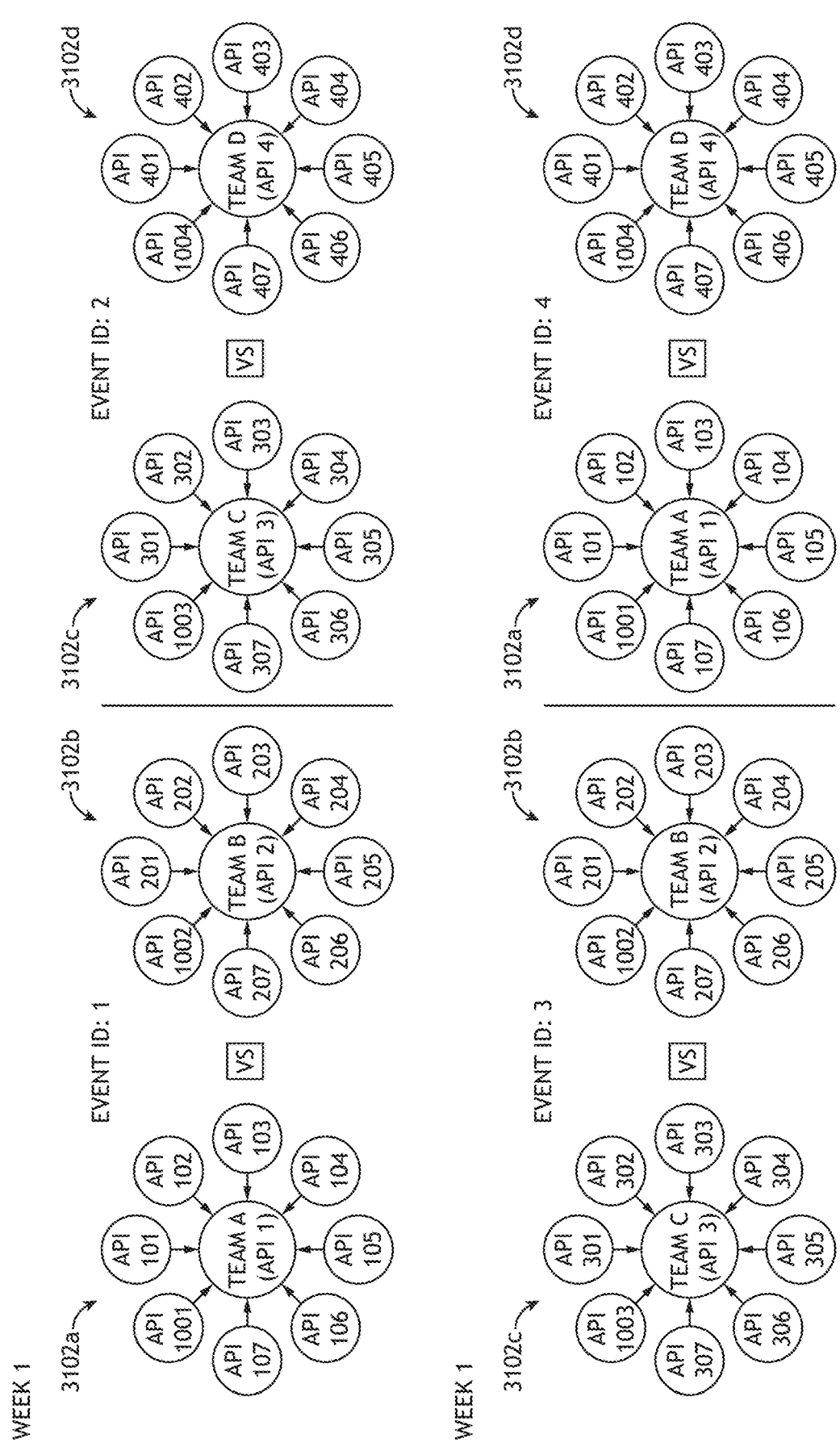
FIGS. 31A-31B illustrate a hub-and-spoke model of teams associated with various API bundles, in accordance with one or more embodiments of the present disclosure.
Figure 31B:
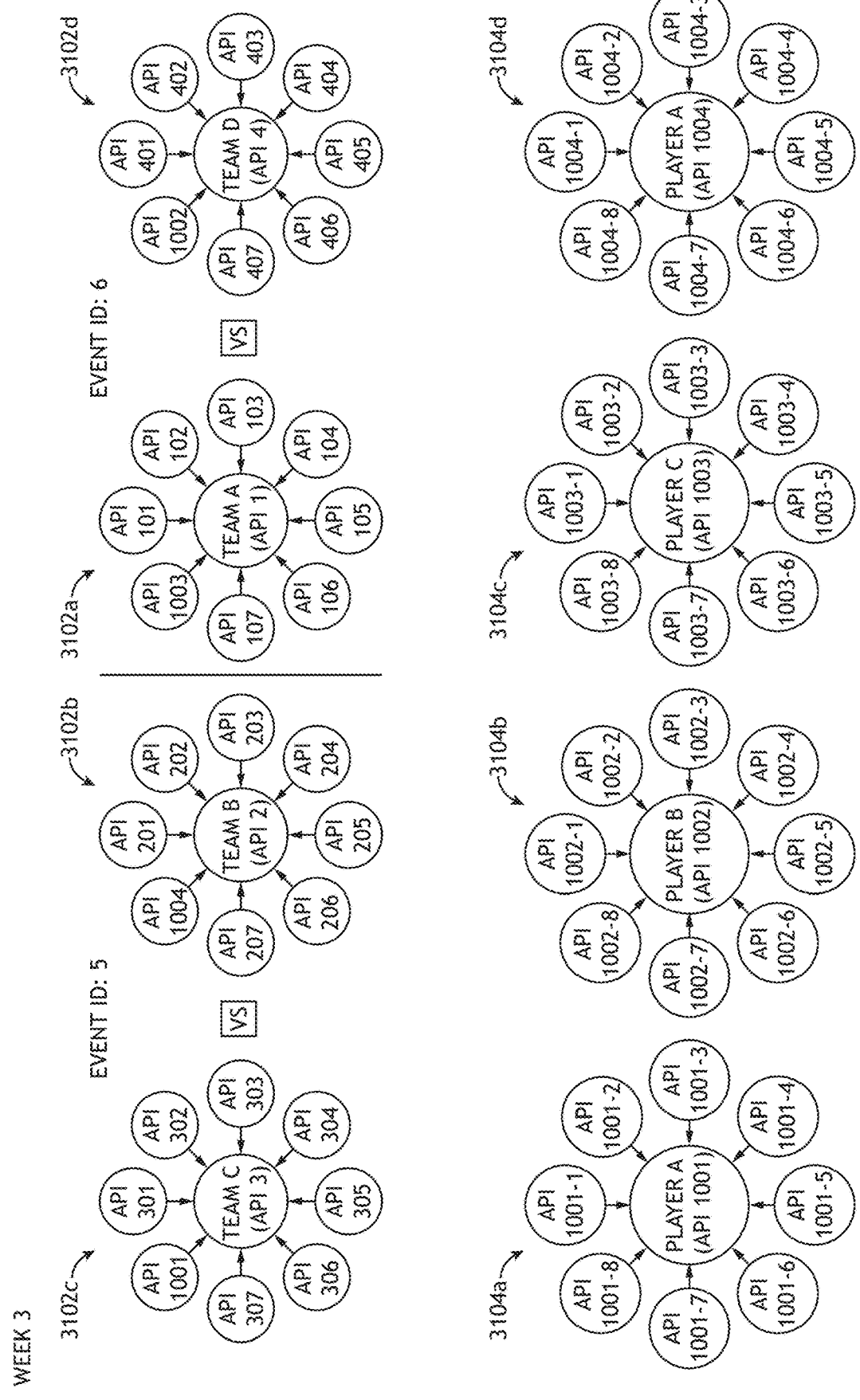

FIGS. 31A-31B illustrate a hub-and-spoke model of teams associated with various API bundles, in accordance with one or more embodiments of the present disclosure. As shown in FIGS. 31A-31B, each team within a league may have their own API bundle 3102a-3102d, such that the API bundles including supplemental content related to each respective team may be easily moved and associated with Event IDs (e.g., games) throughout a season. Similarly, as shown in FIG. 31B, each player may include a may have their own API bundle 3104a-3104d, such that the API bundles including supplemental content related to each respective player may be easily moved and associated with Event IDs (e.g., games) throughout a season. It is further noted herein that the spokes of the team API bundles 3102a-3102d may include player API bundles 3104a-3104d. Similarly, the spokes of the player API bundles 3102a-3102d may include team API bundles 3102a-3102d.

Figure 32:
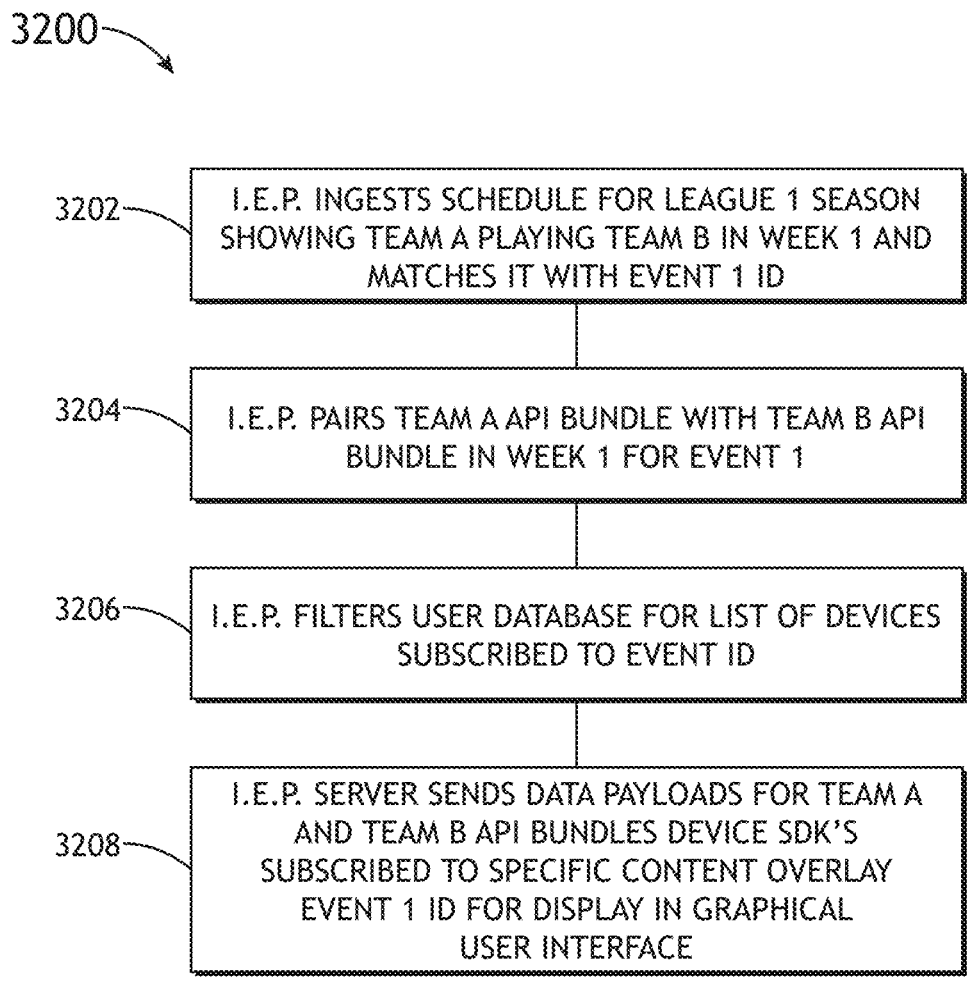
FIG. 32 illustrates a flowchart of a method for pairing API bundles with Event IDs, in accordance with one or more embodiments of the present disclosure.

FIG. 32 illustrates a flowchart of a method 3200 for pairing API bundles with Event IDs, in accordance with one or more embodiments of the present disclosure. It is noted herein that the steps of method 3200 may be implemented all or in part by system 200. It is further recognized, however, that the method 3200 is not limited to the system 200 in that additional or alternative system-level embodiments may carry out all or part of the steps of method 3200.

In one embodiment, method 3200 relates to the movement and pairing of API bundles within the interactive engagement platform 212. An example may prove to be illustrative before the steps of method 3200 are described in detail. When the interactive engagement platform 212 onboards and ingests an event schedule for a new customer, it may automatically pair API bundles with their associated Event IDs based on the relevant team or player data. For instance, API bundles for Team A and Team B may be paired together for the Event ID for the game between Team A and Team B. In this regard, all of the supplemental content associated with the API bundles for Team A and Team B may be associated with the Event ID such that the supplemental content is accessible in the graphical user interface 108 of user devices 202 watching the game (video program 103).

It is noted herein that providing API bundles as "units" may allow the API bundles to be moved independently of leagues. For example, the Chelsea soccer team typically plays in the English Premier League. However, Chelsea also plays games in the Champions League, which includes teams from leagues all across Europe, as well as friendly matches against teams across the world, including the United States. In this regard, the API bundle for Chelsea may be moved and associated with Event IDs which include games involving Chelsea no matter which league the game is being played. Similarly, in the context of tennis and/or golf, as players advance or become eliminated, the API bundles for each player may be moved or re-organized and assigned to Event IDs to account for new pairings, eliminated players, and the like.

In a step 3202, the interactive engagement platform 212 ingests a schedule for a League 1 season. For example, as shown in FIG. 31A, the interactive engagement platform 212 may identify that Team A plays Team B in Week 1, and may assign this game to be Event ID:1.

In a step 3204, the interactive engagement platform 212 pairs the Team A API bundle with Team B API bundle for Event ID:1 in Week 1. In this regard, Team A API bundle and Team B API bundle may be assigned to Event ID: 1.

In a step 3406, the interactive engagement platform identifies one or more user devices 202 subscribed to Event 1:ID. For example, the interactive engagement platform 212 may query, filter, search, or otherwise identify one or more user devices 202 within the registration server 222 (user database) viewing Event ID:1.

In a step 3408, the interactive engagement platform 212 transmits data payloads for Team A and Team B API bundles to the content delivery SDKs 210 associated with the one or more identified user devices 202. The content delivery SDKs 210 and/or content provider apps 204 may then associate the received data payloads with one or more selectable buttons 216 within the graphical user interface 108 such that the supplemental content associated with Team A and Team B API bundles may be viewed within a interactive content overlay window 102.

Figure 33:
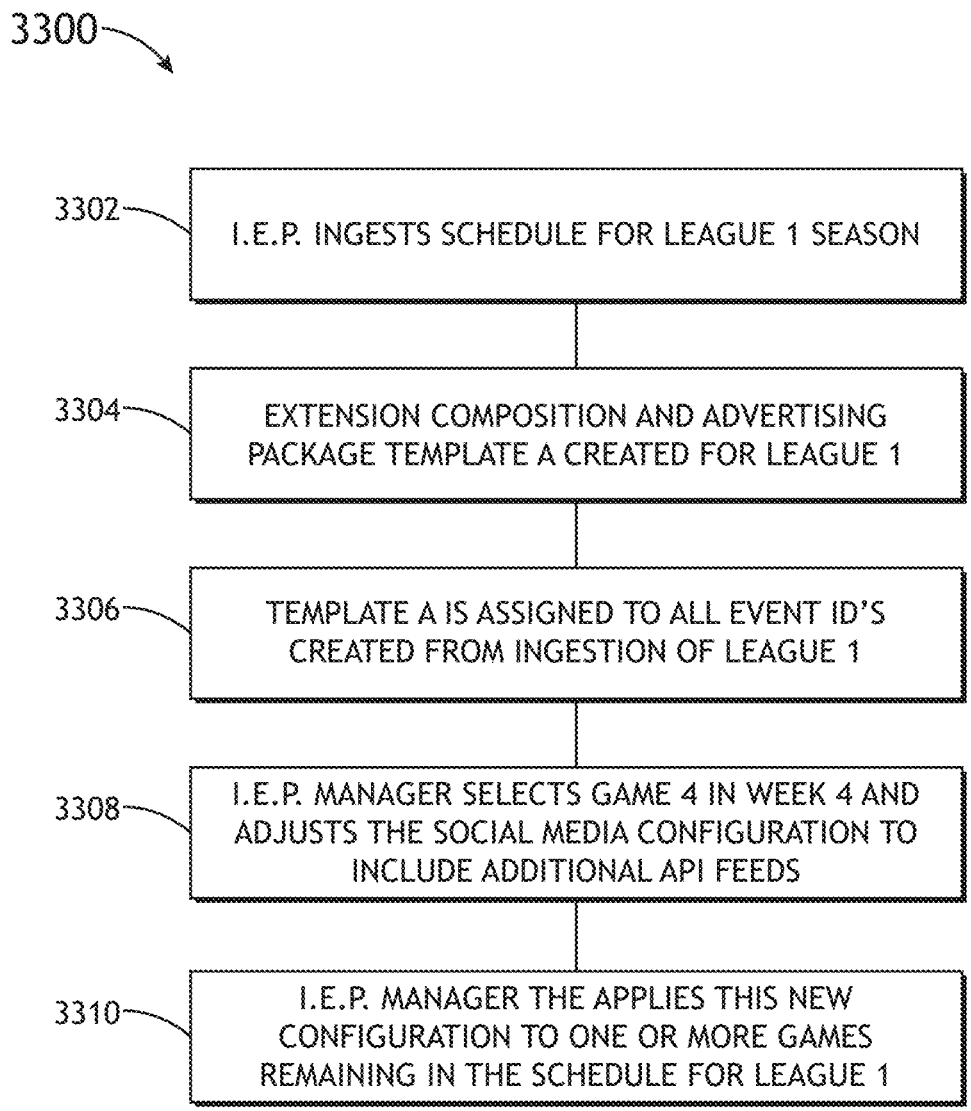
FIG. 33 illustrates a flowchart of a method for the creation of advertising packages for similar events, in accordance with one or more embodiments of the present disclosure.

FIG. 33 illustrates a flowchart of a method 3300 for the creation of advertising packages for similar events, in accordance with one or more embodiments of the present disclosure. It is noted herein that the steps of method 3300 may be implemented all or in part by system 200. It is further recognized, however, that the method 3300 is not limited to the system 200 in that additional or alternative system-level embodiments may carry out all or part of the steps of method 3300.

In a step 3302, the interactive engagement platform 212 ingests a schedule. For example, the API ingestion system 220 of the interactive engagement platform 212 may receive a schedule for League 1 season from a third-party API 208. The interactive engagement platform 212 may then assign Event IDs for each game within the League 1 season, such that a first game has a first Event ID (e.g., Event ID:1), a second game has a second Event ID (e.g., Event ID:2), and the like. In a step 3304, an extension composition and advertising package (Template A) is created for League 1.

In a step 3306, Template A is assigned to all Event IDs created from the ingestion of League 1. For example, if the League 1 season included one-hundred games (e.g., Event ID:1, Event ID:2 . . . Event ID:100), the Template A may be assigned to each Event ID.

In a step 3308, one or more characteristics of Template A are adjusted. For example, as shown in FIG. 33, an individual may use the control panel 238 to select Game 4, Week 4, and adjust the social media configuration in order to include additional API feeds. In this regard, Template A for Game 4, Week 4 may be configured to receive one or more additional API feeds from one or more third-party APIs 208.

In a step 3310, the one or more adjusted characteristics may be applied to one or more additional Event IDs. For example, as shown in FIG. 33, the control panel 238 may be used to apply the new Template A configuration to one or more games within League 1 (e.g., one or more additional Event IDs).

Figure 34:
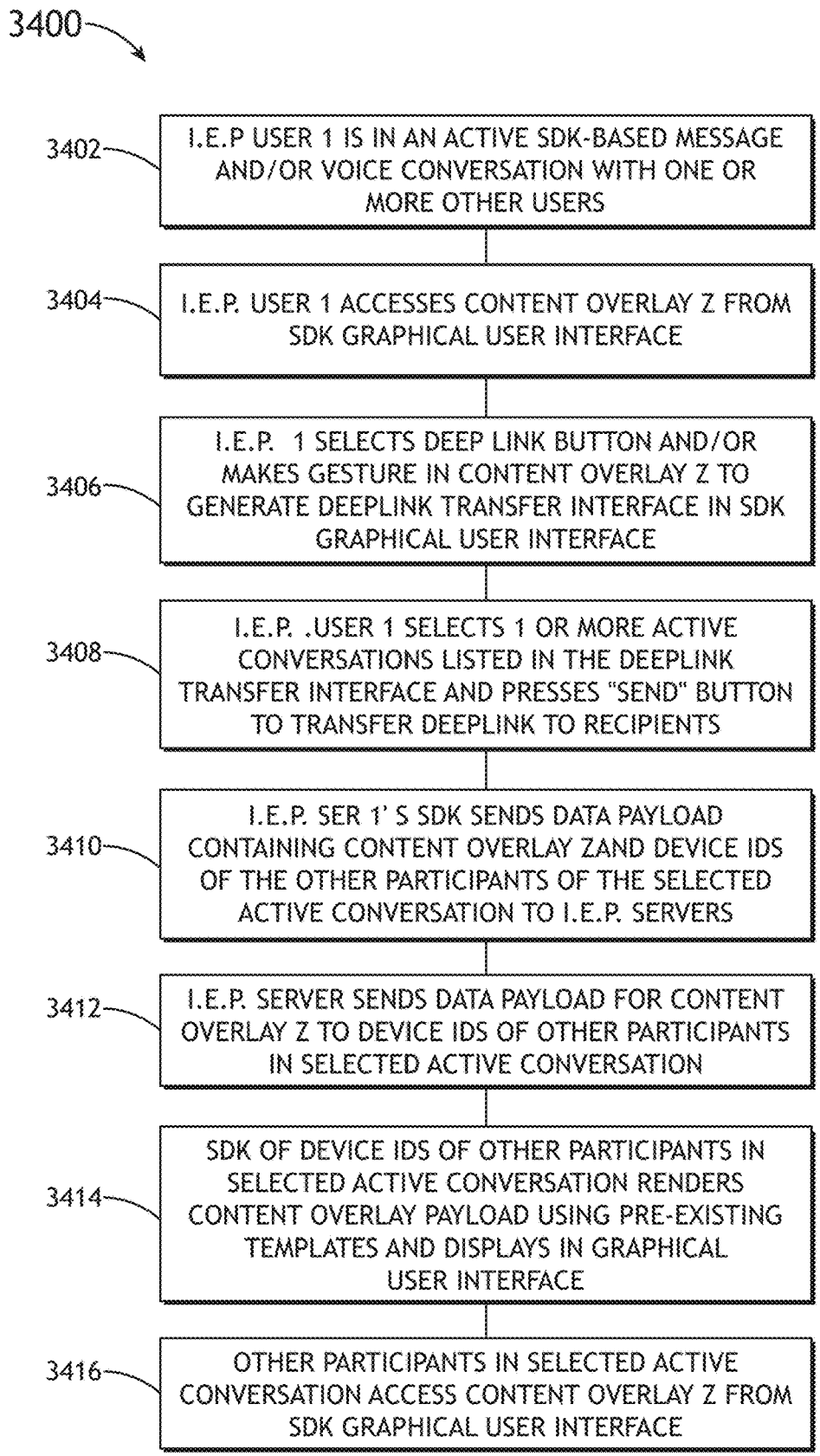
FIG. 34 illustrates a flowchart of a method for sharing an interactive content overlay with active conversation groups within an interactive content overlay system, in accordance with one or more embodiments of the present disclosure.

FIG. 34 illustrates a flowchart of a method 3400 for sharing an interactive content overlay with active conversation groups within an interactive content overlay system, in accordance with one or more embodiments of the present disclosure. It is noted herein that the steps of method 3400 may be implemented all or in part by system 200. It is further recognized, however, that the method 3400 is not limited to the system 200 in that additional or alternative system-level embodiments may carry out all or part of the steps of method 3400.

In one embodiment, method 3400 may be used to allow a user to easily and instantly share an interactive content overlay window 102 with one or more other users.

In a step 3402, a user (User 1) with a first user device 202a may be in an active message and/or voice conversation with one or more users (e.g., User 2, User 3, and the like) with user devices 202b-202n of the interactive engagement platform 212. In one embodiment, the message and/or voice conversation may include an SDK-based conversation.

Figure 35:
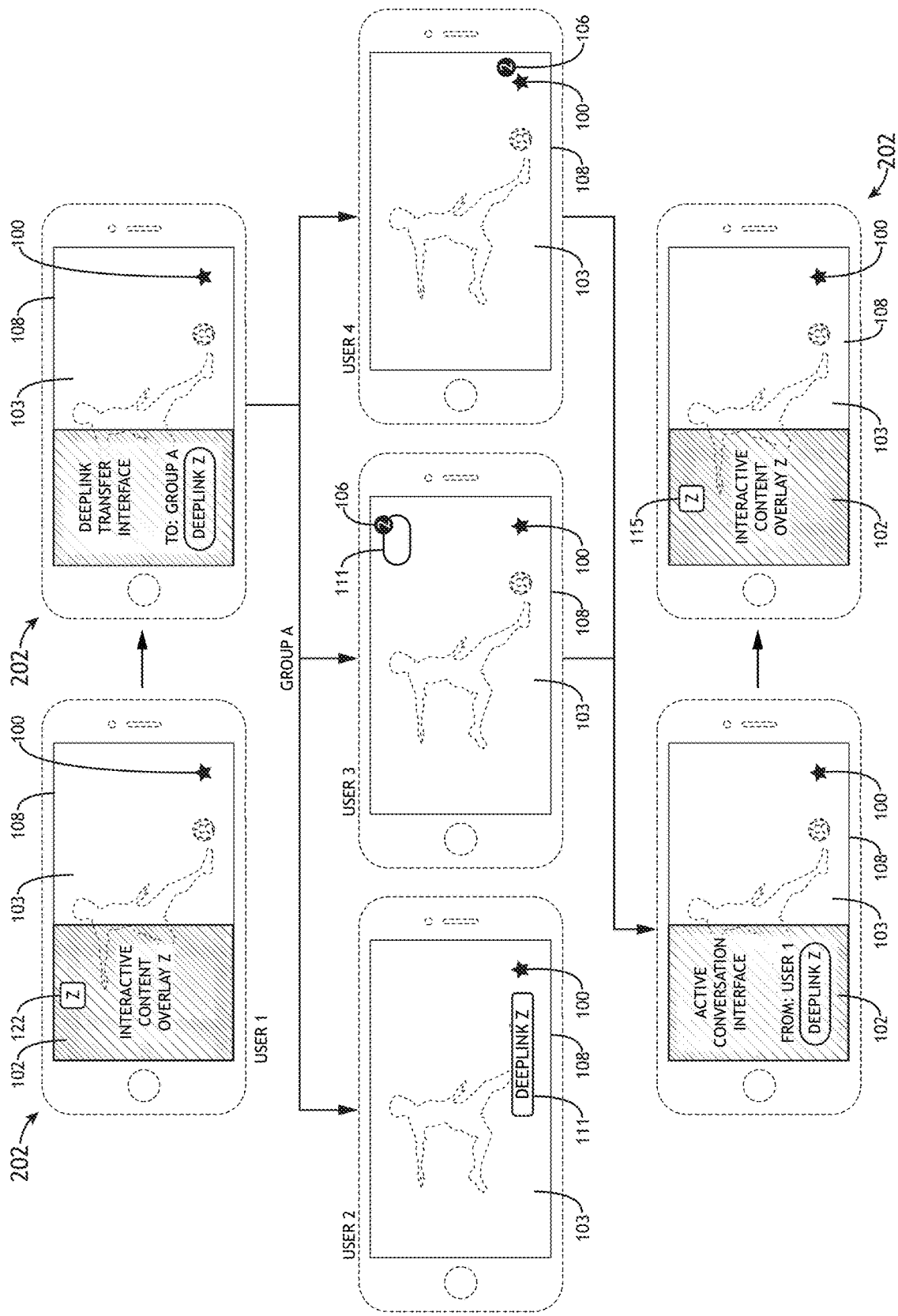
FIG. 35 illustrates a flow diagram for sharing an interactive content overlay with multiple user devices, in accordance with one or more embodiments of the present disclosure.

In a step 3404, the user (User 1) may access an interactive content overlay window 102 within the graphical user interface 108 of the user device 202a. For example, User 1 may access Content Overlay Z (interactive content overlay window 102) which User 1 wants to share with others. This may be further understood with reference to FIG. 35. FIG. 35 illustrates a flow diagram for sharing an interactive content overlay window 102 with multiple user devices 202, in accordance with one or more embodiments of the present disclosure. As shown in FIG. 35, User 1 may access an interactive content overlay window 102 (Content Overlay Z).

In a step 3406, the user (User 1) selects a "deeplink" button and/or makes a gesture on the graphical user interface 108 in order to generate a deeplink transfer interface window (i.e. interactive content overlay window 102) in the graphical user interface 108. For example, as shown in FIG. 35, User 1 may select a deeplink share button 122 within the graphical user interface 108.

In a step 3408, the user (User 1) selects one or more active conversations listed in the deep link transfer interface window with which to share. For example, as shown in FIG. 35, User 1 may select a group conversation (Group A) with which to share the interactive content overlay window 102 (Content Overlay Z). User 1 may then select a "send" button, or otherwise cause a deeplink request to be sent to Group A. While method 3408 illustrates the selection of a recipient of a deeplink request from an active conversation, this is not to be regarded as a limitation of the present disclosure. In this regard, it is contemplated herein that a user may be able to search for and share deeplink request with other users (user devices 202) who are not in an active conversation with the user.

In a step 3410, the user device 202 of the user transmits one or more deeplink data payloads to the interactive engagement platform 212. The one or more deeplink data payloads may include a request to share the interactive content overlay window 102, a data payload containing the interactive content overlay window 102 (Content Overlay Z), and the Device IDs of the one or more participants within Group A.

In a step 3412, the one or more servers of the interactive engagement platform 212 transmit the one or more deeplink data payloads for the interactive content overlay 102 (Content Overlay Z) to the user devices 202 of the selected conversation. In a step 314, the recipient user devices 202 cause the graphical user interfaces 108 to inform a user as to the deeplink request. In this regard, the one or more deeplink data payloads are configured to generate a deeplink notification in an interactive content overlay on the graphical user interface 108 of the recipient user devices 202. For example, as shown in FIG. 35, the recipient user devices 202 may be configured to display a deeplink notification to alert the recipients to the deeplink request. Deeplink notifications may include, but are not limited to, a deeplink request notification 124, a small interactive content overlay window 111, a notification 106, and the like.

In a step 3416, the recipient users may accept the deeplink request to view the shared interactive content overlay window 102. For example, as shown in FIG. 35, a recipient user may select the deeplink request notification 124, small interactive content overlay window 111, notification, or the like, in order to view the interactive content overlay window 102 (Content Overlay Z) shared via the deeplink request. Upon selection of the deeplink notification, the recipient user devices may be configured to display the interactive content overlay window of the first user device.

As noted previously herein, the system of the present disclosure may include a one or more controllers communicatively coupled to one or more servers via a network. In one embodiment, controllers and/or servers may include one or more processors and memory. In another embodiment, the one or more processors may be configured to execute a set of program instructions stored in memory, wherein the set of program instructions are configured to cause the one or more processors to carry out the steps of the present disclosure.

It is noted herein that the one or more components of system may be communicatively coupled to the various other components of system 100 in any manner known in the art. For example, the one or more components of the system (e.g., servers, controllers, user devices, processors, and the like) may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth, 3G, 4G, 4G LTE, 5G, and the like).

In one embodiment, the one or more processors may include any one or more processing elements known in the art. In this sense, the one or more processors may include any microprocessor-type device configured to execute software algorithms and/or instructions. In one embodiment, the one or more processors may consist of a desktop computer, mainframe computer system, workstation, image computer, parallel processor, or other computer system (e.g., networked computer) configured to execute a program configured to operate the system, as described throughout the present disclosure. It should be recognized that the steps described throughout the present disclosure may be carried out by a single computer system/server or, alternatively, multiple computer systems/servers. Furthermore, it should be recognized that the steps described throughout the present disclosure may be carried out on any one or more of the one or more processors. In general, the term "processor" may be broadly defined to encompass any device having one or more processing elements, which execute program instructions from memory. Moreover, different components/subsystems of the system (e.g., user devices 202, routing/load balancer server 218, registration server 222, API ingestion system 220, messaging system 228, advertising system 230, and the like) may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing program instructions executable by the associated one or more processors. For example, the memory may include a non-transitory memory medium. For instance, the memory may include, but is not limited to, a read-only memory (ROM), a random access memory (RAM), a magnetic or optical memory device (e.g., disk), a magnetic tape, a solid state drive and the like. It is further noted that memory may be housed in a common controller housing with the one or more processors. In an alternative embodiment, the memory may be located remotely with respect to the physical location of the processors, servers, controllers, and the like. In another embodiment, the memory maintains program instructions for causing the one or more processors to carry out the various steps described through the present disclosure.

As noted previously herein, the one or more user devices of the present disclosure may include any user device known in the art. In embodiments, a user device may include a user interface. In one embodiment, the user interface may include, but is not limited to, one or more desktops, tablets, smartphones, smart watches, smart TVs, or the like. In another embodiment, the user interface includes a display used to display data of the system to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. In another embodiment, a user may input selections and/or instructions responsive to data displayed to the user via the user interface.

As noted previously herein, various components of the system of the present disclosure may be communicatively coupled to one another via a networked configuration. In this regard, components of system may include a network interface. It is noted that a network interface may include any network interface circuitry or network interface device suitable for interfacing with a network. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 4G LTE, 5G, WiFi protocols, RF, LoRa, and the like. By way of another example, a network interface may be configured to communicatively couple to a network with a cloud-based architecture. Furthermore, the one or more servers of the present disclosure may include a cloud-based architecture.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for interactive video content, comprising:
one or more interactive engagement platform servers communicatively couplable to a plurality of user devices, wherein the plurality of user devices are configured to display one or more live video programs via one or more video program livestreams received from one or more video provider servers, wherein the one or more interactive engagement platform servers are configured to:
receive at least one of an extracted event ID or extracted metadata associated with the at least one video program livestream of the one or more video program livestreams;
retrieve, in near real-time, one or more data payloads including supplemental content related to the extracted event ID or extracted metadata associated with the at least one video program livestream from at least one of a third-party content provider or a third-party service provider, wherein the retrieve, in near real-time, one or more data payloads includes automatically searching, in near real-time, at least one of the third-party content provider or the third-party service provider for the supplemental content related to the event ID or metadata using an application programming interface ingestion server, the application program interface ingestion server configured to pair the retrieved one or more data payloads including the supplemental content to the extracted event ID or extracted metadata, the paired retrieved one or more data payloads and the extracted event ID or extracted metadata provided to the plurality of user devices via a routing balancer server; and
generate, via the routing balancer server, one or more control signals configured to cause the plurality of user devices to display an interactive content overlay, wherein the interactive content overlay is configured to display information associated with the supplemental content of the one or more retrieved data payloads, wherein the interactive content overlay is configured to provide simultaneous real-time interaction with the information associated with the one or more retrieved data payloads while the at least one video program livestream of the one or more video program livestreams is displayed.

2. The system of claim 1, wherein the interactive content overlay includes a submenu button set comprising one or more selectable buttons, wherein the one or more interactive engagement platform servers are further configured to generate one or more control signals configured to associate at least one data payload of the one or more retrieved data payloads with at least one selectable button of the submenu button set.

3. The system of claim 2, wherein the one or more control signals are configured to associate a first data payload with a first selectable button, and a second data payload with a second selectable button.

4. The system of claim 3,
wherein selection of the first selectable button is configured to cause the user device to display supplemental content of a first data payload in a first interactive content overlay window,
wherein selection of the second selectable button of the second selectable button is configured to cause the user device to display supplemental content of the second data payload in a second interactive content overlay window, wherein the second interactive overlay content window is different from the first interactive content overlay window.

5. The system of claim 3, wherein at least one of the first interactive content overlay window or the second interactive content overlay window is at least partially transparent.

6. The system of claim 1, wherein receiving one or more data payloads from at least one of a third-party content provider or a third-party service provider comprises interfacing with an application program interface (API) of at least one of the third-party content provider or the third-party service provider.

7. The system of claim 2, wherein the one or more interactive engagement platform servers are further configured to:
identify an advertisement start point in the video program livestream;
generate one or more deactivation control signals in response to the identified advertisement start point, wherein the one or more deactivation control signals are configured to disable at least one of the one or more selectable buttons of the submenu button set;
identify an advertisement end point in the video program livestream; and
generate one or more re-activation control signals in response to the identified advertisement end point, wherein the one or more re-activation control signals are configured to re-enable the at least one of the one or more disabled selectable buttons of the submenu button set.

8. The system of claim 1, wherein the one or more interactive engagement platform servers are further configured to:
identify an advertisement start point in the video program livestream;
determine at least one of an advertiser or advertisement subject associated with the identified advertisement;
generate one or more control signals in response to the identified advertisement start point, wherein the one or more control signals are configured to adjust one or more characteristics of the interactive content overlay based on the at least one advertiser or advertisement subject;
identify an advertisement end point in the video program livestream; and
generate one or more control signals in response to the identified advertisement end point, wherein the one or more control signals are configured to revert the interactive content overlay to an initial state.

9. The system of claim 1, wherein the one or more interactive engagement platform servers are further configured to:
identify an advertisement start point in the video program livestream;
determine at least one of an advertiser or advertisement subject associated with the identified advertisement;
generate one or more control signals in response to the identified advertisement start point, wherein the one or more control signals are configured to adjust one or more characteristics of an interactive content overlay window based on the at least one advertiser or advertisement subject matter;
identify an advertisement end point in the video program livestream; and
generate one or more control signals in response to the identified advertisement end point, wherein the one or more control signals are configured to revert the interactive content overlay window to an initial state.

10. The system of claim 1, wherein the one or more interactive engagement platform servers are further configured to:
receive one or more signals from one or more third-party APIs that a specified event has occurred;
transmit one or more signals to one or more third-party APIs that the specified event has occurred;
search a registration server for one or more user devices of the plurality of user devices which subscribe to a livestream associated with the specified event;
identify at least one user device of the plurality of user devices which subscribes to a livestream associated with the specified event;
generate one or more control signals configured to generate a notification in an interactive content overlay on the graphical user interface of the at least one user device.

11. The system of claim 10, wherein the livestream comprises at least one of:
a fantasy league livestream;
a sporting league livestream; or
a gambling service livestream.

12. The system of claim 1, wherein the one or more interactive engagement platform servers are further configured to:
receive one or more deeplink data payloads from a first user device, wherein the one or more deep link data payloads include a request to share the interactive content overlay window of the first user device with a second user device; and
transmit the one or more deeplink data payloads to the second user device, wherein the one or more deeplink data payloads are configured to generate a deeplink notification in an interactive content overlay on the graphical user interface of the second user device.

13. The system of claim 12, wherein the second user device is configured to display the interactive content overlay window of the first user device upon selection of the notification.

14. The system of claim 1, wherein the one or more interactive engagement platform servers are further configured to:
identify a first entity and a second entity associated with a first video program based on metadata extracted from the first video program;
receive one or more API feeds from one or more third-party providers to generate a first API bundle associated with the first entity and a second API bundle associated with the second entity;
combine the first API bundle and the second API bundle into a single collective API bundle;
assign the collective API bundle to an event identification of the first video program such that the collective API bundle is associated with the first video program.

15. The system of claim 14, wherein the one or more interactive engagement platform servers are further configured to:
generate one or more control signals configured to associate at least one data payload received from the collective API bundle with at least one selectable button of the submenu button set.

16. The system of claim 14, wherein the one or more interactive engagement platform servers are further configured to:
assign the collective API bundle to an event identification of an additional video program associated with at least one of the first entity or the second entity.

17. A system for interactive video content, comprising:
a user device communicatively coupled to one or more video provider servers and at least one of one or more third-party service providers or one or more third-party content providers, wherein the user device is configured to:

receive one or more video program livestreams from the one or more video provider servers, the one or more video program livestreams associated with one or more live video programs;

display at least one live video program of the one or more live video programs on a graphical user interface of the user device;

display an interactive content overlay including a submenu button set comprising one or more selectable buttons on a graphical user interface of a user device;

automatically receive, in near real-time, one or more data payloads including supplemental content related to the at least one video live program from at least one of a third-party content provider or a third-party service provider, the received one or more data payloads including the supplemental content paired with the extracted event ID or extracted metadata;

associate the at least one paired data payload with at least one selectable button of the submenu button set; and display an interactive content overlay window within the graphical user interface in response to a user selection of the at least one selectable button, wherein the interactive content overlay window is configured to display the supplemental content of the at least one data payload, wherein the interactive content overlay is configured to provide simultaneous real-time interaction with the information associated with the one or more retrieved data payloads while the at least one video program livestream of the one or more video program livestreams is displayed.

18. The system of claim 17, wherein the user device is configured to associate a first data payload with a first selectable button, and a second data payload with a second selectable button.

19. The system of claim 17, wherein receiving one or more data payloads from at least one of a third-party content provider or a third-party service provider comprises interfacing with an application program interface (API) of at least one of the third-party content provider or the third-party service provider.

20. The system of claim 18,
wherein the user device is configured to display supplemental content of the first data payload in a first interactive content overlay window in response to a user selection of the first selectable button,
wherein the user device is configured to display supplemental content of the second data payload in a second interactive content overlay window in response to a user selection of the second selectable button.

21. The system of claim 18, wherein at least one of the first interactive content overlay window or the second interactive content overlay window is at least partially transparent.

22. The system of claim 17, wherein the user device is further configured to:
identify an advertisement start point in a video program livestream;
generate one or more deactivation control signals in response to the identified advertisement start point, wherein the one or more deactivation control signals are configured to disable at least one of the one or more selectable buttons of the interactive content menu;
identify an advertisement end point in the video program livestream; and generate one or more re-activation control signals in response to the identified advertisement end point, wherein the one or more re-activation control signals are configured to re-enable the at least one of the one or more disabled selectable buttons of the interactive content menu.

23. The system of claim 17, wherein the user device is further configured to:
identify an advertisement start point in a video program livestream;
determine at least one of an advertiser or advertisement subject associated with the identified advertisement;
generate one or more control signals in response to the identified advertisement start point, wherein the one or more control signals are configured to adjust one or more characteristics of the submenu button set based on the at least one advertiser or advertisement subject;
identify an advertisement end point in the video program livestream; and
generate one or more control signals in response to the identified advertisement end point, wherein the one or more control signals are configured to revert the interactive content menu to an initial state.

24. The system of claim 17, wherein the user device is further configured to:
identify an advertisement start point in the video program livestream;
determine at least one of an advertiser or advertisement subject associated with the identified advertisement;
generate one or more control signals in response to the identified advertisement start point, wherein the one or more control signals are configured to adjust one or more characteristics of the interactive content overlay window based on the at least one advertiser or advertisement subject matter;
identify an advertisement end point in the video program livestream; and
generate one or more control signals in response to the identified advertisement end point, wherein the one or more control signals are configured to revert the interactive content overlay window to an initial state.

25. The system of claim 17, wherein the user device is further configured to:
receive one or more signals indicating a specified event has occurred;
identify the user device as being subscribed to a livestream associated with the specified event; and
display a notification in the interactive content overlay on the graphical user interface.

26. The system of claim 25, wherein the livestream comprises at least one of:
a fantasy league livestream;
a sporting league livestream; or
a gambling service livestream.

27. A method, comprising:
generating one or more control signals configured to cause a user device displaying a live video program to display an interactive content overlay including a submenu button set comprising one or more selectable buttons on the graphical user interface of the user device;
extracting metadata associated with the live video program;
receiving, in near real-time, one or more data payloads including supplemental content related to the extracted metadata from at least one of a third-party content provider or a third-party service provider, wherein the receiving, in near real-time, one or more data payloads includes automatically searching, in near real-time, at least one of the third-party content provider or the third-party provider for the supplemental content related to the extracted metadata using an application program interface ingestion server, the application program interface ingestion server configured to pair the retrieved one or more data payloads including the supplemental content to the extracted event ID or extracted metadata, the paired retrieved one or more data payloads and the extracted event ID or extracted metadata provided to the plurality of user devices via a routing balancer server; and generating, via the routing balancer server, one or more control signals configured to associate at least one data payload with at least one selectable button of the submenu button set, wherein the interactive content overlay is configured to provide simultaneous real-time interaction with the one or more received data payloads while the live video program is displayed.

\* \* \* \* \*